US011275273B2

(12) United States Patent
Yamamoto et al.

(10) Patent No.: US 11,275,273 B2
(45) Date of Patent: Mar. 15, 2022

(54) OPTICAL DEVICE AND REFRESH DRIVING METHOD FOR OPTICAL DEVICE

(71) Applicants: Kyoto University, Kyoto (JP); KYUSHU UNIVERSITY, NATIONAL UNIVERSITY CORPORATION, Fukuoka (JP); Sharp Kabushiki Kaisha, Sakai (JP); DIC Corporation, Tokyo (JP)

(72) Inventors: Jun Yamamoto, Kyoto (JP); Koki Takamoto, Kyoto (JP); Takeaki Araki, Kyoto (JP); Waki Sakatsuji, Kyoto (JP); Hirotsugu Kikuchi, Fukuoka (JP); Yasushi Okumura, Fukuoka (JP); Koji Fujikawa, Fukuoka (JP); Yu Fukunaga, Fukuoka (JP); Kiyoshi Minoura, Sakai (JP); Koji Murata, Sakai (JP); Isa Nishiyama, Kitaadachi-gun (JP); Koichi Endo, Kitaadachi-gun (JP)

(73) Assignees: KYOTO UNIVERSITY, Kyoto (JP); KYUSHU UNIVERSITY, NATIONAL UNIVERSITY CORPORATION, Fukuoka (JP); SHARP KABUSHIKI KAISHA, Osaka (JP); DIC CORPORATION, Tokyo (JP)

( * ) Notice: Subject to any disclaimer, the term of this patent is extended or adjusted under 35 U.S.C. 154(b) by 0 days.

(21) Appl. No.: 17/268,007

(22) PCT Filed: Aug. 16, 2019

(86) PCT No.: PCT/JP2019/032191
§ 371 (c)(1),
(2) Date: Feb. 11, 2021

(87) PCT Pub. No.: WO2020/036230
PCT Pub. Date: Feb. 20, 2020

(65) Prior Publication Data
US 2021/0191170 A1    Jun. 24, 2021

(30) Foreign Application Priority Data
Aug. 17, 2018  (JP) .............................. JP2018-153738

(51) Int. Cl.
*G02F 1/1337*  (2006.01)
*G02F 1/1343*  (2006.01)
(Continued)

(52) U.S. Cl.
CPC ...... *G02F 1/1337* (2013.01); *G02F 1/133514* (2013.01); *G02F 1/134363* (2013.01);
(Continued)

(58) Field of Classification Search
CPC ............. G02F 1/1337; G02F 1/134372; G02F 1/133514; G02F 1/134363; G09G 3/3618; G09G 3/3648
(Continued)

(56) References Cited

U.S. PATENT DOCUMENTS

2016/0140890 A1  5/2016 Kim et al.
2017/0261783 A1* 9/2017 Sato ...................... G02F 1/1396
(Continued)

FOREIGN PATENT DOCUMENTS

JP   2001-272687 A   10/2001
JP   2008-257078 A   10/2008
(Continued)

OTHER PUBLICATIONS

International Search Report dated Nov. 5, 2019, issued in counterpart International Application No. PCT/JP2019/032191, with English Translation. (4 pages).

*Primary Examiner* — Charles S Chang
(74) *Attorney, Agent, or Firm* — Westerman, Hattori, Daniels & Adrian, LLP

(57) ABSTRACT

An optical device (10) includes a first substrate (11) and a second substrate (12) facing each other, a liquid crystal component (13) between the first substrate (11) and the second substrate (12), a first electrode (18) and a second electrode (19) located on the first substrate (11) on the second substrate (12) side, and a first alignment layer (14) that is located on the first substrate (11) on the second substrate (12) side and controls the alignment state of liquid crystal molecules in the liquid crystal component (13), wherein an interface between the liquid crystal component
(Continued)

(13) and the first alignment layer (14) forms a non-glide weak anchoring interface (17).

9 Claims, 25 Drawing Sheets

(51) Int. Cl.
  *G02F 1/1335*  (2006.01)
  *G09G 3/36*  (2006.01)
(52) U.S. Cl.
  CPC ..... *G02F 1/134372* (2021.01); *G09G 3/3618* (2013.01); *G09G 3/3648* (2013.01)
(58) Field of Classification Search
  USPC .................................................. 349/123–136
  See application file for complete search history.

(56) References Cited

U.S. PATENT DOCUMENTS

| | | | |
|---|---|---|---|
| 2019/0130863 A1* | 5/2019 | Chen | G02F 1/13306 |
| 2020/0004065 A1* | 1/2020 | Acreman | G02F 1/1343 |
| 2020/0241336 A1 | 7/2020 | Yamamoto et al. | |

FOREIGN PATENT DOCUMENTS

| | | |
|---|---|---|
| JP | 2017-211566 A | 11/2017 |
| JP | 2018-151438 A | 9/2018 |
| WO | 2017/034023 A1 | 3/2017 |

\* cited by examiner

FIG. 1
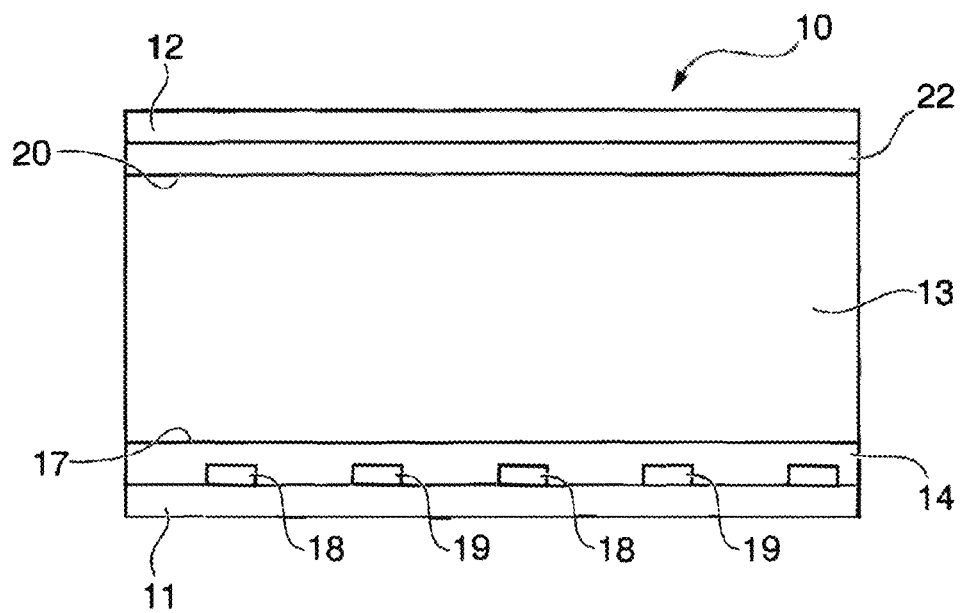
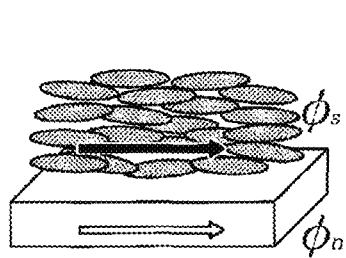
FIG. 2 (a)
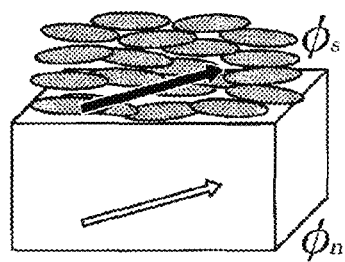
FIG. 2 (b)
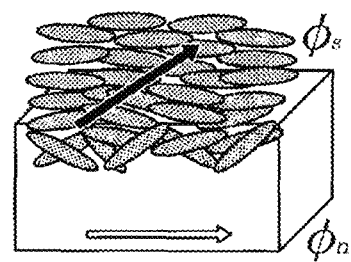
FIG. 2 (c)

ALIGNMENT DIRECTION    RUBBING

GAP WIDTH 4.5 μm    ITO WIDTH 3.5 μm

LIQUID CRYSTAL MOLECULE DENSITY PROFILE

IMPURITY MOLECULE DENSITY PROFILE

NEMATIC ORDER PROFILE $E = (0, 1.0, 0)$ $(100 \leq t/t_0 \leq 200)$

[Math.3]

OPTICAL DEVICE AND REFRESH DRIVING METHOD FOR OPTICAL DEVICE

TECHNICAL FIELD

The present invention relates to an optical device and a refresh driving method for an optical device.

The present application claims the priority of Japanese Patent Application No. 2018-153738 filed on Aug. 17, 2018 in Japan, which is incorporated herein by reference in its entirety.

BACKGROUND ART

"Liquid crystals" are currently used in display devices in various fields, such as measuring instruments, automobile panels, mobile terminals, electronic notebooks, printers, computers, television sets, clocks and watches, and advertising boards.

Such "liquid crystals" generally refers to phases having both the fluidity of liquid and the anisotropy of crystals and are classified into nematic liquid crystals, smectic liquid crystals, and cholesteric liquid crystals based on their molecular arrangement patterns. Nematic liquid crystals are used for liquid crystal display devices (liquid crystal displays) of, for example, a twisted nematic (TN) type, a super twisted nematic (STN) type, a vertical alignment (VA) type with a thin-film transistor (TFT), an in-plane switching (IPS) type, or a fringe field switching (FFS) type and are widely distributed in the market.

In liquid crystal display devices of the VA type, halftones tend to be whitened when viewed obliquely.

In contrast, in liquid crystal display devices of a transverse electric field type, such as the IPS type or the FFS type, in which liquid crystal molecules are horizontally aligned, the alignment of the liquid crystal molecules is changed in the in-plane direction, and the luminance is therefore uniformly changed when viewed from the front and when viewed obliquely. Furthermore, liquid crystal display devices of the transverse electric field type do not need an electrode on the counter substrate (that is, a CF substrate on the color filter side) and Therefore well matches in-cell touch panels.

At present, liquid crystals with improved low-voltage drivability are important development targets. Furthermore, display of motion pictures on liquid crystal display devices of television sets, tablets, mobile terminals, and the like requires fast color switching, and therefore the high-speed response characteristics of liquid crystals are important.

The present inventors have proposed optical devices with good low-voltage drivability by providing a lubricating interface inducing region forming a slippery interface between a liquid crystal component and a substrate (Patent Literature 1).

CITATION LIST

Patent Literature

PTL 1: International Publication WO 2017/034023

SUMMARY OF INVENTION

Technical Problem

Although the liquid crystal optical devices in Patent Literature 1 have good low-voyage drivability, the response speed, particularly the response speed during no voltage application, may be further improved.

It is an object of the present invention to provide an optical device with good low-voltage drivability and high-speed response characteristics.

Solution to Problem

As a result of extensive studies to solve the above problems, the present inventors have completed the present invention by finding that a glide phenomenon in which the orientation of molecules aligned in the external field direction does not return even after removal of the external field occurs in liquid crystal devices provided with the lubricating interface inducing region between the liquid crystal component and the substrate described in Patent Literature 1, whereas an optical device with a first alignment layer in which the interface with the liquid crystal component forms a non-glide weak anchoring interface exhibits low-voltage drivability and high-speed response characteristics.

The present invention includes the following aspects.

[1] An optical device including: a first substrate and a second substrate facing each other; a liquid crystal component between the first substrate and the second substrate; a first electrode and a second electrode located on the first substrate on the second substrate side; and a first alignment layer that is located on the first substrate on the second substrate side and controls the alignment state of liquid crystal molecules in the liquid crystal component, wherein an interface between the liquid crystal component and the first alignment layer forms a non-glide weak anchoring interface.

[2] The optical device according to [1], further including a second alignment layer that controls the alignment state of liquid crystal molecules in the liquid crystal component located on the second substrate on the first substrate side, wherein an interface between the liquid crystal component and the second alignment layer forms a strong anchoring interface.

[3] The optical device according to [1] or [2], wherein the interface between the liquid crystal component and the first alignment layer has an azimuthal anchoring energy in the range of $6 \times 10^{-8}$ to $1 \times 10^{-6}$ $Jm^{-2}$.

[4] The optical device according to any one of [1] to [3], wherein the first alignment layer is a hybrid film of a strong anchoring film and a weak anchoring film.

[5] The optical device according to any one of [1] to [4], wherein the first electrode and the second electrode generate an in-plane electric field between the first substrate and the second substrate.

[6] The optical device according to any one of [1] to [4], wherein the first electrode and the second electrode generate a fringing field between the first substrate and the second substrate.

[7] The optical device according to any one of [1] to [6], wherein the liquid crystal component contains a nematic liquid crystal.

[8] The optical device according to any one of [1] to [7], wherein the second substrate has a color filter, and a driving voltage is applied to the first electrode and the second electrode via a thin-film transistor.

[9] A refresh driving method for the optical device according to [8], including: applying the driving voltage until a maximum transmittance is obtained; and subsequently stopping voltage application.

Advantageous Effects of Invention

An optical device according to the present invention, in which the interface between the liquid crystal component and the first alignment layer forms a non-glide weak anchoring interface, has good low-voltage drivability and high-speed response characteristics.

BRIEF DESCRIPTION OF DRAWINGS

FIG. 1 is a schematic cross-sectional view of an optical device according to a first embodiment of the present invention.

FIG. 2(a) is a schematic view of a strong anchoring interface formed by a liquid crystal component and an alignment layer. FIG. 2(b) is a schematic view of a glide interface formed by a liquid crystal component and an alignment layer. FIG. 2(c) is a schematic view of a non-glide weak anchoring interface formed by a liquid crystal component and an alignment layer.

DESCRIPTION OF EMBODIMENTS

[Optical Device]

Figure 3:
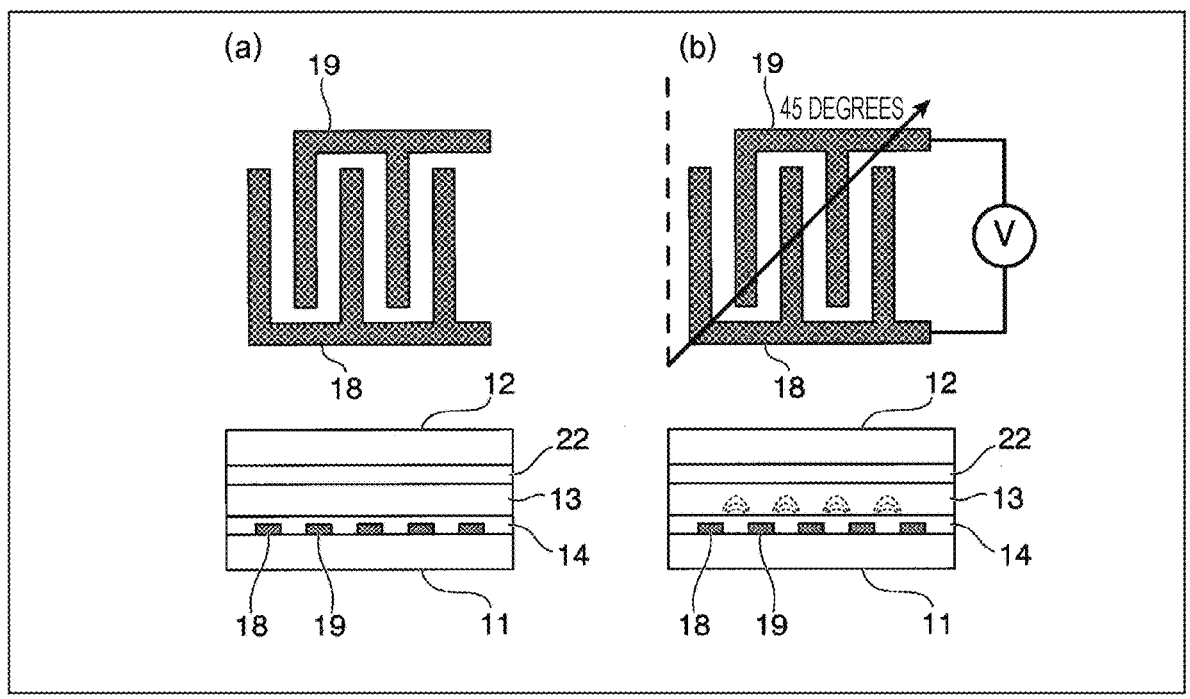
FIG. 3 is a schematic view (a) of an optical device according to an embodiment of the present invention and a schematic view (b) of the optical device to which an electric field is applied.

An optical device according to a first embodiment of the present invention is described below with reference to drawings.

FIG. 1 is a schematic cross-sectional view of an optical device 10 according to the present embodiment.

The present embodiment of the invention provides an optical device 10 that includes a first substrate 11 and a second substrate 12 facing each other, a liquid crystal component 13 between the first substrate 11 and the second substrate 12, a first electrode 18 and a second electrode 19 located on the first substrate 11 on the second substrate side, and a first alignment layer 14 that is located on the first substrate 11 on the second substrate 12 side and controls the alignment state of liquid crystal molecules in the liquid crystal component 13, wherein the interface between the liquid crystal component 13 and the first alignment layer 14 forms a non-glide weak anchoring interface 17.

The relationship between a liquid crystal component and an alignment layer in the related art and the present embodiment in the present specification is described below with reference to FIG. 2.

FIG. 2(*a*) is a schematic view of a strong anchoring interface formed by a liquid crystal component and an alignment layer. An alignment layer, for example, formed of a polyimide film is a solid phase and is not deformed, and liquid crystal molecules of a liquid crystal component near the alignment layer do not move due to a strong intermolecular force between the liquid crystal molecules and the polyimide film.

FIG. 2(*b*) is a schematic view of a glide slippery interface formed by a liquid crystal component and an alignment layer. In an alignment layer made of a resin at a temperature higher than the glass transition temperature (Tg) or an alignment layer in a liquid state, liquid crystal molecules of the liquid crystal component near the alignment layer are fixed near the alignment layer surface, but the alignment layer itself is slippery (that is, easily plastically deformed), and consequently a glide slippery interface is formed in which the alignment direction of the liquid crystal can be freely rotated. Although the use of a glide slippery interface enables liquid crystal molecules to be freely rotated and is expected to greatly decrease the driving power and to be applied in a memory display device, it decreases the restoring force and may therefore shift the black level or decrease the response speed. Thus, it is necessary to take measures to solve such problems. For example, a strong anchoring interface may be provided on the counter substrate.

FIG. 2(*c*) is a schematic view of a non-glide weak anchoring slippery interface formed by a liquid crystal component and an alignment layer. The alignment layer is not completely a solid phase or a liquid phase but exerts a weak but sufficient restoring force against the alignment rotation of liquid crystal molecules like gel or rubber. More specifically, although a non-slippery (non-glide) alignment regulating force is applied between the liquid crystal component and the alignment layer, the liquid crystal component and the alignment layer form a weak anchoring interface, and therefore liquid crystal molecules of the liquid crystal component near the alignment layer can be greatly rotated. Thus, like (b), the driving voltage can be expected to be lowered. Furthermore, unlike (b), the alignment layer itself retains restoring force, and the alignment layer alone in (c) can constitute a display device. The development of a material with a low interface viscosity or measures for enhancing the restoring force as in (b) may be useful against a decrease in response speed expected from the weak restoring force.

As illustrated in FIG. 2(*a*), in a known liquid crystal optical device with an alignment layer formed of a polyimide film, a liquid crystal component and an alignment layer form a strong anchoring interface, thus causing a low-voltage drivability problem.

A liquid crystal optical device with a slippery interface in Patent Literature 1, in which liquid crystal molecules in contact with a liquid phase can move easily, as illustrated in FIG. 2(*b*), has good low-voltage drivability but has a response speed problem, in particular, a response speed problem during no voltage application.

The optical device 10 in the present embodiment, in which the interface between the liquid crystal component and the first alignment layer forms a non-glide weak anchoring interface, as illustrated in FIG. 2(*c*), has good low-voltage drivability and high-speed response characteristics.

The first substrate 11 and the second substrate 12 may be a glass substrate or a polymer film.

The liquid crystal component 13 and the first alignment layer 14 are described in detail later in another section.

In the present embodiment, the liquid crystal component 13 is preferably a nematic liquid crystal. The first electrode and the second electrode are located on the first substrate, and liquid crystal molecules 45 of the liquid crystal component 13 near the first alignment layer on the first substrate are preferably horizontally aligned.

In the present embodiment, preferably, a second alignment layer 22 that controls the alignment state of liquid crystal molecules in the liquid crystal component 13 is located on the second substrate 12 (that is, the counter substrate) on the first substrate 11 side, and the interface between the liquid crystal component 13 and the second alignment layer 22 forms a strong anchoring interface 20. The second alignment layer 22 may be formed of a polyimide. The alignment layer 22 may be formed of a known alignment film material, such as a liquid-crystal alignment film for photo-alignment, for example, described in Literature 1 ("Alignment Film", EKISHO, Vol. 15, No. 3, 2011, p. 187), instead of the polyimide. The strong anchoring interface 20 may be formed by rubbing a polyimide alignment film (alignment layer) or by irradiating a liquid-crystal alignment film for photo-alignment with light to cause photodimerization, photoisomerization, or photolysis.

The interface between the liquid crystal component and the first alignment layer that forms a non-glide weak anchoring interface preferably has an azimuthal anchoring energy in the range of $6 \times 10^{-8}$ to $1 \times 10^{-6}$ $Jm^{-2}$.

In the optical device according to the present embodiment, the first alignment layer may be a hybrid film of a strong anchoring film and a weak anchoring film. The combination of the strong anchoring film and the weak anchoring film may be a combination of a polymer film and a low-molecular-weight film or a combination of a polymer film and a polymer film. For example, it may be a microphase-separated liquid low-molecular-weight film on a strong anchoring film formed of a polymer layer. A hybrid film of a plurality of types of polymer films may be formed by a nanoimprinting technique.

In the optical device according to the present embodiment, the first electrode 18 and the second electrode 19 located on the first substrate 11 on the second substrate 12 side can be configured to generate an electric field between the first electrode 18 and the second electrode 19.

In the optical device according to the present embodiment, the first electrode 18 and the second electrode 19 can be configured to generate an in-plane electric field between the first substrate 11 and the second substrate 12.

In the optical device according to the present embodiment, the first electrode 18 and the second electrode 19 can be configured to generate a fringing field between the first substrate 11 and the second substrate 12.

"Liquid Crystal Component 13"

In the present embodiment, the liquid crystal component 13 is supplied between the first substrate 11 and the second substrate 12 and forms a liquid crystal phase.

The liquid crystal component 13 in the present embodiment is preferably at least one selected from the group consisting of nematic liquid crystals, cholesteric liquid crystals, and smectic liquid crystals and is preferably at least one selected from the group consisting of nematic liquid crystal compositions.

In the present invention, the liquid crystal component preferably has a liquid crystal phase at room temperature.

In the present invention, the liquid crystal component preferably has a clearing point of 60° C. or more.

In the present invention, the liquid crystal component may contain at least two liquid crystal compounds.

In an optical device according to the present invention, a liquid crystal compound to be used in a liquid crystal component preferably contains a compound represented by the following general formula (LC).

[Chem. 1]

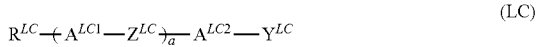
(LC)

(In the general formula (LC), $R^{LC}$ denotes an alkyl group having 1 to 15 carbon atoms, one or two or more $CH_2$ groups in the alkyl group are optionally substituted with —O—, —CH=CH—, —CO—, —OCO—, —COO—, or —C≡C— such that oxygen atoms are not directly adjacent to each other, and one or two or more hydrogen atoms in the alkyl group are optionally substituted with a halogen atom, $A^{LC1}$ and $A^{LC2}$ independently denote a group selected from the group consisting of (a) a trans-1,4-cyclohexylene group (one $CH_2$ group or nonadjacent two or more $CH_2$ groups in this group are optionally substituted with an oxygen atom or a sulfur atom), (b) a 1,4-phenylene group (one CH group or nonadjacent two or more CH groups in this group are optionally substituted with a nitrogen atom), and (c) a 1,4-bicyclo(2.2.2)octylene group, a naphthalene-2,6-diyl group, a decahydronaphthalene-2,6-diyl group, a 1,2,3,4-tetrahydronaphthalene-2,6-diyl group, or a chroman-2,6-diyl group, one or two or more hydrogen atoms in the group (a), (b), or (c) are optionally substituted with F, Cl, $CF_3$, or $OCF_3$, $Z^{LC}$ denotes a single bond, —CH=CH—, —CF=CF—, —C≡C—, —$CH_2CH_2$—, —$(CH_2)_4$—, —$OCH_2$—, —$CH_2O$—, —$OCF_2$—, —$CF_2O$—, —($N^+(O^-)N$)—, —COO—, or —OCO—, $Y^{LC}$ denotes a hydrogen atom, a fluorine atom, a chlorine atom, a cyano group, or an alkyl group having 1 to 15 carbon atoms, one or two or more $CH_2$ groups in the alkyl group are optionally substituted with —O—, —CH=CH—, —CO—, —OCO—, —COO—, —C≡C—, —$CF_2O$—, or —$OCF_2$— such that oxygen atoms are not directly adjacent to each other, and one or two or more hydrogen atoms in the alkyl group are optionally substituted with a halogen atom, and a denotes an integer in the range of 1 to 4, if a denotes 2, 3, or 4, and there are a plurality of $A^{LC1}$s, then the plurality of $A^{LC1}$s may be the same or different, and if there are a plurality of $Z^{LC}$s, then the plurality of $Z^{LC}$s may be the same or different.)

A compound represented by the general formula (LC) is preferably one or two or more compounds selected from the compound group represented by the following general formulae (LC1) and (LC2).

[Chem. 2]

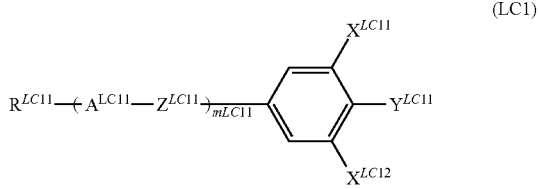
(LC1)

(LC2)

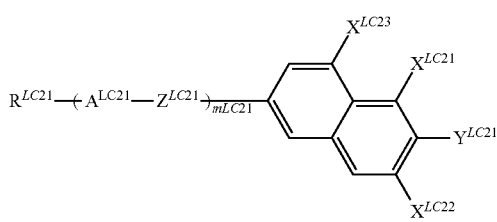

(wherein $R^{LC11}$ and $R^{LC21}$ independently denote an alkyl group having 1 to 15 carbon atoms, one or two or more $CH_2$ groups in the alkyl group are optionally substituted with —O—, —CH=CH—, —CO—, —OCO—, —COO—, or —C≡C— such that oxygen atoms are not directly adjacent to each other, one or two or more hydrogen atoms in the alkyl group are optionally substituted with a halogen atom, and $A^{LC11}$ and $A^{LC21}$ independently denote any one of the following structures,

[Chem. 3]

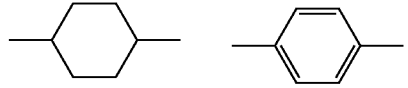

-continued

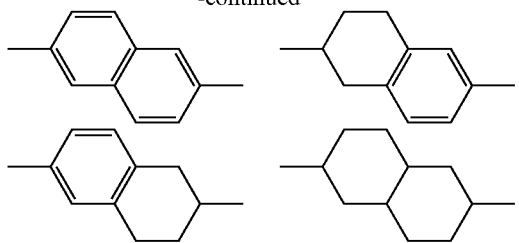

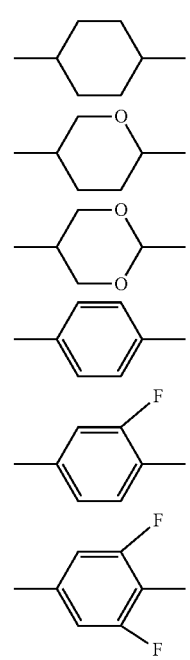

(in the structure, one or two or more CH$_2$ groups in the cyclohexylene group are optionally substituted with an oxygen atom, one or two or more CH groups in the 1,4-phenylene group are optionally substituted with a nitrogen atom, and one or two or more hydrogen atoms in the structure are optionally substituted with F, Cl, CF$_3$, or OCF$_3$), $X^{LC11}$, $X^{LC12}$, and $X^{LC21}$ to $X^{LC23}$ independently denote a hydrogen atom, Cl, F, CF$_3$, or OCF$_3$, $Y^{LC11}$ and $Y^{LC21}$ independently denote a hydrogen atom, Cl, F, CN, CF$_3$, OCH$_2$F, OCHF$_2$, or OCF$_3$, $Z^{LC11}$ and $Z^{LC21}$ independently denote a single bond, —CH=CH—, —CF=CF—, —C≡C—, —CH$_2$CH$_2$—, —(CH$_2$)$_4$—, —OCH$_2$—, —CH$_2$O—, —OCF$_2$—, —CF$_2$O—, —COO—, or —OCO—, $m^{LC11}$ and $m^{LC21}$ independently denote an integer in the range of 1 to 4, and if there are a plurality of $A^{LC21}$s, $A^{LC21}$s, $Z^{LC11}$s, or $Z^{LC21}$s, they may be the same or different)

$R^{LC11}$ and $R^{LC21}$ preferably independently denote an alkyl group having 1 to 7 carbon atoms, an alkoxy group having 1 to 7 carbon atoms, or an alkenyl group having 2 to 7 carbon atoms, more preferably an alkyl group having 1 to 5 carbon atoms, an alkoxy group having 1 to 5 carbon atoms, or an alkenyl group having 2 to 5 carbon atoms, still more preferably have a straight chain, and most preferably the alkenyl group has the following structure.

[Chem. 4]

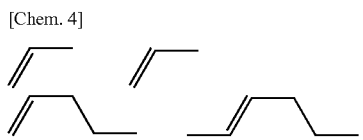

(wherein the right end is bonded to the ring structure)
$A^{LC11}$ and $A^{LC21}$ preferably independently denote the following structure.

$Y^{LC11}$ and $Y^{LC21}$ preferably independently denote F, CN, CF$_3$ or OCF$_3$, preferably F or OCF$_3$, particularly preferably F.

$Z^{LC11}$ and $Z^{LC21}$ preferably denote a single bond, —CH$_2$CH$_2$—, —COO—, —OCO—, —OCH$_2$—, —CH$_2$O—, —OCF$_2$—, or —CF$_2$O—, preferably a single bond, —CH$_2$CH$_2$—, —OCH$_2$—, —OCF$_2$—, or —CF$_2$O—, more preferably a single bond, —OCH$_2$—, or —CF$_2$O—.

$m^{LC11}$ and $m^{LC21}$ preferably denote 1, 2, or 3, preferably 1 or 2 when storage stability at low temperatures and response speed are regarded as important, preferably 2 or 3 to improve the upper limit of the nematic phase upper limit temperature.

A compound represented by the general formula (LC) is preferably one or two or more compounds selected from the compound group represented by The following general formulae (LC3) to (LC5).

[Chem. 6]

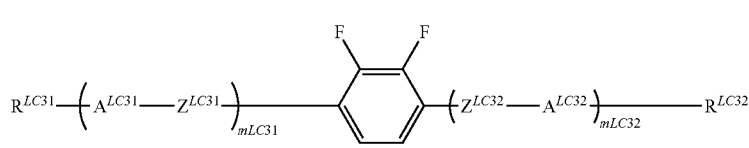

(LC3)

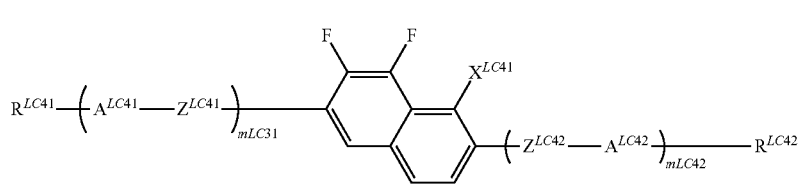

(LC4)

(LC5)

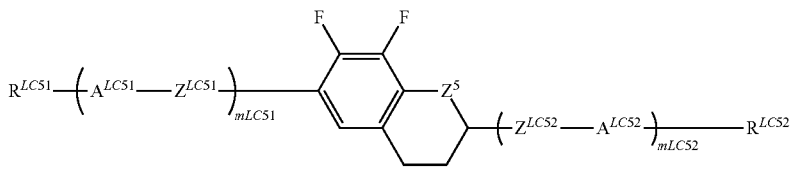

(wherein $R^{LC31}$, $R^{LC32}$, $R^{LC41}$, $R^{LC42}$, $R^{LC51}$, and $R^{LC52}$ independently denote an alkyl group having 1 to 15 carbon atoms, one or two or more $CH_2$ groups in the alkyl group are optionally substituted with —O—, —CH=CH—, —CO—, —OCO—, —COO—, or —C≡C— such that oxygen atoms are not directly adjacent to each other, one or two or more hydrogen atoms in the alkyl group are optionally substituted with a halogen atom, and $A^{LC31}$, $A^{LC32}$, $A^{LC41}$, $A^{LC42}$, $A^{LC51}$, and $A^{LC52}$ independently denote any one of the following structures,

[Chem. 7]

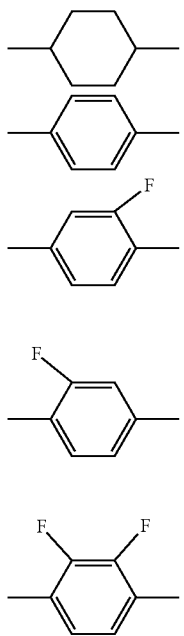

(in the structure, one or two or more $CH_2$ groups in the cyclohexylene group are optionally substituted with an oxygen atom, one or two or more CH groups in the 1,4-phenylene group are optionally substituted with a nitrogen atom, and one or two or more hydrogen atoms in the structure are optionally substituted with Cl, $CF_3$, or $OCF_3$), $Z^{LC31}$, $Z^{LC32}$, $Z^{LC41}$, $Z^{LC42}$, $Z^{LC51}$, and $Z^{LC52}$ independently denote a single bond, —CH=CH—, —C≡C—, —$CH_2CH_2$—, —$(CH_2)_4$—, —COO—, —$OCH_2$—, —$CH_2O$—, —$OCF_2$—, or —$CF_2O$—, $Z^5$ denotes a $CH_2$ group or an oxygen atom, $X^{LC41}$ denotes a hydrogen atom or a fluorine atom, $m^{LC31}$, $m^{LC32}$, $m^{LC41}$, $m^{LC42}$, $m^{LC51}$, and $m^{LC52}$ independently denote 0 to 3, $m^{LC31}+m^{LC32}$, $m^{LC41}+m^{LC42}$, and $m^{LC51}+m^{LC52}$ denote 1, 2, or 3, and if there are a plurality of $A^{LC21}$s to $A^{LC52}$s, and $Z^{LC31}$s to $Z^{LC52}$s, they may be the same or different)

$R^{LC31}$ to $R^{LC52}$ preferably independently denote an alkyl group having 1 to 7 carbon atoms, an alkoxy group having 1 to 7 carbon atoms, or an alkenyl group having 2 to 7 carbon atoms, and most preferably the alkenyl group has the following structure,

[Chem. 8]

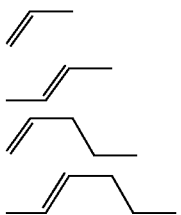

(wherein the right end is bonded to the ring structure)

$A^{LC31}$ to $A^{LC52}$ preferably independently denote the following structure, and

[Chem. 9]

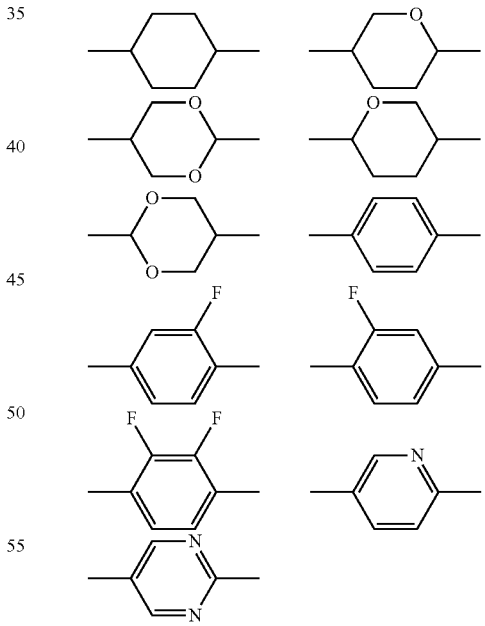

$Z^{LC31}$ to $Z^{LC52}$ preferably independently denote a single bond, —$CH_2O$—, —COO—, —OCO—, —$CH_2CH_2$—, —$CF_2O$—, —$OCF_2$—, or —$OCH_2$—.

A compound represented by the general formula (LC) is preferably a liquid crystal composition containing one or two or more compounds represented by the following general formula (LC6).

[Chem. 10]

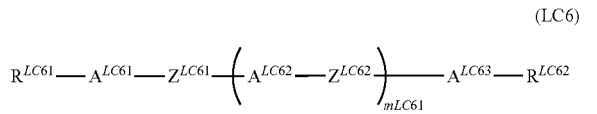
(LC6)

(wherein $R^{LC61}$ and $R^{LC62}$ independently denote an alkyl group having 1 to 15 carbon atoms, one or two or more $CH_2$ groups in the alkyl group are optionally substituted with —O—, —CH=CH—, —CO—, —OCO—, —COO—, or —C≡C— such that oxygen atoms are not directly adjacent to each other, one or two or more hydrogen atoms in the alkyl group are optionally substituted with a halogen, and $A^{LC61}$ to $A^{LC63}$ independently denote any one of the following,

[Chem. 11]

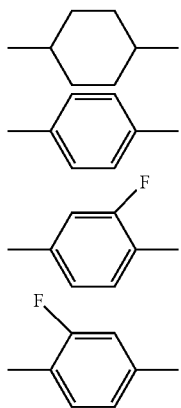

(in the structure, one or two or more $CH_2CH_2$ groups in the cyclohexylene group are optionally substituted with —CH=CH—, —CF$_2$O—, or —OCF$_2$—, and one or two or more CH groups in the 1,4-phenylene group are optionally substituted with a nitrogen atom), $Z^{LC61}$ and $Z^{LC62}$ independently denote a single bond, —CH=CH—, —C≡C—, —CH$_2$CH$_2$—, —(CH$_2$)$_4$—, —COO—, —OCH$_2$—, —CH$_2$O—, —OCF$_2$—, or —CF$_2$O—, and mLC61 denotes 0 to 3, provided that the compounds represented by the general formulae (LC1) to (LC6) are excluded)

$R^{LC61}$ and $R^{LC62}$ preferably independently denote an alkyl group having 1 to 7 carbon atoms, an alkoxy group having 1 to 7 carbon atoms, or an alkenyl group having 2 to 7 carbon atoms, and most preferably the alkenyl group has the following structure,

[Chem. 12]

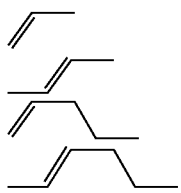

(wherein the right end is bonded to the ring structure)
$A^{LC61}$ to $A^{LC63}$ preferably independently denote the following structure, and

[Chem 13]

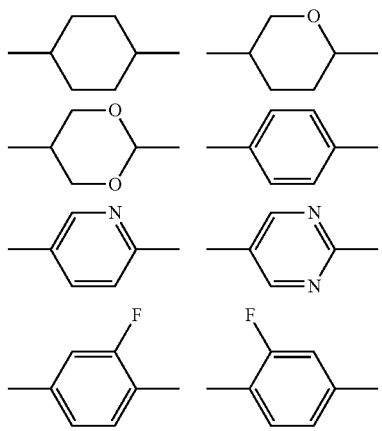

$Z^{LC61}$ and $Z^{LC62}$ preferably independently denote a single bond, —CH$_2$CH$_2$—, —COO—, —OCH$_2$—, —CH$_2$O—, —OCF$_2$—, or —CF$_2$O—.

[Chem. 14]

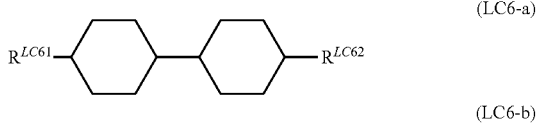
(LC6-a)

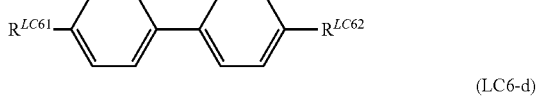
(LC6-b)

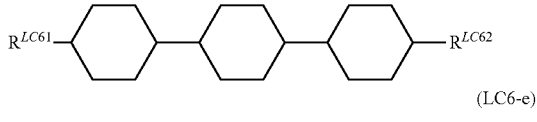
(LC6-c)

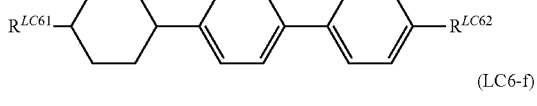
(LC6-d)

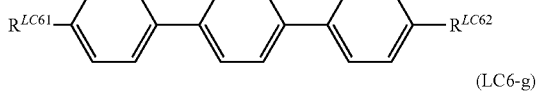
(LC6-e)

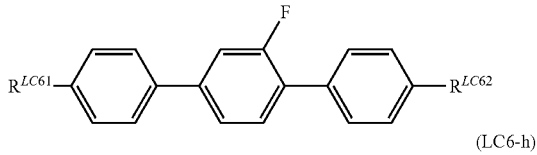
(LC6-f)

(LC6-g)

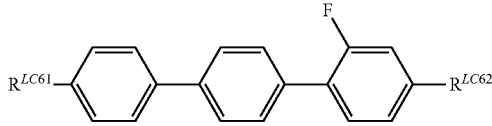
(LC6-h)

-continued

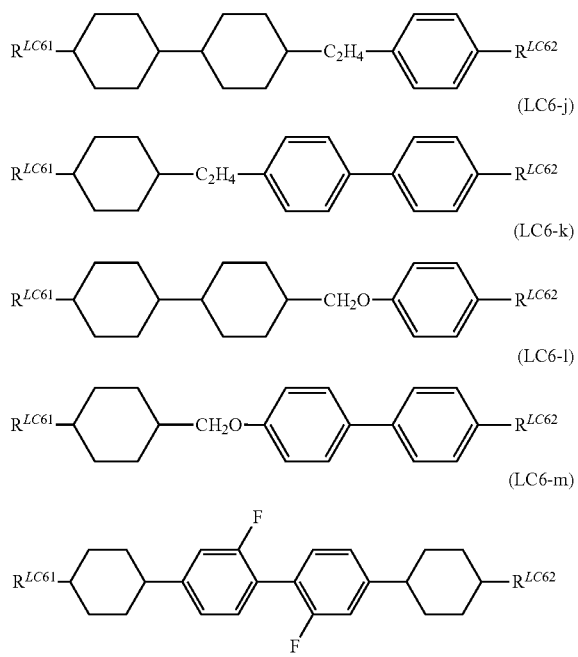

(LC6-i)
(LC6-j)
(LC6-k)
(LC6-l)
(LC6-m)

(wherein $R^{LC61}$ and $R^{LC62}$ independently denote an alkyl group having 1 to 7 carbon atoms, an alkoxy group having 1 to 7 carbon atoms, an alkenyl group having 2 to 7 carbon atoms, or an alkenyloxy group having 2 to 7 carbon atoms).

A liquid crystal component for use in the present invention may be composed of a liquid crystal compound, may be composed of a liquid crystal composition, or may contain a liquid crystal compound or a liquid crystal composition.

"First Alignment Layer"

In the present invention, the first alignment layer controls the alignment state of liquid crystal molecules in the liquid crystal component 13 to form the non-glide weak anchoring interface 17 at the interface with the liquid crystal component 13.

The formation of the non-glide weak anchoring interface between the liquid crystal component and the first alignment layer can result in an optical device with good low-voltage drivability and high-speed response characteristics.

The first alignment layer is not particularly limited, provided that the interface between the first alignment layer and the liquid crystal component forms a non-glide weak anchoring interface, and a polymer film may form the non-glide weak anchoring interface, or a low-molecular-weight compound may form the non-glide weak anchoring interface.

The polymer film that forms the non-glide weak anchoring interface may be a resin film formed by applying a slippery material containing a monomer as a low-molecular-weight lubricating interface inducer to a substrate and polymerizing the monomer or a resin film formed by polymerizing a monomer as a low-molecular-weight lubricating interface inducer and applying the resulting polymer to a substrate. The resin film is preferably baked to control the azimuthal anchoring energy of the interface between the liquid crystal component and the first alignment layer. Examples of the monomer as a low-molecular-weight lubricating interface inducer include monomers (1-1) to (1-15) described later.

As shown in a simulation described later, the non-glide weak anchoring interface formed of the low-molecular-weight compound may be a substrate surface forming a strong anchoring interface covered with a low-molecular-weight lubricating interface inducer that forms a weak anchoring interface at a particular coverage. A weak anchoring region and a strong anchoring region coexisting at a certain ratio can control the azimuthal anchoring energy of the interface between the liquid crystal component and the first alignment layer. Examples of the low-molecular-weight lubricating interface inducer to form the non-glide weak anchoring interface between the liquid crystal component and the first alignment layer include compounds (1-1) to (1-20) described later.

Examples of the method for allowing the weak anchoring region and the strong anchoring region to coexist at a certain ratio include, but are not limited to, (1) injecting a mixture of a low-molecular-weight lubricating interface inducer with a high affinity for the surface of the first substrate and a liquid crystal component between the first substrate and the second substrate to form a film of the low-molecular-weight lubricating interface inducer forming a weak anchoring interface on the surface of the first substrate at a particular coverage, (2) forming the first alignment layer as a hybrid film of a strong anchoring film and a weak anchoring film, or (3) forming the weak anchoring region and the strong anchoring region on the first alignment layer by a nanoimprinting technique or the like.

In the first alignment layer formed of a hybrid film with the weak anchoring region and the strong anchoring region on its surface, the area ratio (coverage) of the weak anchoring region to 100% of the total area of the weak anchoring region and the strong anchoring region may be more than 0% and less than 85%, 0.1% to 82%, 0.2% to 80%, 0.3% to 75%, 0.5% to 70%, 1.0% to 82%, or 2.0% to 65%.

In the present specification, a film with an azimuthal anchoring energy of an interface higher than "$1\times10^{-6}$ $Jm^{-2}$" can be defined as a "strong anchoring film", and a film with an azimuthal anchoring energy of an interface equal to or lower than "$1\times10^{-6}$ $Jm^{-2}$" can be defined as a "weak anchoring film". An interface of a "film that forms a non-glide weak anchoring interface" preferably has an azimuthal anchoring energy in the range of "$6\times10^{-8}$ to $1\times10^{-6}$ $Jm^{-2}$".

<Slippery Material>

The first alignment layer may be formed as a resin film by applying a slippery material containing a monomer as the (1) low-molecular-weight lubricating interface inducer described later to a substrate and polymerizing the monomer. The resin film is preferably baked to control the azimuthal anchoring energy of the interface between the liquid crystal component and the first alignment layer.

When the slippery material contains a monomer and a photopolymerization initiator, the first alignment layer can be formed as a resin film by applying the slippery material to a substrate and photopolymerizing the monomer by UV radiation. The resin film is also preferably baked to control the azimuthal anchoring energy of the interface between the liquid crystal component and the first alignment layer.

The first alignment layer may be formed as a resin film of the (2) polymer lubricating interface inducer described later. The resin film is also preferably baked to control the azimuthal anchoring energy of the interface between the liquid crystal component and the first alignment layer.

The lubricating interface inducer preferably has a molecular structure different from that of a liquid crystal material. More specifically, the lubricating interface inducer is preferably a low-molecular-weight compound having no or one ring structure in its molecular structure. The ring structure may be the ring structure described above with respect to the liquid crystal component 13 or the liquid crystal component 13. If there are two or more ring structures, the ring structures are preferably sufficiently separated from each other by a spacer group or a linker, and consequently two or more ring structures preferably have a structure different from the core structure with two to four six-membered rings in the central portion of the molecular structure of the liquid crystal material.

When the lubricating interface inducer is a polymer compound, a structure similar to that of the low-molecular-weight compound is one desirable example. When the lubricating interface inducer is a copolymerized one (copolymer), it is sufficient if at least one of monomer components has a structure similar to that of the low-molecular-weight compound. Alternatively, when the lubricating interface inducer is a polymer compound and the liquid crystal component is a low-molecular-weight compound, any combination that causes phase separation due to a difference in molecular weight can be used even if it does not have a structure similar to that of the low-molecular-weight compound.

(1) Low-Molecular-Weight Lubricating Interface Inducer

Low-molecular-weight compounds that can be used as slippery materials include the following (1-1) to (1-20).

(1-1)

$CH_2=CH(-R^3)-COO-R^2$ ($R^2$ denotes a C1 to C20 linear or branched alkyl group, and $R^3$ denotes a hydrogen atom or a methyl group.)

Examples of the monomer (1-1) include:

2-ethylhexyl acrylate, cetyl acrylate, isoamyl acrylate, isobutyl acrylate, isodecyl acrylate, isooctyl acrylate, isostearyl acrylate, isomyristyl acrylate, lauryl acrylate, octyl/decyl acrylate, 2-ethylhexyl methacrylate, alkyl methacrylates (alkyl chain length: $C_{12}$ to $C_{13}$; Light Acrylate L-7 manufactured by Kyoeisha Chemical Co., Ltd.), alkyl methacrylates (alkyl chain length: $C_{12}$ to $C_{15}$; Light Acrylate L-8 manufactured by Kyoeisha Chemical Co., Ltd.), alkyl methacrylates (alkyl chain length: $C_{12}$ to $C_{18}$) (manufactured by Kyoeisha Chemical Co., Ltd.), alkyl methacrylates (alkyl chain length: $C_{18}$ to $C_{24}$; manufactured by Kyoeisha Chemical Co., Ltd.), butyl methacrylate, isobutyl methacrylate, isodecyl methacrylate, lauryl methacrylate, and isostearyl methacrylate.

(1-2)

Compounds in which part or all of the alkyl chains of the compounds described in (1-1) are substituted with an alkylene oxide group, such as an ethylene oxide group or a propylene oxide group.

Examples of the monomer (1-2) include:

2-ethylhexylcarbitol acrylate, 2-methoxyethyl acrylate, 3-methoxybutyl acrylate, butoxyethyl acrylate, ethoxydiethylene glycol acrylate, lauroxy poly(ethylene glycol) acrylate, methoxypropylene glycol acrylate, methoxytripropylene glycol acrylate, methoxy poly(ethylene glycol) #400 acrylate, methoxy poly(ethylene glycol) #600 acrylate, methoxytriethylene glycol acrylate, octoxy poly(ethylene glycol) #350-propylene glycol #400 acrylate, stearoxy poly(ethylene glycol) #1500 acrylate, lauroxy poly(ethylene glycol) methacrylate, methoxydiethylene glycol methacrylate, methoxytriethylene glycol methacrylate, methoxytetraethylene glycol methacrylate, methoxy poly(ethylene glycol) #400 methacrylate, methoxy poly(ethylene glycol) #1000 methacrylate, methoxy poly(ethylene glycol) #2000 methacrylate, methoxy poly(ethylene glycol) #4000 methacrylate, and octoxy poly(ethylene glycol) #350-propylene glycol #400 methacrylate.

(1-3)

Modified acrylate monomers and modified methacrylate monomers other than the compounds described in (1-2).

(1-3-1) Modified Acrylate Monomers

Examples of the modified acrylate monomers, modified diacrylate monomers, and modified triacrylate monomers include 2-acryloyloxyethyl phthalate, 2-acryloyloxyethyl-2-hydroxyethyl phthalate, 2-acryloyloxyethyl hexahydrophthalate, 2-acryloyloxypropyl phthalate, 2-ethyl-2-butyl-propanediol acrylate, 2,2-diethyl-propanediol acrylate, 2-hydroxybutyl acrylate, 2-hydroxyethyl acrylate, 2-hydroxypropyl acrylate, trimethylpropane triacrylate, and 2-propenoic acid 10-hydroxydecyl, 4-hydroxybutyl acrylate, acrylic acid dimer, fatty acid epoxy acrylate, fatty acid monoacrylate, ECH-modified allyl acrylate, benzyl acrylate, butanediol monoacrylate, caprolactone acrylate, and EO-modified cresol acrylate, cyclohexyl acrylate, dicyclopentanyl acrylate, dicyclopentenyl acrylate, dicyclopentenyloxyethyl acrylate, diethylene glycol monoethyl ether acrylate, dimethylaminoethyl acrylate, dimethylol dicyclopentane diacrylate, dipropylene glycol acrylate, ethoxylated phenyl acrylate, and isobornyl acrylate, neopentyl glycol benzoate acrylate, nonylphenoxyethylene glycol acrylate, nonylphenoxy poly(ethylene glycol) #100 acrylate, nonylphenoxy poly(ethylene glycol) #200 acrylate, nonylphenoxy poly(ethylene glycol) #400 acrylate, nonylphenoxy poly(ethylene glycol) #800 acrylate, and octafluoropentyl acrylate, paracumylphenoxyethylene glycol acrylate, perfluorooctylethyl acrylate, ECH-modified phenoxy acrylate, phenoxydiethylene glycol acrylate, phenoxyethyl acrylate, phenoxyhexaethylene glycol acrylate, phenoxytetraethylene glycol acrylate, poly(ethylene glycol #450-tetramethylene glycol #350) acrylate, and polypropylene glycol-tetramethylene glycol) acrylate, EO-modified succinic acid acrylate, t-butylcyclohexyl acrylate, tetrafluoropropyl acrylate, tetrahydrofurfuryl acrylate, caprolactone-modified tetrahydrofurfuryl acrylate, tribromophenyl acrylate, and EO-modified tribromophenyl acrylate, trifluoroethyl acrylate, urethane monoacrylate, β-carboxyethyl acrylate, ω-carboxy-polycaprolactone monoacrylate, isocyanuric acid diacrylate, 1,3-butylene glycol diacrylate, 1,4-butanediol diacrylate, EO-modified 1,6-hexanediol diacrylate, 1,6-hexanediol diacrylate, ECH-modified 1,6-hexanediol diacrylate, and allyloxy poly(ethylene glycol) acrylate, 1,9-nonanediol diacrylate, EO-3-mol-modified bisphenol A diacrylate, EO-4-mol-modified bisphenol A diacrylate, EO-7-mol-modified bisphenol A diacrylate, EO-10-mol-modified bisphenol A diacrylate, PO-4-mol-modified bisphenol A diacrylate, and 2-methyl-1,4-phenylene-bis[4-[3-(acryloyloxy)propyloxy]benzoate], EO- and PO-modified bisphenol A diacrylate, PO, tetramethylene-oxide-modified bisphenol A diacrylate, bisphenol A-diepoxy acrylate, EO-4-mol-modified bisphenol F diacrylate, diethylene glycol diacrylate, epoxy acrylate (bisphenol A type, Mw=520), epoxy acrylate (bisphenol A type, Mw=460), epoxy acrylate (PO-modified bisphenol A type, Mw=810), epoxy acrylate (bisphenol A type, Mw=560), epoxy acrylate (bisphenol F type, Mw=500), epoxy acrylate (bisphenol A type, Mw=510), epoxy acrylate (bisphenol A type, Mw=1950), and epoxy acrylate (bisphenol A type, Mw=1100), epoxy acrylate (bisphenol A type, Mw=480), epoxy acrylate (bisphenol A type, Mw=520), epoxy acrylate (soybean oil modified type), ECH-modified hexahydrophthalic acid diacrylate, hydroxypivalae neopentyl glycol diacrylate, neopentyl glycol diacrylate, EO-2-mol-modified neopentyl glycol diacrylate, PO-2-mol-modified neopentyl glycol diacrylate, caprolactone-2-mol-modified hydroxypivalate neopentyl glycol diacrylate, and caprolactone-4-mol-modified hydroxypivalate neopentyl glycol diacrylate, hydroxypivalate neopentyl glycol diacrylate, stearic acid modified pentaerythritol diacrylate, ECH-modified phthalic acid diacrylate, poly(ethylene glycol-tetramethylene glycol) diacrylate, poly(propylene glycol-tetramethylene glycol) diacrylate, polyester acrylates, poly(ethylene glycol) #200 diacrylate, poly(ethylene glycol) #300 diacrylate, and poly(ethylene glycol) #400 diacrylate, poly(ethylene glycol) #600 diacrylate, poly(ethylene glycol) #900 diacrylate, poly(ethylene glycol)-poly(propylene glycol)-poly(ethylene glycol) diacrylate, poly(propylene glycol) #300 diacrylate, poly(propylene glycol) #450 diacrylate, poly(propylene glycol) #800 diacrylate, poly(tetramethylene glycol) #650 diacrylate, ECH-modified poly(propylene glycol) #90 diacrylate, ECH-modified poly(propylene glycol) #250 diacrylate, ECH-modified poly(propylene glycol) #650 diacrylate, PO-modified bisphenol A diglycidyl ether diacrylate, silicon diacrylate (Ebecryl 350, manufactured by Daicel Chemical Industries, Ltd.), and triethylene glycol diacrylate, tetraethylene glycol diacrylate, tricyclodecane dimethanol acrylate, neopentyl glycol modified trimethylolpropane diacrylate, tripropylene glycol acrylate, EO-modified tripropylene glycol diacrylate, triglycerol diacrylate, dipropylene glycol diacrylate, zinc diacrylate, and ECH-modified glycerol triacrylate, EO-modified glycerol triacrylate, PO-modified glycerol triacrylate, pentaerythritol triacrylate, EO-modified phosphoric acid triacrylate, and trimethylolpropane triacrylate, caprolactone-modified trimethylolpropane triacrylate, HPA-modified trimethylolpropane triacrylate, EO-3-mol-modified trimethylolpropane triacrylate, EO-6-mol-modified trimethylolpropane triacrylate, EO-9-mol-modified trimethylolpropane triacrylate, PO-15-mol-modified trimethylolpropane triacrylate, EO-20-mol-modified trimethylolpropane triacrylate, PO-3-mol-modified trimethylolpropane triacrylate, PO-6-mol-modified trimethylolpropane triacrylate, trimethylolpropane benzoate acrylate, tris(acryloxyethyl) isocyanurate, alkoxy-modified trimethylolpropane triacrylate, dipentaerythritol hexaacrylate, caprolactone-2-mol-modified dipentaerythritol hexaacrylate, caprolactone-3-mol-modified dipentaerythritol hexaacrylate, and caprolactone-6-mol-modified dipentaerythritol hexaacrylate, dipentaerythritol hydroxy pentaacrylate, dipentaerythritol penta and hexaacrylate (manufactured by Toagosei Co., Ltd.), dipentaerythritol penta and hexaacrylate based polyfunctional monomer mixtures, alkyl-modified dipentaerythritol pentaacrylates, dipentaerythritol polyacrylate (Mw=570), alkyl-modified dipentaerythritol triacrylates, ditrimethylolpropane tetraacrylate, and epoxy acrylate (bisphenol A type, Mw=920), and epoxy acrylate (phosphoric acid modified type, Mw=560), pentaerythritol acrylate mixed esters, pentaerythritol ethoxy tetraacrylate, pentaerythritol tetraacrylate, silicon hexaacrylate (Ebecryl 1360, manufactured by Daicel Chemical Industries, Ltd.), lactone-modified flexible acrylates (Mw=344), lactone-modified flexible acrylates (Mw=230), lactone-modified flexible acrylates (Mw=458), amino acrylate (Ebecryl P115 manufactured by Daicel Chemical Industries, Ltd.), amino acrylate (Ebecryl 7100 manufactured by Daicel Chemical Industries, Ltd.), acryloylmorpholine, imide acrylate, imide acrylate (Aronix TO-1534, manufactured by Toagosei Co., Ltd.), imide acrylate (Aronix TO-1429, manufactured by Toagosei Co., Ltd.), imide acrylate (Aronix TO-1428, manufactured by Toagosei Co., Ltd.), and 3-(trimethoxysilyl)propyl acrylate.

Examples of fluorinated monomers include

[Chem. 15]

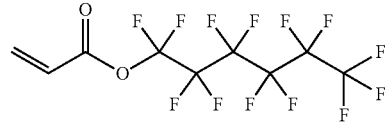

1,1,2,2,3,3,4,4,5,5,6,6-tridecafluorohexyl acrylate

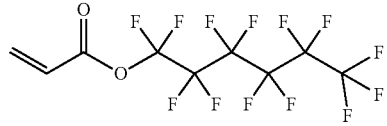

1,1,2,2,3,3,4,4,5,5,6,6,7,7,8,8,8-heptadecafluorooctyl acrylate

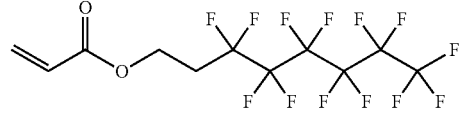

1,1,2,2,3,3,4,4,5,5,6,6-tridecafluorohexyl acrylate (1-3-2) Modified Methacrylate Monomers Examples of modified methacrylate monomers, modified dimethacrylate monomers, and modified trimethacrylate monomers include 1,3-butylene glycol dimethacrylate, 2-hydroxy-3-acryloyloxypropyl methacrylate, 2-hydroxy-3-methacroyloxypropylmethylammonium chloride, 2-hydroxybutyl methacrylate, 2-hydroxyethyl methacrylate, 2-hydroxypropyl methacrylate, 3-chloro-2-hydroxypropyl methacrylate, allyl methacrylate, benzyl methacrylate, butoxyethyl methacrylate, cyclohexyl methacrylate, dicyclopentanyl methacrylate, dicyclopentenyloxyethyl methacrylate, and diethylaminoethyl methacrylate, quaternized dimethylaminoethyl methacrylate, dimethylaminoethyl methacrylate, lactone-modified flexible methacrylate (Mw=472), lactone-modified flexible methacrylate (Mw=244), lactone-modified flexible methacrylate (Mw=358), glycerol methacrylate, glycerol polymethacrylate, glycidyl methacrylate, hexafluoropropyl methacrylate, and isobornyl methacrylate, methacrylic acid, nonylphenoxy poly(ethylene glycol #250-propylene glycol #100) methacrylate, nonylphenoxy poly(ethylene glycol) methacrylate, nonylphenoxy polypropylene glycol) methacrylate, octafluoropentyl methacrylate, pentamethylpiperidyl methacrylate, perfluorooctyl methacrylate, phenoxyethyl methacrylate, EO-modified phosphoric acid methacrylate, EO- and PO-modified phthalic acid methacrylate, and EO-modified phthalic acid methacrylate, poly(ethylene glycol)-poly(propylene glycol) methacrylate, poly(ethylene glycol #200-tetramethylene glycol #350)

methacrylate, poly(propylene glycol-tetramethylene glycol) methacrylate, poly(ethylene glycol) #150 methacrylate, poly(ethylene glycol) #300 methacrylate, poly(propylene glycol) #250 methacrylate, poly(propylene glycol) #300 methacrylate, and poly(propylene glycol) #500 methacrylate, EO-modified succinic acid methacrylate, t-butylcyclohexyl methacrylate, tetrafluoropropyl methacrylate, tetrahydrofurfuryl methacrylate, tetramethylpiperidyl methacrylate, tribromophenyl methacrylate, trifluoroethyl methacrylate, zinc methacrylate, and γ-methacryloxy trimethoxysilane, 1,4-butanediol methacrylate, 1,6-hexanediol methacrylate, 1,9-nonanediol methacrylate, 1,10-decanediol methacrylate, allyloxy poly(ethylene glycol) methacrylate, EO-2-mol-modified bisphenol A dimethacrylate, EO-4-mol-modified bisphenol A dimethacrylate, and EO-7-mol-modified bisphenol A dimethacrylate, EO-10-mol-modified bisphenol A dimethacrylate, EO-30-mol-modified bisphenol A dimethacrylate, EO- and PO-modified bisphenol A dimethacrylate, EO- and PO-modified (block type) bisphenol A dimethacrylate, PO, tetramethylene-oxide-modified bisphenol A dimethacrylate, PO-modified bisphenol A dimethacrylate, diethylene glycol dimethacrylate, ethylene glycol dimethacrylate, and ECH-modified ethylene glycol dimethacrylate, glycerol acrylate methacrylate, glycerol dimethacrylate, neopentyl glycol dimethacrylate, ECH-modified phenoxy dimethacrylate, EO-modified phosphoric acid dimethacrylate, poly(tetramethylene glycol) dimethacrylate, poly(ethylene glycol-tetramethylene glycol) dimethacrylate, polypropylene glycol-tetramethylene glycol) dimethacrylate, poly(ethylene glycol) #200 dimethacrylate, and poly(ethylene glycol) #400 dimethacrylate, poly(ethylene glycol) #600 dimethacrylate, poly(ethylene glycol) #1000 dimethacrylate, ECH-modified poly(ethylene glycol) #90 dimethacrylate, ECH-modified poly(ethylene glycol) #400 dimethacrylate, poly(ethylene glycol)-polypropylene glycol)-poly(ethylene glycol) dimethacrylate, poly(propylene glycol) #200 dimethacrylate, poly(propylene glycol) #400 dimethacrylate, PO-modified bisphenol A diglycidyl ether dimethacrylate, triethylene glycol dimethacrylate, and tetraethylene glycol dimethacrylate, zinc dimethacrylate, EO-modified phosphoric acid dimethacrylate, EO-modified tetrabromobisphenol A dimethacrylate, trimethylolpropane trimethacrylate, HPA-modified trimethyloipropane trimethacrylate, phosphorus-containing methacrylate (New Frontier S-510, manufactured by Dai-ichi Kogyo Seiyaku Co., Ltd.), and phosphorus-containing epoxy methacrylate (New Frontier S-23A, manufactured by Dai-ichi Kogyo Seiyaku Co., Ltd.), siloxane methacrylate represented by the following formula, and

[Chem. 16]

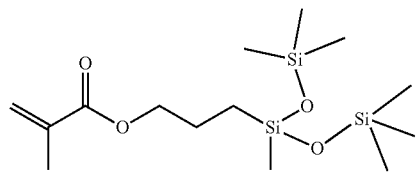

tetravalent polymerizable siloxane methacrylate represented by the following formula.

[Chem. 17]

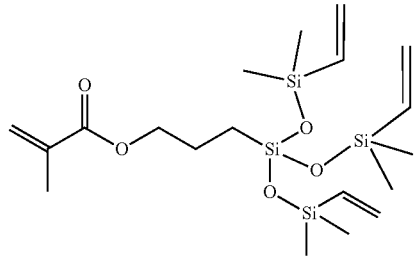

(1-4)
(1-4-1)
Compounds in which at least one of the CH$_2$=C(—R$^3$)— groups (R$^3$ denotes a hydrogen atom or an alkyl group) in the compounds described in (1-1), (1-2), and (1-3) is substituted with
an R$^{11}$—CH(—R$^3$)— group
(R$^{11}$ denotes a hydrogen atom or a C1 to C20 alkyl group, and R$^3$ denotes a hydrogen atom or an alkyl group, provided that R$^{11}$+R$^3$ is C1 to C20. R$^{11}$ and R$^3$ may be the same or different).

(1-4-2)
Compounds in which at least one of two or more CH$_2$=C(—R$^3$)— groups (R$^3$ denotes a hydrogen atom or an alkyl group) in the compounds described in (1-3) is substituted with
an R$^{11}$—CH(—R$^3$)— group
(R$^{11}$ denotes a hydrogen atom or a C1 to C20 alkyl group, and R$^3$ denotes a hydrogen atom or an alkyl group, provided that R$^{11}$+R$^3$ is C1 to C20. R$^{11}$ and R$^3$ may be the same or different), provided that at least one CH$_2$=C(—R$^3$)— group remains in the compound.

(1-5)
Examples of (meth)acrylates with two or more hydroxy groups include
diglycidyl ethers of divalent alcohols, such as propylene glycol, butanediol, pentanediol, hexanediol, diethylene glycol, dipropylene glycol, triethylene glycol, tripropylene glycol, tetraethylene glycol, polyethylene glycol), poly(propylene glycol), neopentyl glycol, hydroxypivalic acid neopentyl glycol, bisphenol A, and ethoxylated bisphenol A;

epoxy acrylate compounds produced by the addition of (meth)acrylic acid to epoxy compounds, such as triglycidyl ethers of trivalent alcohols, such as trimethylolpropane, ethoxylated trimethylolpropane, propoxylated trimethylolpropane, and glycerin, pentaerythritol tri(meth)acrylate, dipentaerythritol penta(meth)acrylate, glycerin di(meth)acrylate, trimethylolpropane di(meth)acrylate, and ditrimethylolpropane tri(meth)acrylate, and (meth)acrylic acid adducts of glycidyl (meth)acrylates derived from epoxy resins and carboxylic acids, alcohol di(meth)acrylates with a hydroxyl residue, such as trimethylolpropane di(meth)acrylate, ethoxylated trimethylolpropane di(meth)acrylate, propoxylated trimethylolpropane di(meth)acrylate, tris(2-hydroxyethyl) isocyanurate di(meth)acrylate, and glycerin di(meth)acrylate, alcohol polyfunctional (meth)acrylates with a hydroxyl residue, such as pentaerythritol di(meth)acrylate, dipentaerythritol di(meth)acrylate, ditrimethylolpropane di(meth)acrylate, pentaerythritol tri(meth)acrylate, dipentaerythritol tri(meth)acrylate, ditrimethylolpropane tri(meth)acrylate, dipentaerythritol tetra(meth)acrylate, ditrimethylolpropane tetra(meth)acrylate, dipentaerythritol hexa(meth)acrylate, and ditrimethylolpropane hexa(meth)acrylate, and (meth)acrylates produced by the addition of (meth)acrylic acid to epoxy compounds, such as poly(glycidyl ether)s of polyvalent phenols with at least one aromatic ring and alkylene oxide adducts thereof, and alicyclic epoxy acrylates as hydrogenated types of aromatic epoxy acrylates.

Examples of the polyvalent phenols include bisphenol compounds, such as bisphenol A, bisphenol F, and bisphenol S, alkylene oxide adducts of bisphenol compounds, phenol novolac, and cresol novolac.

(1-6)

Compounds in which one or two or more hydroxy groups in the compounds described in (1-5) are substituted with a hydrogen atom.

(1-7)

(1-7-1)

Compounds in which at least one of the $CH_2\!=\!C(-\!R^3)-$ groups in the compounds described in (1-5) or (1-6) is substituted with an $R^{11}\!-\!CH(-\!R^3)-$ group ($R^{11}$ denotes a hydrogen atom or a C1 to C20 alkyl group, and $R^3$ denotes a hydrogen atom or an alkyl group, provided that $R^{11}+R^3$ is C1 to C20. $R^{11}$ and $R^3$ may be the same or different).

(1-7-2)

Compounds in which at least one of two or more $CH_2\!=\!C(-\!R^3)-$ groups in the compounds described in (1-5) or (1-6) is substituted with an $R^{11}\!-\!CH(-\!R^3)-$ group ($R^{11}$ denotes a hydrogen atom or a C1 to C20 alkyl group, and $R^3$ denotes a hydrogen atom or an alkyl group, provided that $R^{11}+R^3$ is C1 to C20. $R^{11}$ and $R^3$ may be the same or different), provided that at least one $CH_2\!=\!C(-\!R^3)-$ group remains in the compound.

(1-8)

Examples of (meth)acrylates with a carboxy group include the following.

The (meth)acrylates with a carboxy group may have any number of carboxy groups per molecule due to sufficiently high hydrophilicity of the carboxy group and may have one or two or more carboxy groups.

An increased number of carboxy groups, however, results in poor solubility in solvents and increased crystallinity of the compounds. Thus, the number of carboxy groups is preferably decreased as long as resistance to adhesive materials and solvents does not decrease. In particular, compounds with a carboxy group directly bonded to an aromatic ring particularly preferably have two or less carboxy groups per molecule.

More specifically, for example, compounds with a carboxy group and at least one (meth)acryloyl group per molecule, compounds produced by the addition of an acid anhydride, such as phthalic anhydride, to a vinyl monomer with a hydroxy group, such as 2-hydroxyethyl (meth)acrylate, and benzoic acid derivatives substituted with an alkyl (oxy) group in which a (meth)acryloyloxy group is introduced into an end, such as 2-(meth)acryloyloxyethyl hexahydrophthalate, 2-acryloyloxyethyl phthalate, 2-methacryloyloxyethyl phthalate, and EO-modified succinic acid acrylate. The number of substituents may be one or more and preferably ranges from 1 to 3 in terms of the ease of synthesis. When a plurality of substituents are introduced, the substitution sites are preferably chosen to lower molecular symmetry so as not to excessively increase crystallinity. Specific examples include 2-(ω-(meth)acryloyloxyalkyl(oxy))benzoic acids, 2,3-di(ω-(meth)acryloyloxyalkyl(oxy)) benzoic acids, 2,4-di(ω-(meth)acryloyloxyalkyl(oxy))benzoic acids, 2,5-di(ω-(meth)acryloyloxyalkyl(oxy))benzoic acids, 3-(ω-(meth)acryloyloxyalkyl(oxy))benzoic acids, 3,4-di(ω-(meth)acryloyloxyalkyl(oxy))benzoic acids, and 4-(ω-(meth)acryloyloxyalkyl(oxy))benzoic acids, wherein the number of methylene groups in the alkyl chain ranges from 1 to 14, particularly preferably 2 to 10.

(1-9)

(1-9-1)

Compounds in which at least one of the $CH_2\!=\!C(-\!R^3)-$ groups in the compounds described in (1-8) is substituted with an $R^{11}\!-\!CH(-\!R^3)-$ group ($R^{11}$ denotes a hydrogen atom or a C1 to C20 alkyl group, and $R^3$ denotes a hydrogen atom or an alkyl group, provided that $R^{11}+R^3$ is C1 to C20. $R^{11}$ and $R^3$ may be the same or different).

(1-9-2)

Compounds in which at least one of two or more $CH_2\!=\!C(-\!R^3)-$ groups in the compounds described in (1-8) is substituted with an $R^{11}\!-\!CH(-\!R^3)-$ group ($R^{11}$ denotes a hydrogen atom or a C1 to C20 alkyl group, and $R^3$ denotes a hydrogen atom or an alkyl group, provided that $R^{11}+R^3$ is C1 to C20. $R^{11}$ and $R^3$ may be the same or different), provided that at least one $CH_2\!=\!C(-\!R^3)-$ group remains in the compound.

(1-10)

Examples include compounds with two or more epoxy groups, for example, diglycidyl ether compounds of aliphatic polyols, such as ethylene glycol, hexanediol, neopentyl glycol, trimethylolpropane, trimethylolethane, glycerin, pentaerythritol, sorbitol, and hydrogenated bisphenol A, poly(glycidyl ether) compounds of aromatic polyols, such as bisphenol A, bisphenol F, bisphenol S, dihydroxyphenyl ether, dihydroxybenzophenone, cresol formaldehyde resin, phenol formaldehyde, naphthol phenyl aldehyde resin, methylenebisaniline, dihydroxynaphthalene, naphthol dimers, tetramethylbiphenol, resorcin, hydroquinone, and catechol, poly(glycidyl ether) compounds of polyether polyols, such as poly(ethylene glycol), poly(propylene glycol), and poly(tetraethylene glycol), and poly(glycidyl ether) compounds of tris(2-hydroxyethyl) isocyanurate, poly(glycidyl ether) compounds of aliphatic and aromatic polycarboxylic acids, such as adipic acid, butanetetracarboxylic acid, propanetricarboxylic acid, phthalic acid, terephthalic acid, and trimellitic acid, bisepoxide compounds of hydrocarbon dienes, such as butadiene, hexadiene, octadiene, dodecadiene, cyclooctadiene, α-pinene, and vinylcyclohexene, and alicyclic polyepoxy compounds, such as bis(3,4-epoxycyclohexylmethyl) adipate and 3,4-epoxycyclohexylmethyl-3,4-epoxycyclohexyl carboxylate.

These epoxy compounds may be used alone or in combination.

These epoxy compounds may have any molecular weight and any other physical properties and typically have a molecular weight in the range of approximately 100 to 3000 in terms of the ease of blending.

(1-11)

Compounds in which one or more epoxy groups in the compounds described in (1-10) are substituted with C=C or C—C, provided that at least one epoxy group remains in the compound.

(1-12)

Monomer compounds that can be used as lubricating interface inducers may be monomers represented by P-R (P denotes a polymerizable group, R denotes a linear or branched alkyl group having 1 to 0 carbon atoms, and nonadjacent —CH$_2$— in the alkyl group may be substituted with —COO—, —OCO—, —CO—, —CH=CH—, —C≡C—, —O—, or —CH(O)CH—). Examples of the polymerizable group P include the polymerizable groups represented by the following formulae (III-1) to (III-17) (the broken line denotes a bond to another organic group, and R independently denotes a hydrogen atom or an alkyl group having 1 to 5 carbon atoms).

[Chem. 18]

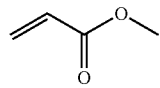 (III-1)

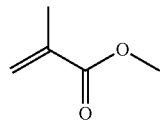 (III-2)

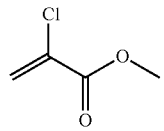 (III-3)

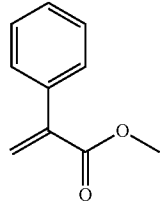 (III-4)

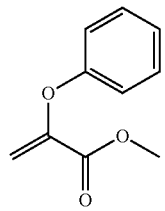 (III-5)

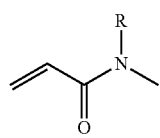 (III-6)

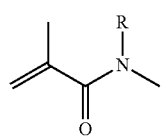 (III-7)

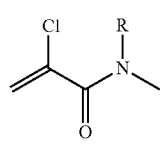 (III-8)

-continued

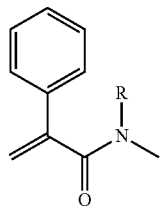 (III-9)

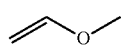 (III-10)

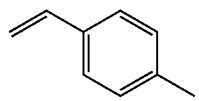 (III-11)

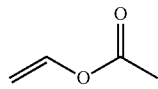 (III-12)

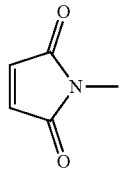 (III-13)

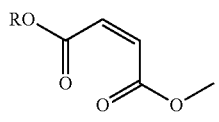 (III-14)

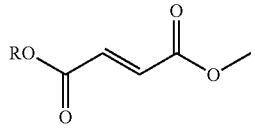 (III-15)

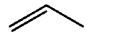 (III-16)

 (III-17)

The use of the monomers having alkyl chains with different lengths belonging to the class (1-12) results in a rough interface in contact with the liquid crystal component and a poorly ordered liquid crystal compound and a broken liquid crystal phase near the rough interface, thus forming a slippery interface.

(1-13)

A monomer compound that can be used as a lubricating interface inducer may be a monomer represented by P-Sp-Zm (P denotes a polymerizable group, Sp denotes a spacer group, and Zm denotes a mesogenic group). Examples of the polymerizable group P include the polymerizable groups represented by the formulae (III-1) to (III-17). Examples of the spacer group Sp include the same divalent groups as Sp1 described later. Examples of the mesogenic group Zm include the mesogenic group represented by the following formula.

[Chem. 19]

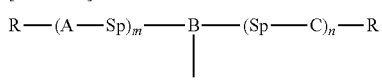

(R independently denotes a hydrogen atom, an alkyl group, or a halogen atom, a hydrogen in the alkyl group may be substituted with a halogen atom, nonadjacent —CH$_2$— in the alkyl group may be substituted with —COO—, —OCO—, —CO—, —CH=CH—, —C≡C—, —O—, or —CH(O)CH—, A and C independently denote a divalent cyclic group, B denotes a trivalent cyclic group, A, B, and C may have a substituent, Sp independently denotes a spacer group, and m and n independently denote an integer in the range of 0 to 5.)

A monomer with the mesogenic group belonging to the class (1-13) is bonded to a main chain at a meta or ortho position via a spacer group like the trivalent cyclic group B. In contrast, in typical liquid crystal molecules, ring structures are linked at the para position because linearity is regarded as important. This can make the liquid crystal phase unstable and form a slippery interface.

(1-14)

A monomer compound that can be used as a lubricating interface inducer may be a monomer represented by P-Sp-Zp (P denotes a polymerizable group, Sp denotes a spacer group, and Zp denotes a photoisomerizable group). Examples of the polymerizable group P include the polymerizable groups represented by the formulae (III-1) to (III-17). Examples of the spacer group Sp include the same divalent groups as Sp1 described later. Examples of the photoisomerizable group Zp include groups with an azobenzene structure. More specifically, examples of the groups with the azobenzene structure include the divalent groups represented by the following general formulae (P-a-1) to (P-d-8). Other examples of the Zp include the divalent groups represented by the general formulae (P-e-1) to (P-e-7).

[Chem. 20]

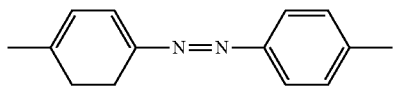
(P-a-1)

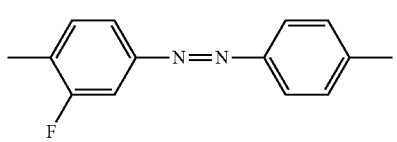
(P-a-2)

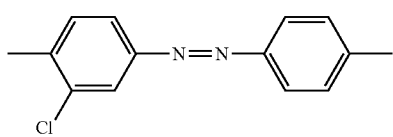
(P-a-3)

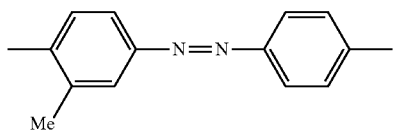
(P-a-4)

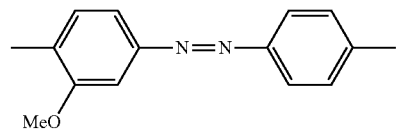
(P-a-5)

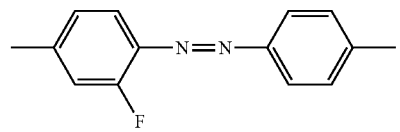
(P-a-6)

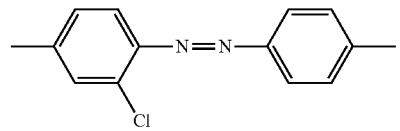
(P-a-7)

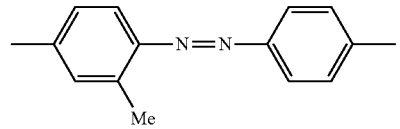
(P-a-8)

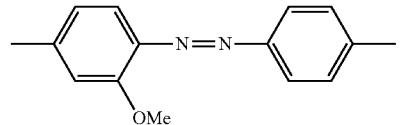
(P-a-9)

[Chem. 21]

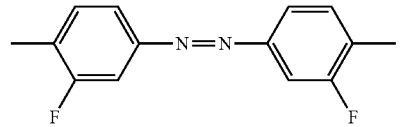
(P-b-1)

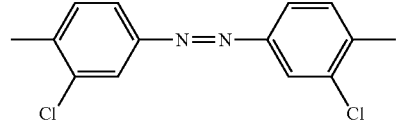
(P-b-2)

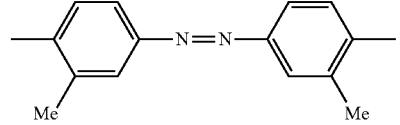
(P-b-3)

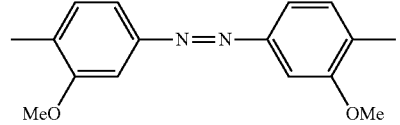
(P-b-4)

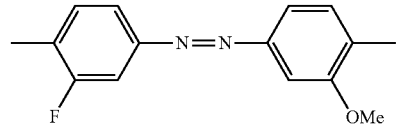
(P-b-5)

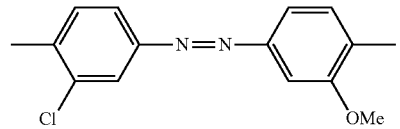
(P-b-6)

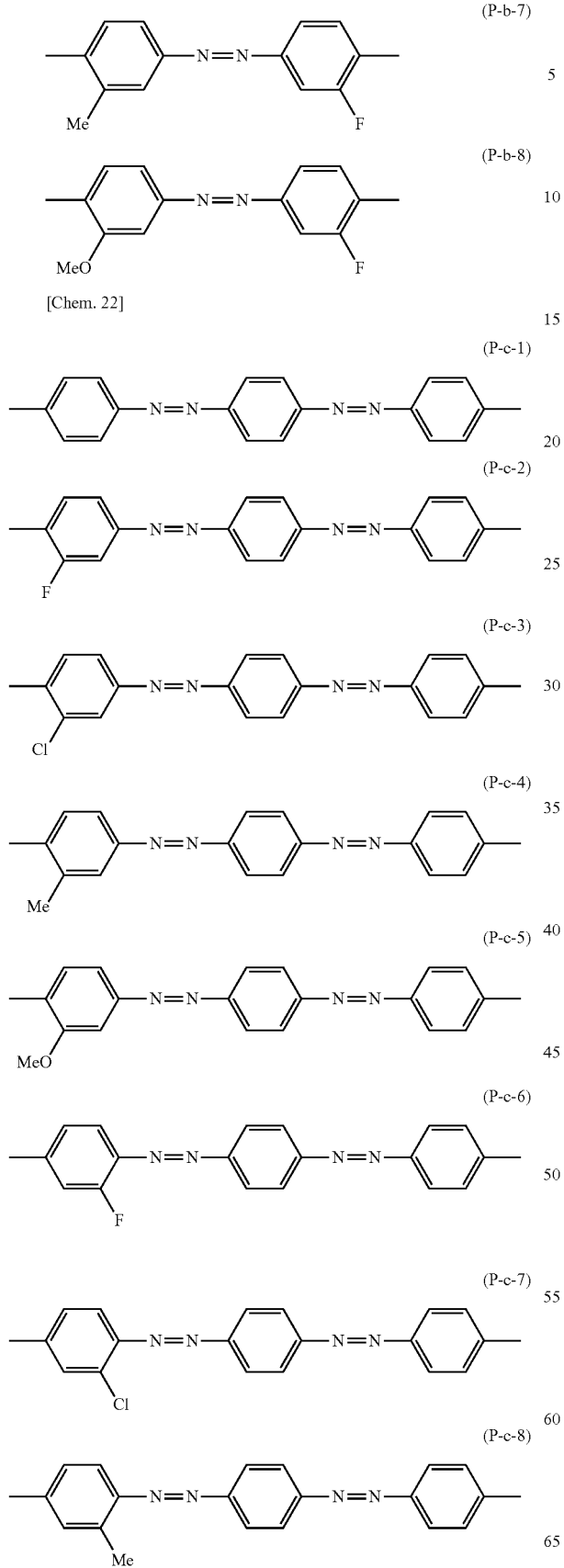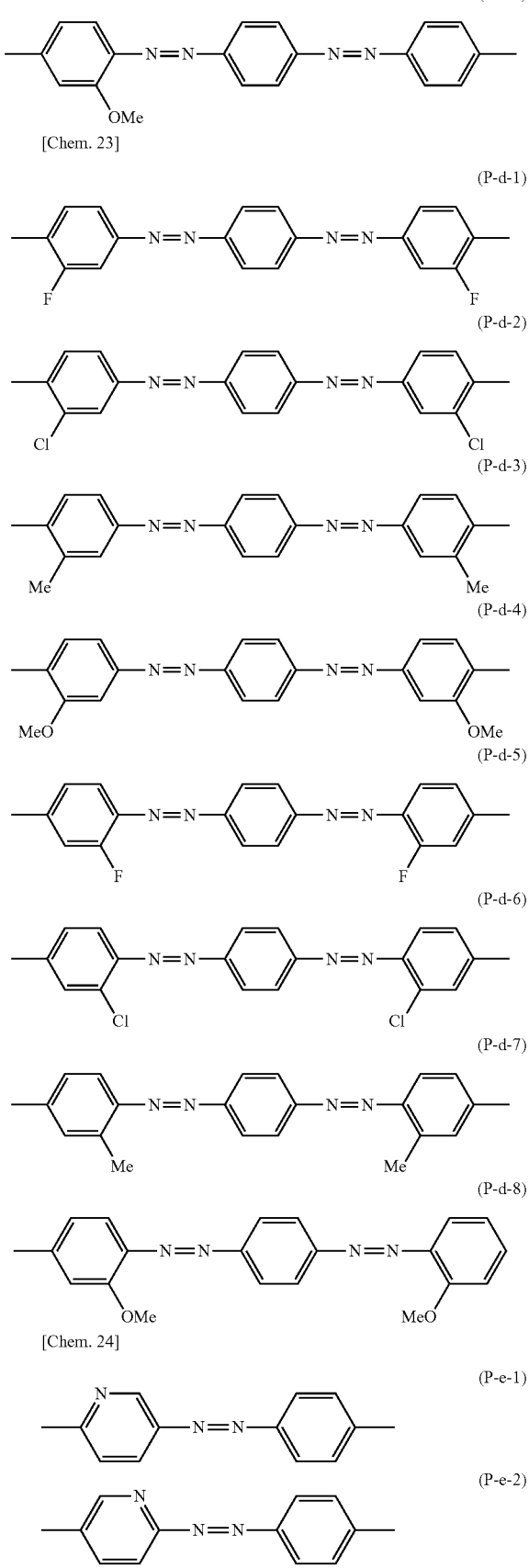

-continued

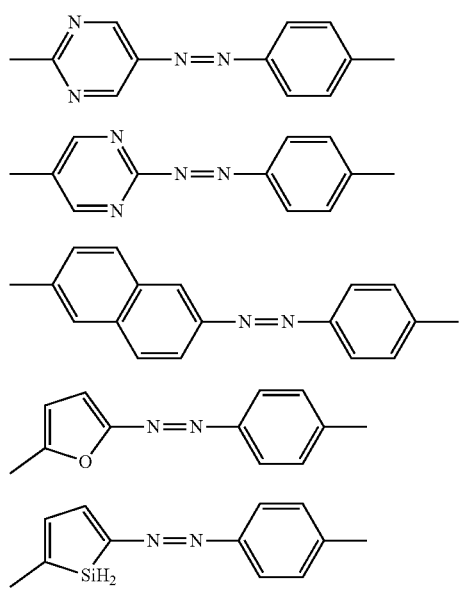

Cis-trans photoisomerization of the azobenzene structure can disturb the orientational order of liquid crystals and form a slippery interface. Thus, it is possible to control the slippery state by UV radiation at a photoisomerization wavelength. Thus, local control is also possible.

(1-15)

Specific examples of the compounds described in (1-1) to (1-14) include methyl (meth)acrylate, ethyl (meth)acrylate, 2-hydroxyethyl acrylate, propyl (meth)acrylate, 2-hydroxypropyl (meth)acrylate, butyl (meth)acrylate, tert-butyl (meth)acrylate, tridecyl (meth)acrylate, isobutyl (meth)acrylate, 4-hydroxybutyl (meth)acrylate, 2-hydroxybutyl (meth)acrylate, octyl (meth)acrylate, 2-ethylhexyl (meth)acrylate, dodecyl (meth)acrylate, stearyl (meth)acrylate, cetyl (meth)acrylate, behenyl (meth)acrylate, cyclohexyl (meth)acrylate, dicyclopentanyloxyethyl (meth)acrylate, isobornyloxyethyl (meth)acrylate, isobornyl (meth)acrylate, adamantyl (meth)acrylate, dimethyladamanzyl (meth)acrylate, dicyclopentanyl (meth)acrylate, dicyclopentenyl (meth)acrylate, methoxyethyl (meth)acrylate, ethylcarbitol (meth)acrylate, tetrahydrofurfuryl (meth)acrylate, benzyl (meth)acrylate, and phenoxyethyl (meth)acrylate, 2-phenoxydiethylene glycol (meth)acrylate, 2-hydroxy-3-phenoxypropyl (meth)acrylate, (2-methyl-2-ethyl-1,3-dioxolane-4-yl)methyl (meth)acrylate, (3-ethyloxetane-3-yl)methyl (meth)acrylate, o-phenylphenolethoxy (meth)acrylate, dimethylamino (meth)acrylate, diethylamino (meth)acrylate, 2,2,3,3,3-pentafluoropropyl (meth)acrylate, 2,2,3,4,4,4-hexafluorobutyl (meth)acrylate, 2,2,3,3,4,4,4-heptafluorobutyl (meth)acrylate, 2-(perfluorobutyl)ethyl (meth)acrylate, 2-(perfluorohexyl)ethyl (meth)acrylate, 1H,1H,3H-tetrafluoropropyl (meth)acrylate, 1H,1H,5H-octafluoropentyl (meth)acrylate, 1H,1H,7H-dodecafluoroheptyl (meth)acrylate, 1H-1-(trifluoromethyl)trifluoroethyl (meth)acrylate, 1H,1H,3H-hexafluorobutyl (meth)acrylate, 1,2,2,2-tetrafluoro-1-(trifluoromethyl)ethyl (meth)acrylate, 1H,1H-pentadecafluorooctyl (meth)acrylate, 1H,1H,2H,2H-tridecafluorooctyl (meth)acrylate, 2-(meth)acryloyloxyethylphthalic acid, 2-(meth)acryloyloxyethylhexahydrophthalic acid, monovalent epoxy (meth)acrylates, such as glycidyl (meth)acrylate, and 2-(meth)acryloyloxyethyl phosphoric acid, mono(meth)acrylates, such as 4-acryloylmorpholine, dimethyl(meth)acrylamide, dimethylaminopropyl(meth)acrylamide, isopropyl(meth)acrylamide, diethyl(meth)acrylamide, hydroxyethyl(meth)acrylamide, N-dodecyl(meth)acrylamide, and N-acryloyloxyethylhexahydrophthalimide, and di(meta)acrylates, such as 1,4-butanediol di(meth)acrylate, 1,6-hexanediol di(meth)acrylate, 1,9-nonanediol di(meth)acrylate, neopentyldiol di(meth)acrylate, poly(ethylene glycol) (meth)acrylate, poly(propylene glycol) #400 (meth)acrylate, poly(propylene glycol) #600 (meth)acrylate, poly(propylene glycol) #800 (meth)acrylate, tripropylene glycol di(meth)acrylate, ethylene glycol di(meth)acrylate, diethylene glycol di(meth)acrylate, triethylene glycol di(meth)acrylate, ethylene-oxide-modified bisphenol A di(meth)acrylate, tricyclodecanedimethanol di(meth)acrylate, 9,9-bis[4-(2-acryloyloxyethoxy)phenyl]fluorene, glycerin di(meth)acrylate, 2-hydroxy-3-acryloyloxypropyl methacrylate, acrylic acid adducts of 1,6-hexanediol diglycidyl ether, and acrylic acid adducts of 1,4-butanediol diglycidyl ether, and tri(meth)acrylates, such as trimethylolpropane tri(meth)acrylate, ethoxylated isocyanuric acid triacrylate, pentaerythritol tri(meth)acrylate, and ε-caprolactone-modified tris-(2-acryloyloxyethyl) isocyanurate, tetra(meth)acrylates, such as pentaerythritol tetra(meth)acrylate and ditrimethylolpropane tetra(meth)acrylate, dipentaerythritol hexa(meth)acrylate, oligomer type (meth)acrylates, various urethane acrylates, various macromonomers, epoxy compounds, such as ethylene glycol diglycidyl ether, diethylene glycol diglycidyl ether, polypropylene glycol diglycidyl ether, neopentyl glycol diglycidyl ether, 1,6-hexanediol diglycidyl ether, glycerin diglycidyl ether, and bisphenol A diglycidyl ether, maleimides, ethyl laurate, ester compounds, such as tridecyl acetate, and poly(alkylene oxide)s (the number of carbon atoms in the alkylene group preferably ranges from 2 to 20), such as polyethylene glycol) and polypropylene glycol.

Monomers as low-molecular-weight lubricating interface inducers include the monomers (1-1) to (1-15). To decrease the affinity for liquid crystal molecules, monomers with a glycol backbone or a hydroxy group or both are preferred, and the number-average molecular weight of each monomer preferably ranges from 100 to 4500, more preferably 300 to 2500, particularly preferably 400 to 1500.

When a low-molecular-weight lubricating interface inducer with a number-average molecular weight in the range of 400 to 1500 is used, a resin film formed by photopolymerization on a first substrate is preferably baked at a temperature in the range of 100° C. to 160° C.

(1-16)

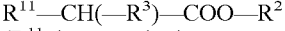

($R^{11}$ denotes a hydrogen atom or a C1 to C20 alkyl group, $R^2$ denotes a C1 to C20 alkyl group, and $R^3$ denotes a hydrogen atom or an alkyl group, provided that $R^{11}+R^3$ is C1 to C20. $R^{11}$, $R^2$, and $R^3$ may be the same or different.)

(1-17)

Compounds in which part or all of the alkyl chains of the compounds described in (1-16) are substituted with an alkylene oxide group, such as an ethylene oxide group or a propylene oxide group.

(1-18)
Fluorinated lubricants and fluorinated surfactants
Examples of fluorinated lubricants include the following.

[Chem. 25]

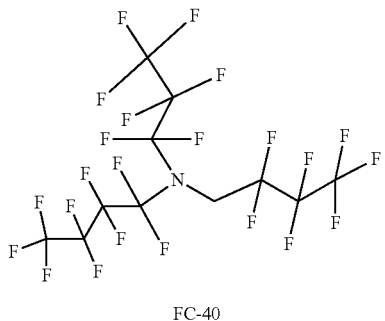

FC-40

Examples of fluorinated surfactants include the following.

[Chem. 26]

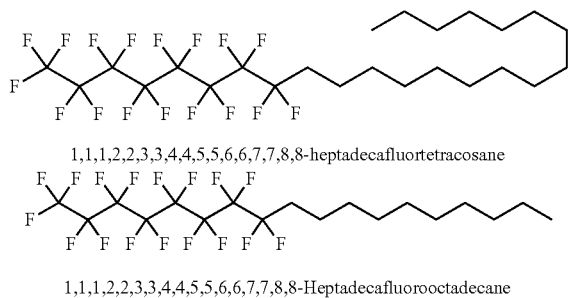

1,1,1,2,2,3,3,4,4,5,5,6,6,7,7,8,8-heptadecafluortetracosane 1,1,1,2,2,3,3,4,4,5,5,6,6,7,7,8,8-Heptadecafluorooctadecane (1-19)
Examples of glycol lubricants include hexaethylene glycol dimethyl ether, tetraethylene glycol dimethyl ether, triethylene glycol dimethyl ether, and dipropylene glycol dimethyl ether.

Examples of glycol surfactants include hexaethylene glycol dimethyl ether, tetraethylene glycol dimethyl ether, triethylene glycol dimethyl ether, and dipropylene glycol dimethyl ether.

(1-20)
Examples of amide lubricants include N,N-dimethylmethaneamide, N,N-dimethyldodecaneamide, N,N'-diacetyl-1,6-diaminohexane, and N-palmitoylisopropylamide.

(Polymerization Initiator)
If necessary, the slippery material may contain a polymerization initiator. For example, when a polymerizable compound is polymerized by radical polymerization, a thermal polymerization initiator or a photopolymerization initiator may be added as a radical polymerization initiator.

More specifically, the following compounds are preferably used:

acetophenones, such as diethoxyacetophenone, 2-hydroxy-2-methyl-1-phenylpropan-1-one, benzyl dimethyl ketal, 1-(4-isopropylphenyl)-2-hydroxy-2-methylpropan-1-one, 1-[4-(2-hydroxyethoxy)-phenyl]-2-hydroxy-2-methyl-1-propan-1-one, 4-(2-hydroxyethoxy)phenyl-(2-hydroxy-2-propyl) ketone, 1-hydroxycyclohexyl-phenylketone, 2-methyl-2-morpholino(4-thiomethylphenyl) propan-1-one, 2-benzyl-2-dimethylamino-1-(4-morpholinophenyl)-butanone, 1-[4-(4-benzoylphenylsulfanyl)phenyl]-2-methyl-2-(4-methylphenylsulfonyl) propan-1-one, 2-(dimethylamino)-2-[(4-methylphenyl)methyl]-1-[4-(4-morpholinyl)phenyl]-1-butanone, oligo(2-hydroxy-2-methyl-1-[4-(1-methyl vinyl)phenyl]propanone), and 2-hydroxy-1-{4-[4-(2-hydroxy-2-methylpropionyl)phenoxy]phenyl}-2-methylpropanone;

benzoins, such as benzoin, benzoin methyl ether, benzoin isopropyl ether, and benzoin isobutyl ether;

acylphosphine oxides, such as bis(2,4,6-trimethylbenzoyl)phenylphosphine oxide and 2,4,6-trimethylbenzoyldiphenylphosphine oxide;

benzyl and methyl phenylglyoxylates;

benzophenones, such as benzophenone, methyl o-benzoylbenzoate, 4-phenylbenzophenone, 4,4'-dichlorobenzophenone, hydroxybenzophenone, 4-benzoyl-4'-methyl-diphenylsulfide, acrylated benzophenone, 3,3',4,4'-tetra(t-butylperoxycarbonyl)benzophenone, and 3,3'-dimethyl-4-methoxybenzophenone;

oxime esters, such as 1,2-octanedione-1-[4-(phenylthio) phenyl]-2-(O-benzoyloxime), and ethanone-1-[9-ethyl-6-(2-methylbenzoyl)-9H-carbazole-3-yl]-1-(O-acetyloxime), thioxanthones, such as 2-isopropylthioxanthone, 2,4-dimethylthioxanthone, 2,4-diethylthioxanthone, and 2,4-dichlorothioxanthone;

ketosulfones, such as 1-[4-(4-benzoylphenylsulfanyl)phenyl]-2-methyl-2-(4-methylphenylsulfonyl)propan-1-one; and 10-butyl-2-chloroacridone, 2-ethylanthraquinone, 9,10-phenanthrenequinone, and camphorquinone.

The photopolymerization initiator content preferably ranges from 0.1% to 10% by mass, more preferably 0.5% to 6% by mass, particularly preferably 0.5% to 4% by mass, of the total amount of monomers contained in the slippery material.

A sensitizer as well as a photopolymerization initiator may be contained. Examples of the sensitizer include amines that do not cause an addition reaction with monomers, such as trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino) benzophenone.

(Solvent)
The slippery material may contain a solvent as required to uniformly form the first alignment layer and preferably contains a solvent to be a low viscosity material.

Examples of the solvent include N-methyl-2-pyrrolidone (NMP), N-ethyl-2-pyrrolidone and γ-butyrolactone, 1-hexanol, cyclohexanol, 1-propanol, 2-propanol, 1,2-ethanediol, 1,2-propanediol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol dimethyl ether, propylene glycol monomethyl ether, propylene glycol monoethyl ether and propylene glycol monobutyl ether, propylene glycol diacetate, propylene glycol monomethyl ether acetate, dipropylene glycol methyl ether acetate, 1,4-butanediol diacetate, 1,3-butylene glycol diacetate, 1,6-hexanediol diacetate, N,N-dimethylformamide, N,N-dimethylacetamide, dimethyl sulfoxide, 1,3-dimethyl-imidazolidinone, methyl ethyl ketone, methyl isobutyl ketone, cyclohexanone, cyclopentanone, 4-hydroxy-4-methyl-2-pentanone, toluene, methyl acetate, ethyl acetate, and propyl acetate. These solvent may be used alone or in combination.

The solvent is preferably at least one selected from the group consisting of N-methyl-2-pyrrolidone, propylene glycol monomethyl ether acetate, methyl isobutyl ketone, cyclohexanone, cyclopentanone, and toluene in terms of the solubility of the slippery material, wettability to a base material, and solvent volatility.

When the slippery material contains a solvent, the solvent content preferably ranges from 70% to 99% by mass, more preferably 80% to 97% by mass, particularly preferably 85% to 95% by mass, of 100% by mass of the slippery material.

(2) Polymer Lubricating Interface Inducer

Examples of the polymer lubricating interface inducer that can form a first alignment layer include the following (2-1) to (2-6).

(2-1)

(1) Among the compound examples of the low-molecular-weight lubricating interface inducer, homopolymers of those possessing a polymerizable group, and block, random, and alternating copolymers containing the polymerized compound examples as part of the copolymers.

They may be those produced by the polymerization of a monomer corresponding to each of the compounds described in (1-1) to (1-15) and may be independent homopolymers, copolymers produced by the copolymerization of a plurality of monomers belonging to any of the classes, or copolymers produced by the copolymerization of monomers of a plurality of classes. For example, two or three or more monomers belonging to the class (1-12) may be copolymerized, two or three or more monomers belonging to the class (1-13) may be copolymerized, or two, three, four or more monomers belonging to the class (1-13) and two or three or more monomers belonging to the class (1-14) may be copolymerized.

Copolymerization of two or three or more monomers belonging to the class (1-12) can produce a polymer compound with two or three or more long-chain alkyl side chains.

Polymerization of a monomer with a mesogenic group belonging to the class (1-13) can produce a polymer compound with a mesogenic group in a side chain.

Polymerization of a monomer with a photoisomerizable group belonging to the class (1-14) can produce a polymer compound with a photoisomerizable group in a side chain.

(2-2)

Poly(alkylene glycol)s, such as polyethylene glycol) and poly(propylene glycol) (the number of carbon atoms in the alkylene group preferably ranges from 2 to 20)

(2-3)

Block, random, and alternating copolymers having, as part of the polymer, one or more poly(alkylene glycol)s, such as poly(ethylene glycol) and poly(propylene glycol) (the number of carbon atoms in the alkylene group preferably ranges from 2 to 20)

(2-4)

Those having a side-chain-type liquid crystal component as one component of a copolymer of the compounds described in (2-1) or (2-3). The liquid crystal structure of the side-chain-type liquid crystal component is the exemplified liquid crystal structure directly bonded to a polymerizable group or bonded to a polymerizable group via a spacer group, such as an alkylene group.

(2-5)

Polymers having the following group in a side chain or a main chain

[Chem. 27]

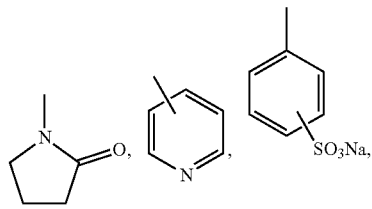

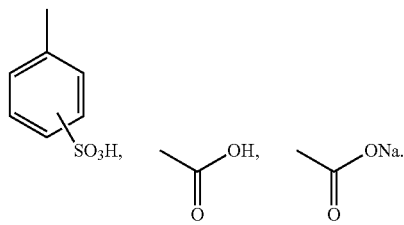

For example, polymers with an amide group include polyvinylpyrrolidone and polyacrylamide.

Polymers with a pyridyl group include poly(2-vinylpyridine), poly(4-vinylpyridine), 2-vinylpyridine/styrene copolymers, 4-vinylpyridine/styrene copolymers, and 4-vinylpyridine/methacrylate copolymers. Polymers with a sulfa group include poly(vinylsulfonic acid) and sodium salts thereof and poly(p-styrenesulfonic acid) and sodium salts thereof.

Polymers with a carboxy group include poly(acrylic acid) and sodium salts thereof, poly(methacrylic acid) and sodium salts thereof, acrylic acid/acrylamide copolymers and sodium salts thereof, acrylic acid/maleic acid copolymers and sodium salts thereof, ethylene/acrylic acid copolymers, acrylonitrile/acrylic acid copolymers, poly(maleic acid), styrene/maleic acid copolymers and sodium salts thereof, isobutylene/maleic acid copolymers and sodium salts thereof, styrenesulfonic acid/maleic acid copolymers and sodium salts thereof, methyl vinyl ether/maleic acid copolymers, and vinyl chloride/vinyl acetate/maleic acid copolymers.

(2-6)

Siloxane Oligomers and Polymers

As shown in Table 1, siloxane has four constitutional units with different number of siloxane bonds and different number of organic substituents: M unit ($R_3SiO_{1/2}$), D unit ($R_2SiO_{2/2}$), T unit ($RSiO_{3/2}$), and Q unit ($SiO_{4/2}$). The M unit, D unit, T unit, and Q unit can be freely combined to produce the oligomers and polymers.

TABLE 1

| | M unit | D unit | T unit | Q unit |
|---|---|---|---|---|
| Structure | R—Si(R)(R)—O— | —O—Si(R)(R)—O— | —O—Si(R)(O)—O— | —O—Si(O)(O)—O— |

The siloxane oligomers and polymers can be produced by hydrolysis and condensation of the following silane derivative.

(X: OR' or Cl, n=0, 1, 2, or 3.

R: an alkyl group or an aromatic group, preferably, a methyl group, an ethyl group, a propyl group, a butyl group, a glycidyl group, a 3-glycidyloxypropyl group, an epoxy group, a phenyl group, or a substituted phenyl group.

R': an alkyl group, preferably, a methyl group, an ethyl group, a propyl group, or a butyl group.

R and R' may be the same or different.)

The silane derivative with n=3 can be used as a raw material to produce an oligomer or polymer composed of the M unit. The silane derivative with n=2 can be used as a raw material to produce an oligomer or polymer composed of the D unit. The silane derivative with n=1 can be used as a raw material to produce an oligomer or polymer composed of the T unit. The silane derivative with n=0 can be used as a raw material to produce an oligomer or polymer composed of the Q unit.

The oligomer or polymer may be a homopolymer composed of one constitutional unit or a copolymer composed of two or more different constitutional units or composed of two or more constitutional units selected from the same constitutional units with two different structures. The oligomer or polymer may be composed only of the constitutional unit or may be a copolymer containing the constitutional unit. Two or more oligomers and/or polymers may be mixed.

The oligomer or polymer preferably has the T unit as the constitutional unit. A component having the T unit as a main constitutional unit may be known silsesquioxane with a random structure, a ladder structure, a cage structure, or a combined structure thereof. An oligomer or polymer with a combined structure of the T unit and another unit is also suitably used in terms of the ease of synthesis of the slippery material or the reliability and stability of the slippery material. The oligomer or polymer is preferably a copolymer with a combined structure of the T unit and the D unit. An oligomer or polymer containing the T unit of a copolymer produced by using the silane derivative with different Rs as a raw material is also suitably used.

The optical device according to the first embodiment can be produced by supplying a liquid crystal component between a pair of substrates, at least one of which has an electrode. A non-glide weak anchoring interface can be formed at the interface between the liquid crystal component and the first alignment layer.

FIG. 3(a) is a schematic view of an optical device that includes the first substrate 11 having interdigitated electrodes 18 and 19 on the surface and the second substrate 12 without an electrode. FIG. 3(b) is a schematic view of the optical device to which an electric field is applied. In FIG. 3(b), the dotted line indicates the direction of the generated electric field. In FIGS. 3(a) and 3(b), the constituents already shown in the other figures are denoted by the same reference numerals and are not described in detail below.

In an optical device according to the present invention, the second substrate may have a color filter, and a driving voltage may be applied to the first electrode and the second electrode via a thin-film transistor (TFT). This enables the formation of pixels and the application to spatial modulation devices and liquid crystal displays.

Figure 4:
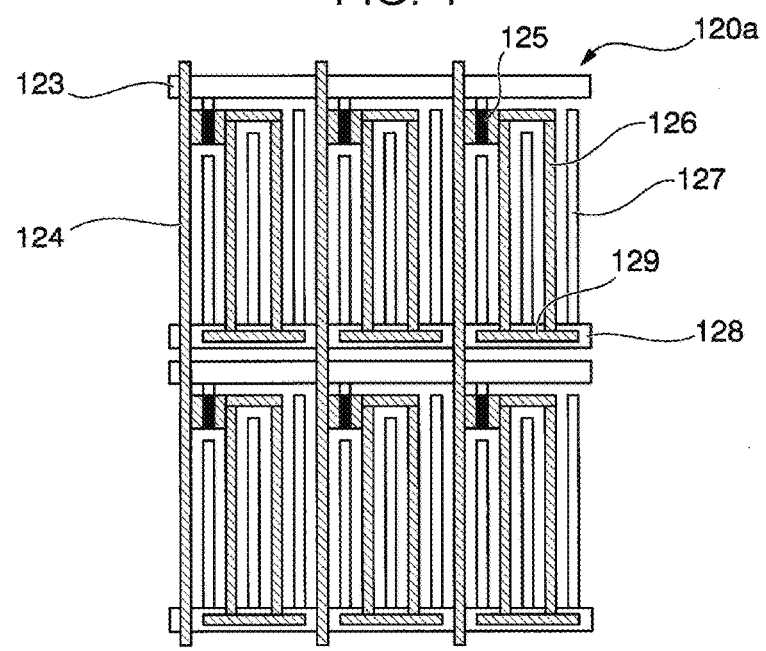
FIG. 4 is a schematic plan view of an active-matrix substrate 120a of a liquid crystal panel of a transverse electric field type.

For example, an optical device according to the present invention can be applied to a transverse electric field type liquid crystal display. FIG. 4 schematically illustrates an active-matrix substrate 120a of a liquid crystal panel of the transverse electric field type.

Approximately parallel scanning wires 123, signal wires 124 crossing the scanning wires 123, a thin-film transistor (TFT) 125 electrically connected to a corresponding scanning wire 123 and a corresponding signal wire 124, and a pixel electrode 126 electrically connected to the TFT 125 are formed on the active-matrix substrate 120a. The pixel electrode 126 has a comb-like shape approximately parallel to the signal wires 124.

An interdigitated common electrode 127 approximately parallel to the pixel electrode 126 is also formed on the active-matrix substrate 120a. The common electrode 127 extends from a common wire 128 approximately parallel to the scanning wires 123. The common wire 128 faces an auxiliary capacity electrode 129 formed of the same electrically conductive layer as the pixel electrode 126 with an insulating film (not shown) interposed therebetween and constitutes auxiliary capacity.

A horizontally aligned first alignment layer is formed on the surface of the active-matrix substrate 120a in FIG. 4, and the interface between the liquid crystal component and the first alignment layer forms a non-glide weak anchoring interface. A horizontally aligned first alignment layer is also formed on the surface of a color filter substrate 120b facing the active-matrix substrate 120a.

The pixel electrode 126 and the common wire 128 may be an opaque metal electrode (for example, aluminum, titanium, copper, etc.) or a transparent electrode (ITO, IZO).

A liquid crystal component 33 can be supplied between the active-matrix substrate 120a and the color filter substrate 120b to produce a liquid crystal display 60.

In a liquid crystal display of the transverse electric field type, for example, liquid crystal molecules in the liquid crystal component have positive dielectric anisotropy and change their alignment directions during voltage application due to a transverse electric field (an electric field parallel to the active-matrix substrate 120a and the color filter substrate 120b) generated between the pixel electrode 126 and the common electrode 127. In the display apparatus of the transverse electric field type, liquid crystal molecules change their alignment directions in a plane parallel to the active-matrix substrate 120a and the color filter substrate 120b and achieve good viewing angle characteristics.

Liquid crystals with negative dielectric anisotropy can also be used. In such a case, the initial alignment direction must be rotated 90 degrees. Liquid crystals with negative dielectric anisotropy generally tend to have lower responsivity than liquid crystals with positive dielectric anisotropy. When liquid crystals with negative dielectric anisotropy are used, however, due to a small out-of-plane component of the alignment deformation caused by the electric field of the liquid crystals, the viewing angle characteristics are further improved, and it is therefore desirable to select them appropriately.

Figure 5:
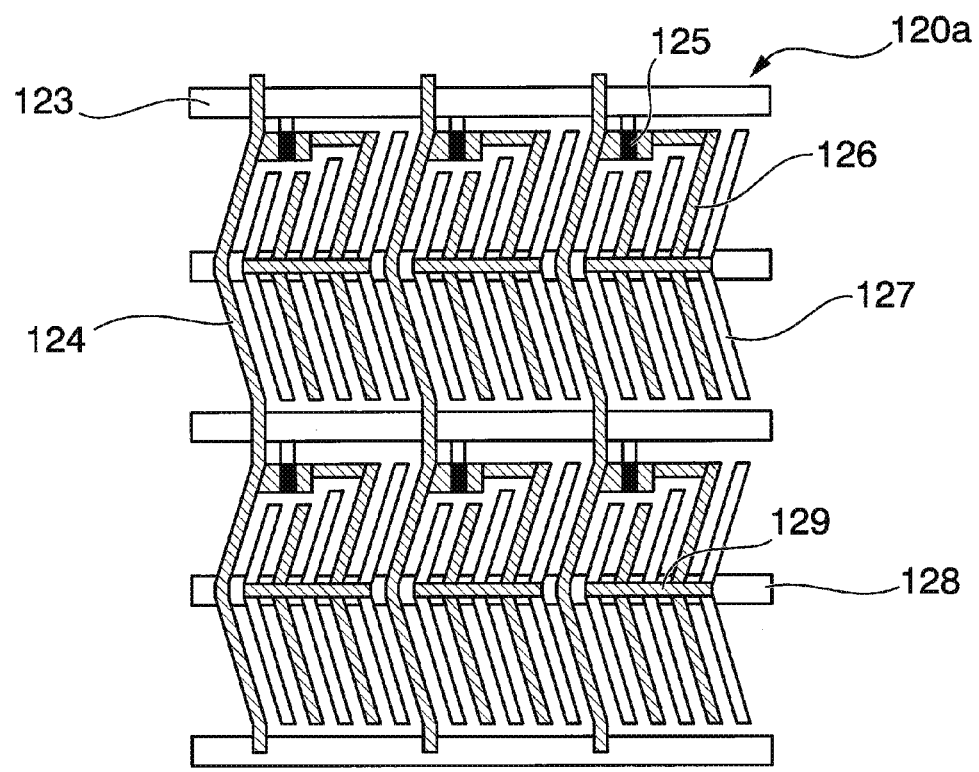
FIG. 5 is a schematic plan view of an active-matrix substrate 120a of a liquid crystal panel of a transverse electric field type.

When the pixel electrode 126 and the common electrode 127 have a bent shape, as in the active-matrix substrate 120a illustrated in FIG. 5, a coloration phenomenon at an oblique viewing angle can be suppressed.

Figure 6:
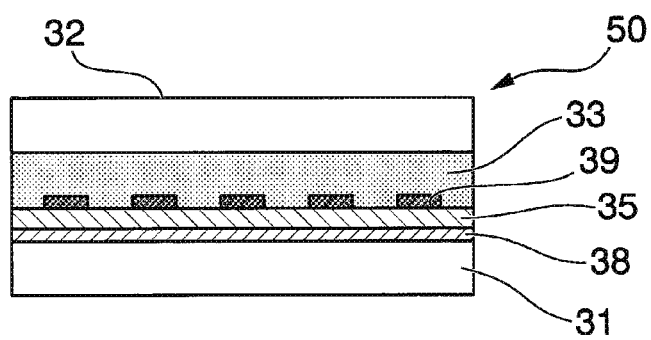
FIG. 6 is a schematic cross-sectional view of an optical device of a fringe field type.

An optical device according to the present invention may be a fringe field type (FIG. 6) in which a first electrode 38 and a second electrode 39 generate a fringing field between a pair of substrates 31 and 32, and can achieve low-voltage drivability, high-speed responsivity, and wide viewing angle characteristics.

In the fringe field type (FIG. 6), the first electrode 38 (common electrode) is located under an insulating film 35 ($SiN_x$ or $SiO_x$), and the second electrode 39 (pixel electrode) is located on top of the insulating film 35.

Depending on wiring, the vertical relationship between the common electrode and the pixel electrode can be inverted. To ensure at least light-transmitting properties, the lower electrode needs to be a transparent electrode, such as ITO or IZO.

Also in this case, when the pixel electrode 126 and the common electrode 127 have a bent shape, as in the active-matrix substrate 120a illustrated in FIG. 5, a coloration phenomenon at an oblique viewing angle can be suppressed.

[Refresh Driving Method for Optical Device]

The present embodiment of the invention provides a refresh driving method for the optical device including applying the driving voltage until a maximum transmittance is obtained, and subsequently stopping voltage application.

Figure 7:
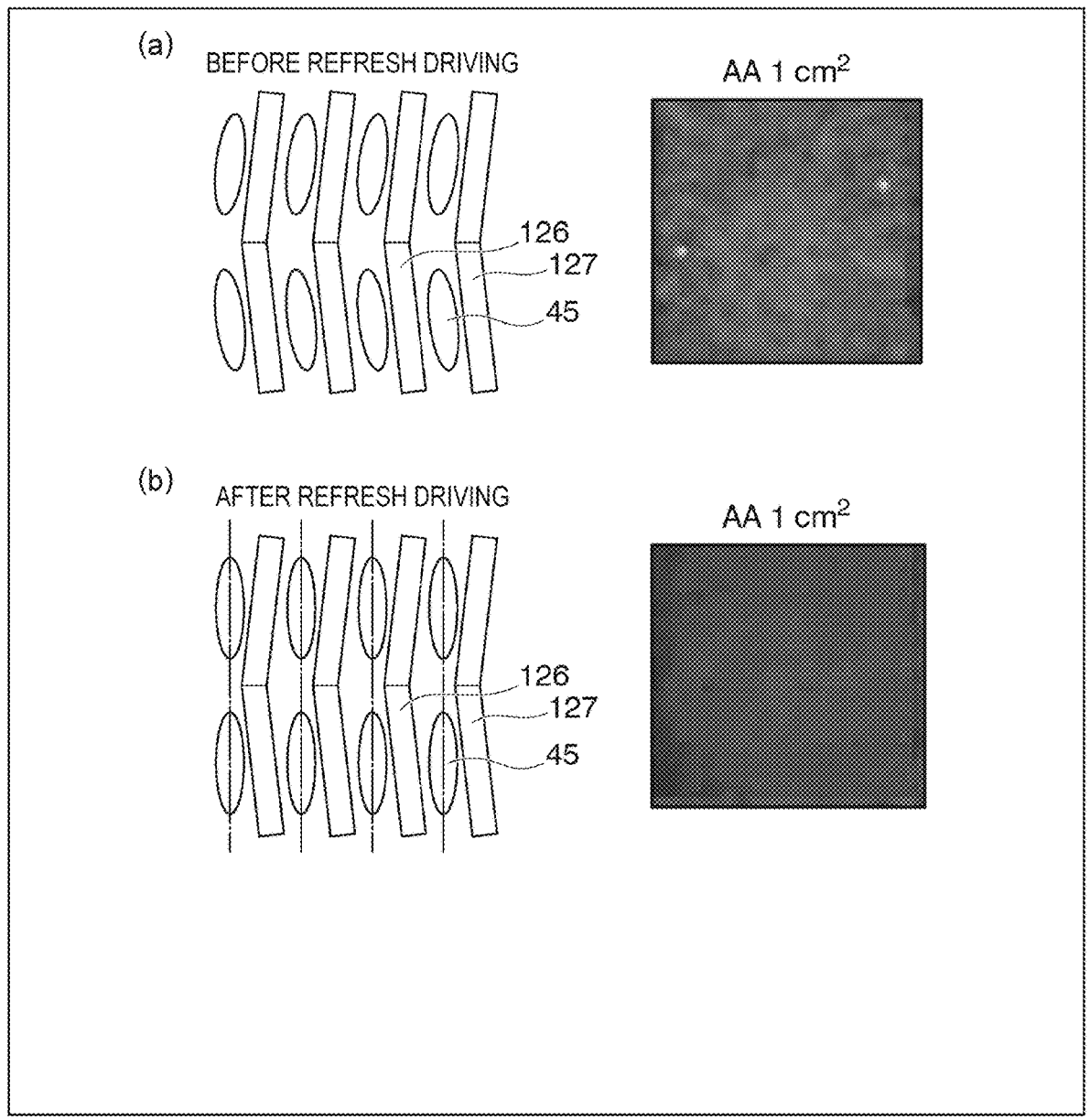
FIG. 7 is a schematic view of the direction of liquid crystal molecules before and after refresh driving.

The optical device, in which the interface between the liquid crystal component and the first alignment layer forms a non-glide weak anchoring interface, has good low-voltage drivability and high-speed response characteristics. When the liquid crystal component on the first substrate side on which the first electrode and the second electrode are located and that forms the weak anchoring interface is left for a while during no voltage application, however, as shown in FIG. 7(a), liquid crystal molecules are aligned along the protrusion of the electrodes, thus resulting in poor black reproduction (increased black luminance). This may result in an insufficient CR value (black luminance/white luminance ratio).

For black display, as illustrated in FIG. 7(b), liquid crystal molecules aligned along the protrusion of the electrodes can be refresh-driven to be aligned in the original direction of the liquid crystal molecules, thereby restoring the original black display. More specifically, the driving voltage is increased such that the maximum transmittance $T_{MAX}$ is achieved (for example, 2.5 V), and is then immediately decreased to zero (0 V) for black display. Thus, the structure controlling force can make one-side alignment regulating force dominant, reduce the black luminance of the liquid crystal cell by half, and improve the CR value. With the lapse of time, black is gradually reproduced poorly. To maintain the black state, therefore, refresh driving can be regularly performed (for example, for several to tens of seconds) to maintain the original black display.

EXAMPLES

Although the present invention is further described in the following examples, the scope of the present invention is not limited to these examples.

The unit "%" with respect to the compositions in the following examples and comparative examples refers to "% by mass".

(Slippery Material)

A slippery material (1) was prepared from a mixture of the following materials.

1: methoxy poly(ethylene glycol) monoacrylate: Mn=480: 4.95% by weight

2: poly(ethylene glycol) diacrylate: Mn=700: 4.95% by weight

3: IRGACURE 2959 (polymerization initiator): 0.1% by weight

4: NMP (solvent: N-methylpyrrolidone): 90% by weight

A slippery material (2) was prepared from a mixture of the following materials.

1: methoxy poly(ethylene glycol) monoacrylate: Mn=480: 4.95% by weight

2: poly(ethylene glycol) diacrylate: Mn=700: 4.95% by weight

3: IRGACURE 2959 (polymerization initiator): 0.1% by weight

4: cyclopentanone (solvent): 90% by weight (First Substrate)

Figure 8:
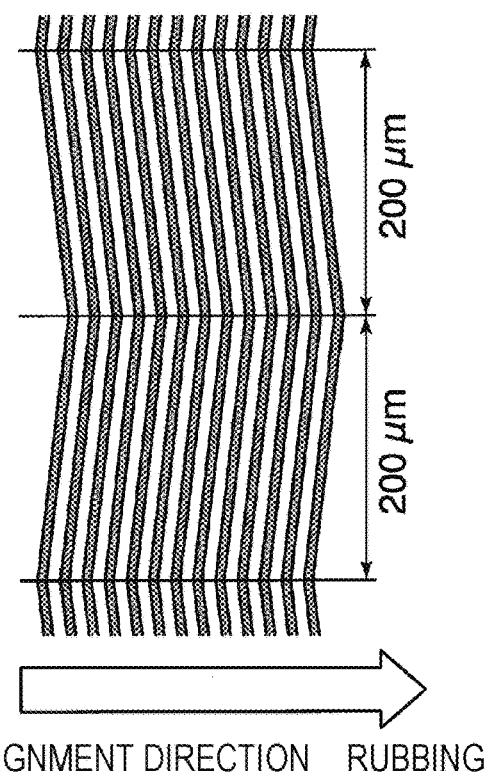
FIG. 8 is an enlarged view of the shape of an interdigitated electrode used in an example.
Figure 9:
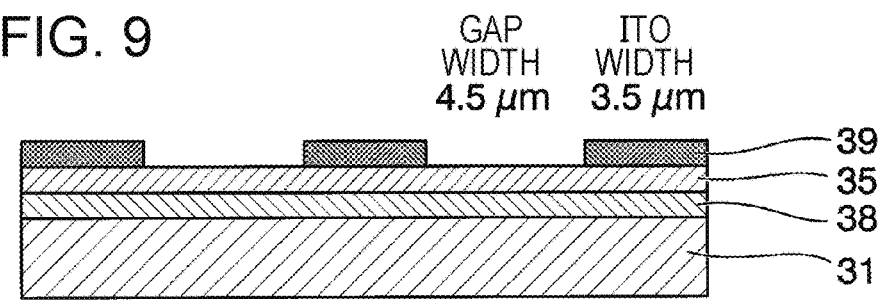
FIG. 9 is a schematic cross-sectional view of an electrode substrate used in an example.

An electrode substrate with an interdigitated electrode illustrated in FIG. 8 was used in a 1 cm×2 cm drive region. The electrode width was 3.5 μm, and the interelectrode distance was 4.5 μm. An electric field approximately parallel to the substrate could be applied between electrodes. FIG. 9 illustrates a cross-sectional structure of the electrode. A glass substrate 31 had a thickness of 700 μm. A first electrode 38 (common electrode) made of ITO had a thickness of 100 nm. An insulating film 35 made of $SiN_x$ had a thickness of 300 nm. A second electrode 39 (interdigitated electrode) made of ITO had a thickness of 100 nm.

(Second Substrate)

A color filter substrate with a pixel size of 30 μm×90 μm was coated in the usual manner under the following conditions to form a rubbed polyimide alignment film. The polyimide film had a thickness of 100 nm.

Liquid: solid content 4% by weight,
Coating conditions: spin 2000 rpm, 12 seconds,
Pre-baking: 80° C., 90 seconds,
Post-baking: 200° C., 30 minutes,
Rubbing rotation rate: 500 rpm,
Pushing amount: 0.4 mm,
Rubbing cloth: cotton,
Stage speed: 15 mm/s, and
Washing after coating: IPA washing, 5 minutes, at room temperature.

Example 1

For pretreatment of the first substrate, (1) the first substrate was subjected to ozone cleaning by 172-nm UV radiation for approximately 10 minutes using an excimer UV apparatus manufactured by Ushio Inc., (2) the first substrate was subjected to ultrasonic cleaning in pure water for 10 minutes, (3) droplets of water were removed from the substrate by $N_2$ blowing, and (4) the first substrate was dried at 105° C. for 10 minutes.

The slippery material (1) was applied to the pretreated first substrate by spin coating at 3500 rpm for 30 seconds and was photopolymerized by unpolarized UV radiation under the following conditions.

Type of lamp: An H valve manufactured by Fusion UV systems was used.
  Radiation intensity: 5.2 mW/cm$^2$
  Wavelength range: 220 to 260 nm
  Irradiation time: 350 seconds
  Atmosphere: $N_2$
  Radiation temperature: room temperature
  Radiation intensity detector: spectroradiometer USR-40 manufactured by Ushio Inc.

A resin film formed by photopolymerization on the first substrate was baked on a hot plate at 130° C. for 90 minutes to form a first alignment layer on the first substrate.

Figure 10:
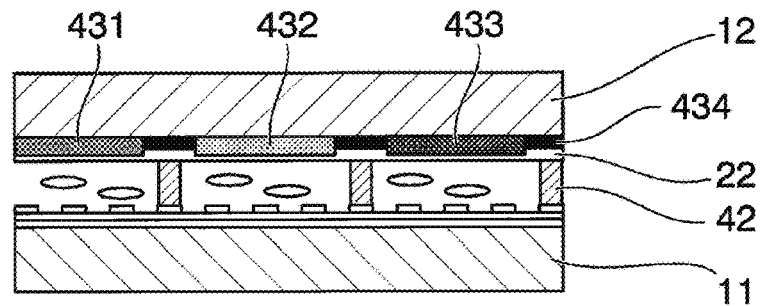
FIG. 10 is a schematic cross-sectional view of a liquid crystal device of an example.

A photo spacer 42 3.3 µm in height was formed on one of the first substrate with the first alignment layer and the second substrate on which a second alignment layer 22 (polyimide film) subjected to rubbing was formed. The first substrate was then bonded to the second substrate. A liquid crystal component (positive liquid crystal Δn=0.102, Δε=7) was injected by capillarity into the 3.3-µm space thus formed. FIG. 10 is a cross-sectional view of the cell after bonding.

Figure 11:
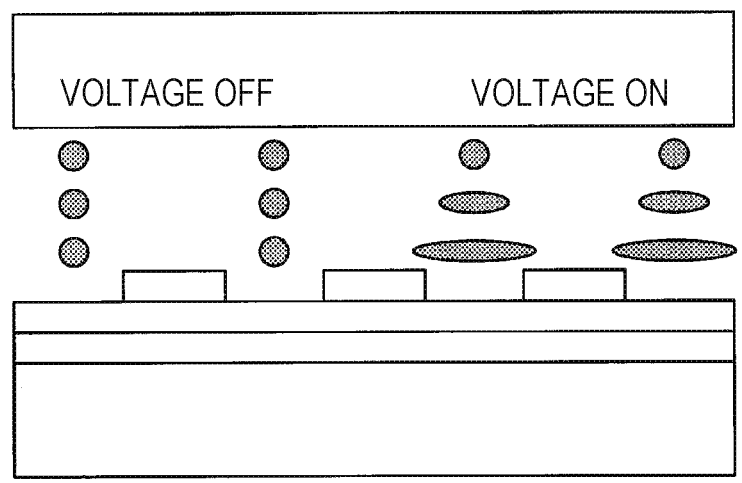
FIG. 11 is a schematic cross-sectional view of the alignment of liquid crystal molecules in a liquid crystal device of an example during no voltage application and during voltage application.

In a liquid crystal device according to Example 1, the second substrate (color filter substrate) was rubbed, but the first substrate (electrode substrate) was not rubbed. After the liquid crystal component is injected, the temperature is increased to the transition point of the liquid crystal component or higher and is then decreased. Thus, as illustrated in FIG. 11, liquid crystal molecules are also aligned on the first substrate (electrode substrate) side during no voltage application in the same direction as the rubbing direction on the second substrate (color filter substrate) side. Thus, a non-glide LC director occurs on the first substrate (electrode substrate) side not subjected to rubbing.

Figure 12:
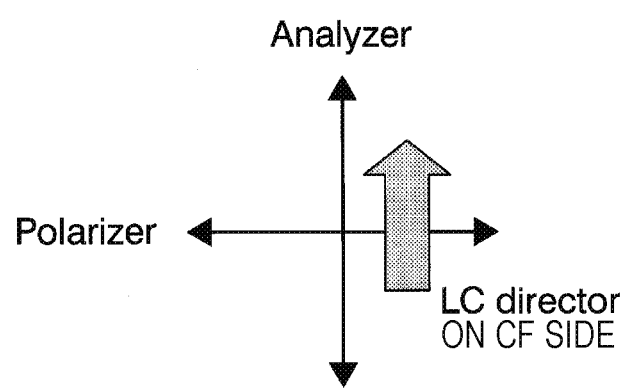
FIG. 12 is a schematic view of the relationship between the direction of an LC director on the color filter (CF) substrate side, the direction of a polarizer, and the direction of an analyzer in an example and a comparative example.

FIG. 12 illustrates the relationship between the direction of an LC director due to rubbing on the color filter (CF) substrate side, the polarizer direction, and the analyzer direction. This enables black display during no voltage application and white display during voltage application.

Figure 13:
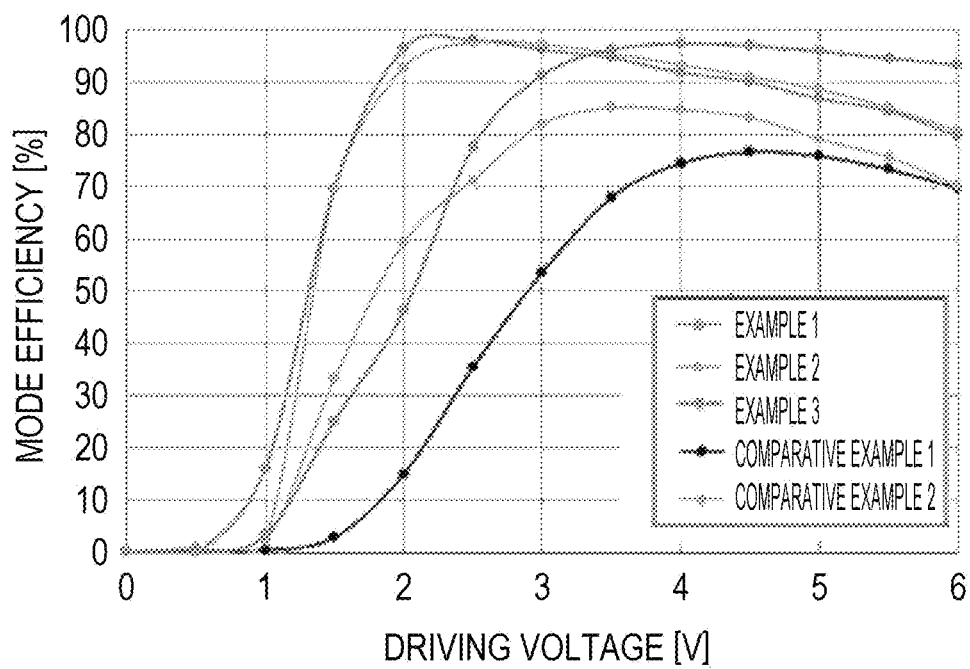
FIG. 13 is a graph of the evaluation results of the V-mode efficiency characteristics of a liquid crystal device.

FIG. 13 shows the evaluation results of the V-mode efficiency characteristics of the liquid crystal device according to Example 1.

Figure 14:
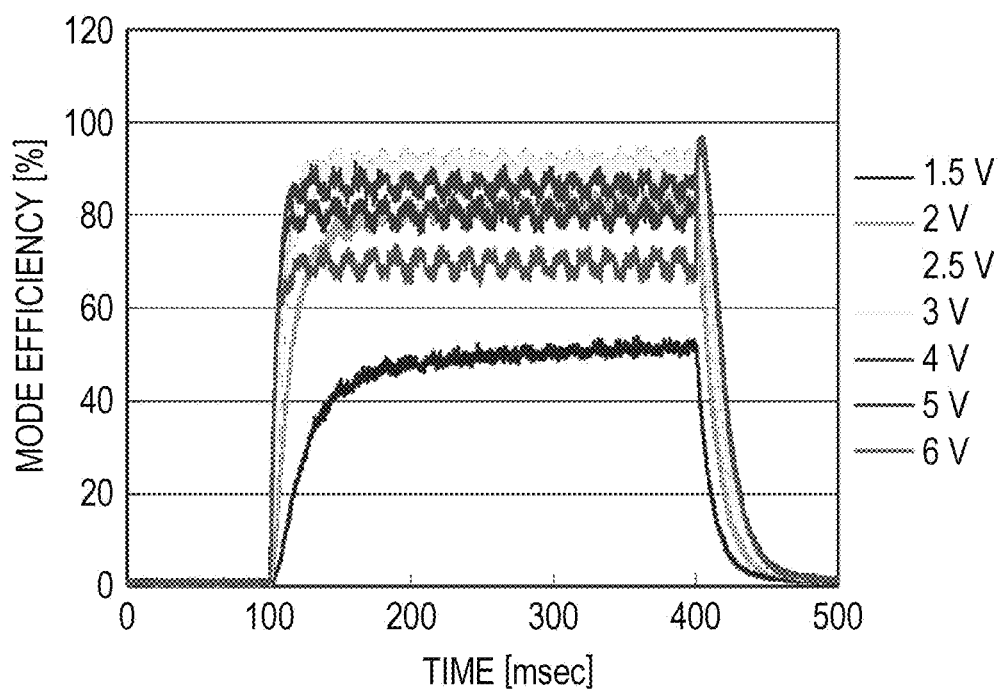
FIG. 14 is a graph of measured drive waveforms of a liquid crystal device.
Figure 15:
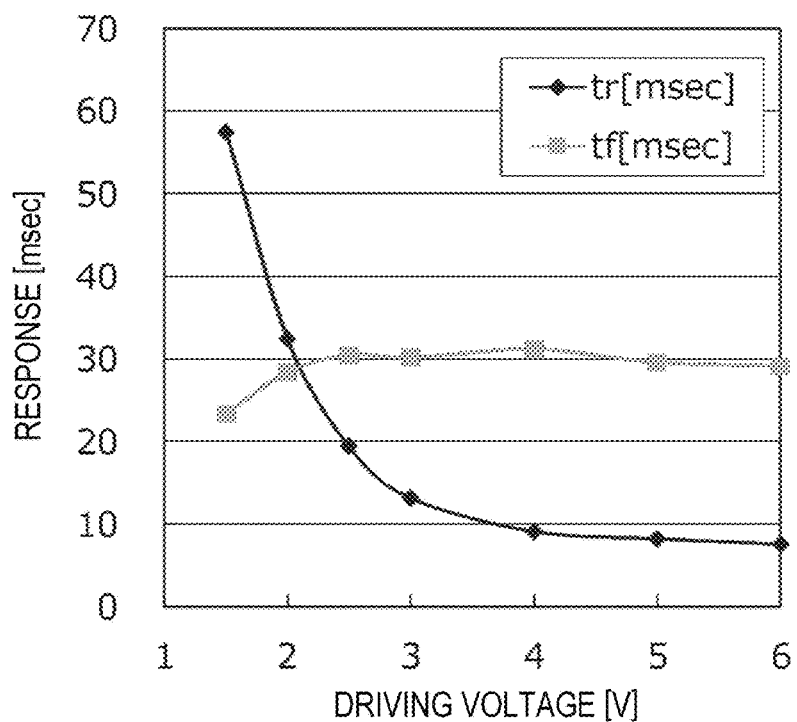
FIG. 15 is a graph of the evaluation results of the voltage dependence of the response time of a liquid crystal device.

FIG. 14 shows measured drive waveforms of the liquid crystal device according to Example 1. FIG. 15 shows the evaluation results of the voltage dependence of the response time of the liquid crystal device according to Example 1.

The liquid crystal device according to Example 1 had ON response time 19.4 ms+OFF response time 30.5 ms=49.9 ms in total at a voltage of 2.5 V and ON response time 9.1 ms+OFF response time 31.2 ms=40.3 ms in total at a voltage of 4.0 V, thus showing good low-voltage drivability and high-speed response characteristics.

The ON response time is the time corresponding to transmittance T from 10% to 90%. The OFF response time is the time corresponding to transmittance T from 90% to 10%.

The liquid crystal device according to Example 1 satisfied a target mode efficiency of 95% or more at 2.5 V and was proved to be a positive liquid crystal with good optical characteristics.

The mode efficiency refers to the ratio of the amount of transmitted light in a polarizer crossed nicols arrangement during voltage application to the amount of transmitted light in a polarizer parallel arrangement during no voltage application, which is set to 100%.

Example 2

A liquid crystal device according to Example 2 was produced in the same manner as in Example 1 except that the baking conditions of 130° C. and 90 minutes were changed to the baking conditions of 150° C. and 90 minutes.

FIG. 13 shows the evaluation results of the V-mode efficiency characteristics of the liquid crystal device according to Example 2.

Example 3

A liquid crystal device according to Example 3 was produced in the same manner as in Example 1 except that the baking conditions of 130° C. and 90 minutes were changed to the baking conditions of 130° C. and 110 minutes.

FIG. 13 shows the evaluation results of the V-mode efficiency characteristics of the liquid crystal device according to Example 3.

Comparative Example 1

A liquid crystal device according to Comparative Example 1 was produced in the same manner as in Example 1 except that the alignment film on the first substrate was changed to a rubbed polyimide film.

FIG. 13 shows the evaluation results of the V-mode efficiency characteristics of the liquid crystal device according to Comparative Example 1.

Comparative Example 2

A liquid crystal device according to Comparative Example 2 was produced in the same manner as in Example 1 except that the baking conditions of 130° C. and 90 minutes were changed to the baking conditions of 170° C. and 90 minutes.

FIG. 13 shows the evaluation results of the V-mode efficiency characteristics of the liquid crystal device according to Comparative Example 2.

(Measurement of Anchoring Energy)

The azimuthal anchoring energy W was measured in the first alignment layer of each of the liquid crystal devices according to Example 1 and Comparative Example 2. The measurement method is described below.

Reference Example 1

Two washed glass substrates were prepared, (1) were subjected to ozone cleaning by 172-nm UV radiation for approximately 10 minutes using an excimer UV apparatus manufactured by Ushio Inc., and (2) were subjected to ultrasonic cleaning in pure water for 10 minutes, and (3) droplets of water were removed from the substrates by $N_2$ blowing, and (4) the glass substrates were dried at 105° C. for 10 minutes. The slippery material (1) was then applied to the glass substrates by spin coating at 3500 rpm for 30 seconds to form the same alignment layer as the first alignment layer of the liquid crystal cell according to Example 1. Plastic beads 25 µm in diameter were then applied to one of the glass substrates, and the glass substrates were bonded together such that the alignment layers faced each other. A liquid crystal component (positive liquid crystal Δn=0.102, Δε=7) was injected by capillarity into a cell space with a thickness d of 25 μm thus formed, thereby producing a liquid crystal cell according to Reference Example 1.

The liquid crystal cell according to Reference Example 1 was heated to the transition point or higher and was then cooled in a magnetic field to uniformly and horizontally align liquid crystal molecules. A non-glide LC director occurred in a particular direction (magnetic field direction) on both of the substrates.

Figure 16:
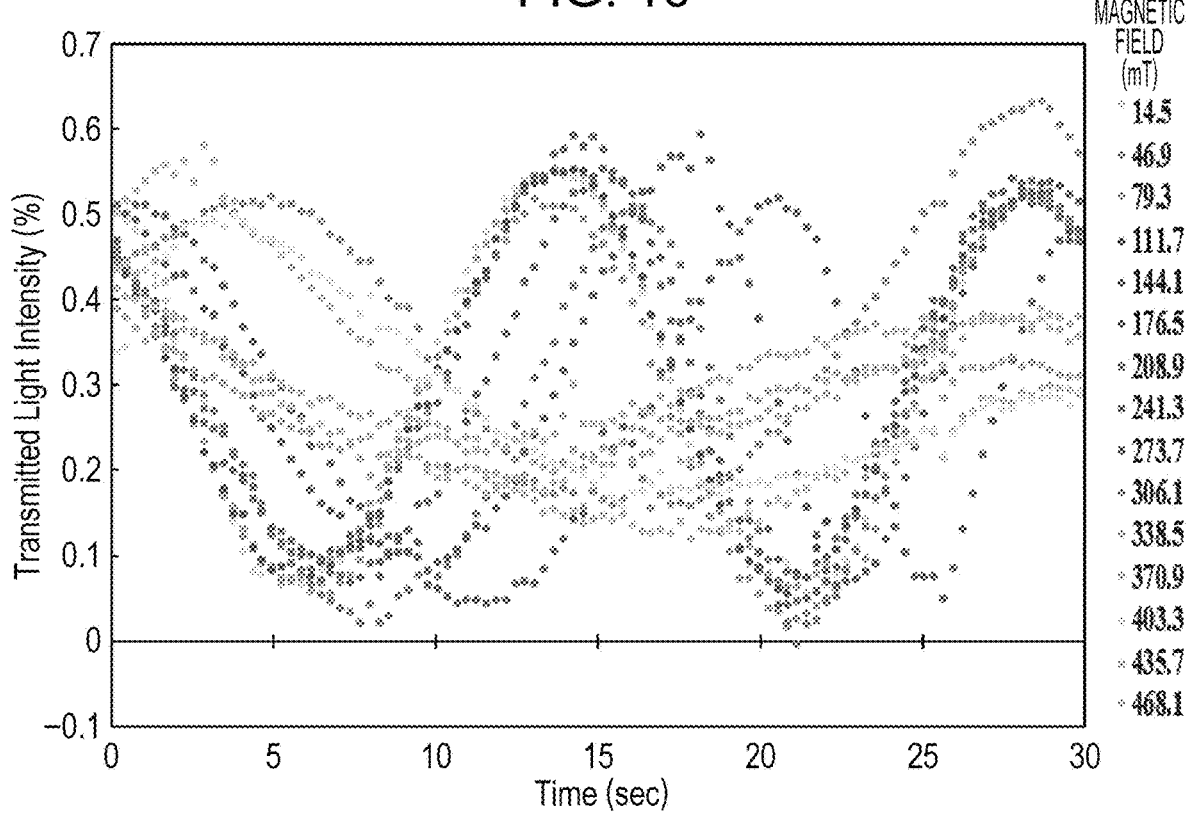
FIG. 16 is a graph of measured transmitted light intensity of a laser beam in a rotating magnetic field in a liquid crystal device.

The liquid crystal cell according to Reference Example 1 was maintained at 29.1° C. and was placed between two polarizers with orthogonal transmission axes. The transmitted light intensity of a laser beam was measured in a rotating magnetic field with the angular velocity ω of a rotation stage being π/30 [rad/s]. FIG. 16 shows the results for 15 magnetic fields with 14.5 to 468.1 mT.

The fitting parameters $a_{2\omega}$, $a_{\omega}$, and c were determined by fitting these curves to the following formula. The $a_{2\omega}$ denotes the oscillating component of transmitted light relating to anchoring energy, and c denotes the phase delay relative to the magnetic field direction of the surface director and relates to surface viscosity. The other parameters $A_{Norm}$, k, $\sigma_{\omega}$, and $\sigma_{2\omega}$ are fitting parameters relating to the dynamics of the surface director. More specifically, the $a_{2\omega}$ level indicates anchoring energy, and the c level indicates surface viscosity. I(t) denotes transmitted light intensity, t denotes time, and ω denotes the angular velocity of the stage.

$$I(t)=a_{2\omega}((1-k)\sin^2(2\omega t+\sigma_{2\omega})+k(A_{norm}(\sin(2\omega t+\sigma_{2\omega})+\tfrac{1}{2}\sin(2(2\omega t+\sigma_{2\omega}))))^2)+a_{\omega}\sin^2(\omega t+\sigma_{\omega})+c$$ [Math. 1]

Figure 17:
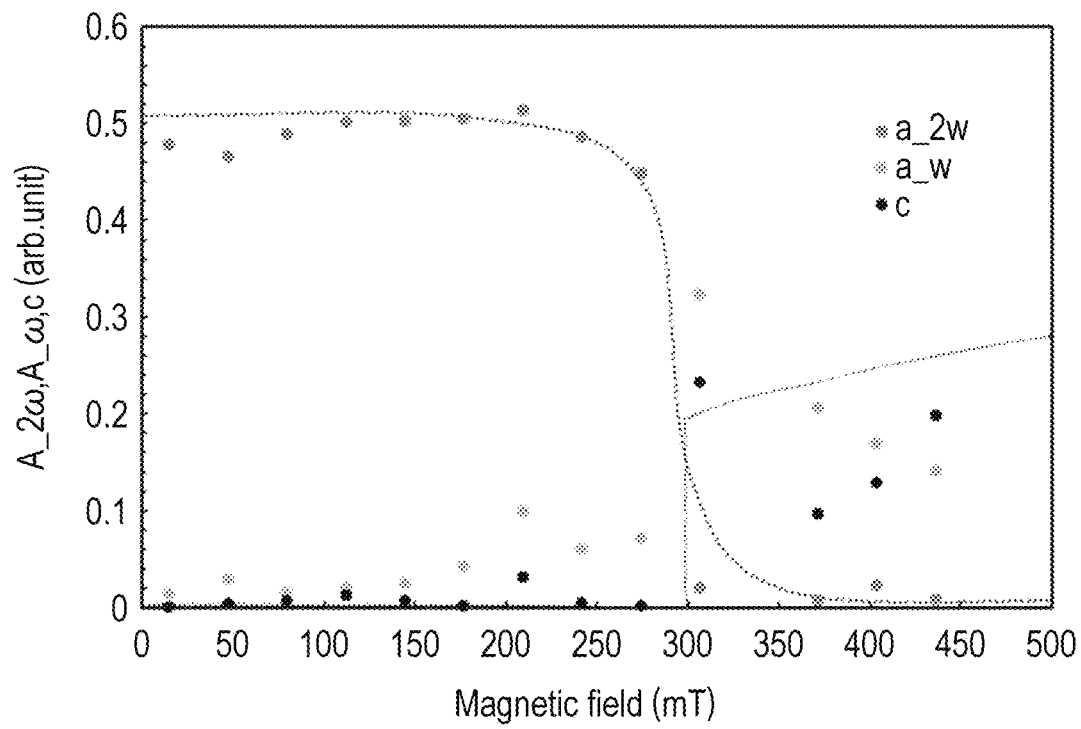
FIG. 17 is a graph of the calculation results of the fitting parameters a2ω, $a_\omega$, and c with respect to the magnetic field strength.

FIG. 17 is a graph of the calculation results of the fitting parameters a2ω, $a_{\omega}$, and c with respect to the magnetic field strength.

In the graph of FIG. 17, the fitting parameters a2ω, $a_{\omega}$, and c changed greatly at 300 mT and indicate the formation of a weak anchoring interface. The threshold $B_f$ of the magnetic field strength was 300 mT (d=25 μm, $B_f$=300 mT).

The threshold magnetic field $B_f$ of Freedericksz transition in a static magnetic field was measured in liquid crystal cells with a cell thickness d=12.5, 25, and 50.0 μm. The threshold $B_f$ of the magnetic field strength was 67.6 mT for the cell thickness d=12.5 μm. The threshold $B_f$ of the magnetic field strength was 55.6 mT for the cell thickness d=25 μm. The threshold $B_f$ of the magnetic field strength was 61.7 mT for the cell thickness d=50.0 μm.

The extrapolation length de was determined to be 200 μm from these results by fitting the relationship between the cell thickness d and the reciprocal $B_f^{-1}$ of the threshold of the magnetic field strength to the following formula.

$$\frac{1}{B_f} = (d+2d_e)\sqrt{\frac{\mu_0^{-1}\chi_a}{\pi^2 K_2}}$$ [Math. 2]

χa denotes the anisotropy of magnetic susceptibility.

The azimuthal anchoring energy W at the interface between the same alignment layer of Reference Example 1 as the first alignment layer of the liquid crystal cell according to Example 1 and the liquid crystal component was determined to be 6.4×10⁻⁸ Jm⁻² using the following formula.

$$W=K_2/de$$

(W denotes the azimuthal anchoring energy at the interface with the liquid crystal component, de denotes the extrapolation length, and $K_2$ denotes the Frank elastic modulus of the liquid crystal component (positive liquid crystal Δn=0.102, Δε=7).)

The anchoring energy W of typical strong anchoring films ranges from approximately $10^{-5}$ to $10^{-3}$ Jm⁻². The first alignment layer of the liquid crystal cell according to Example 1 had a sufficiently smaller anchoring energy W than this and was therefore a weak anchoring film.

Reference Example 2

A liquid crystal cell according to Reference Example 2 that had the same alignment layer as the first alignment layer of the liquid crystal cell according to Comparative Example 2 was produced in the same manner as in Reference Example 1 except that the baking conditions of 130° C. and 90 minutes were changed to the baking conditions of 170° C. and 90 minutes.

In the same manner as in the liquid crystal cell according to Reference Example 1. the liquid crystal cell according to Reference Example 2 was maintained at 29.1° C. and was placed between two polarizers with orthogonal transmission axes. The transmitted light intensity of a laser beam was measured in a rotating magnetic field with the angular velocity w of a rotation stage being π/30 [rad/s]. The measurement was performed in 15 magnetic fields with 14.5 to 468.1 mT. In the same manner as in Reference Example 1, the fitting parameters a2ω, $a_{\omega}$, and c were determined by fitting to the above formula.

Figure 18:
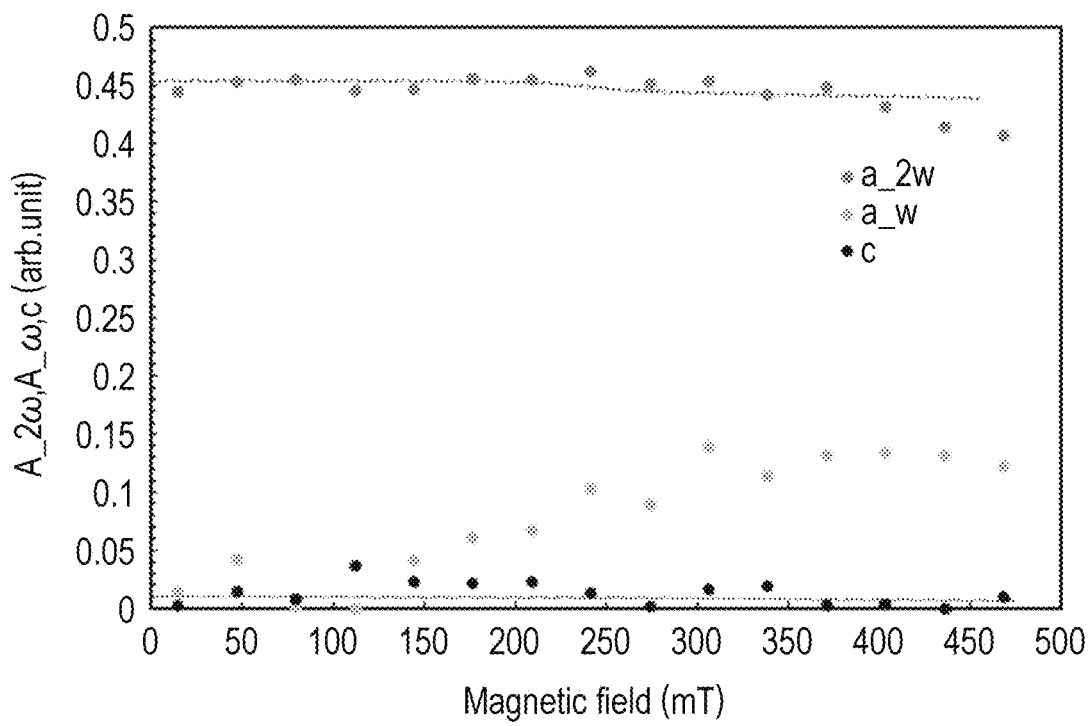
FIG. 18 is a graph of the calculation results of the fitting parameters a2ω, $a_\omega$, and c with respect to the magnetic field strength.

FIG. 18 is a graph of the calculation results of the fitting parameters a2ω, $a_{\omega}$, and c with respect to the magnetic field strength.

In the graph of FIG. 18, any of the fitting parameters a2ω, $a_{\omega}$, and c did not change significantly, and the threshold $B_f$ of the magnetic field strength could not be determined.

In FIG. 18, only the $a_{2\omega}$ component was continually detected until the maximum magnetic field was applied. This means that the liquid crystal molecules are trapped at the interface due to strong anchoring, and a magnetic field with such strength cannot trap the liquid crystal molecules. In other words, the trapping force on the interface side is so strong.

It is thought that the azimuthal anchoring energy W at the interface between the liquid crystal component and the first alignment layer of the liquid crystal cell according to Reference Example 2, which is the same as the first alignment layer of the liquid crystal cell according to Comparative Example 2, ranges from 10 to 10⁻³ Jm⁻². At least, the first alignment layer of the liquid crystal cell according to Comparative Example 2 has an anchoring energy W>1.2 to 1.3×10-7 Jm⁻².

Example 4

A liquid crystal device according to Example 4 was produced in the same manner as in Example 1 (baking at 130° C. for 90 minutes) except that the slippery material (1) was changed to the slippery material (2).

Figure 19:
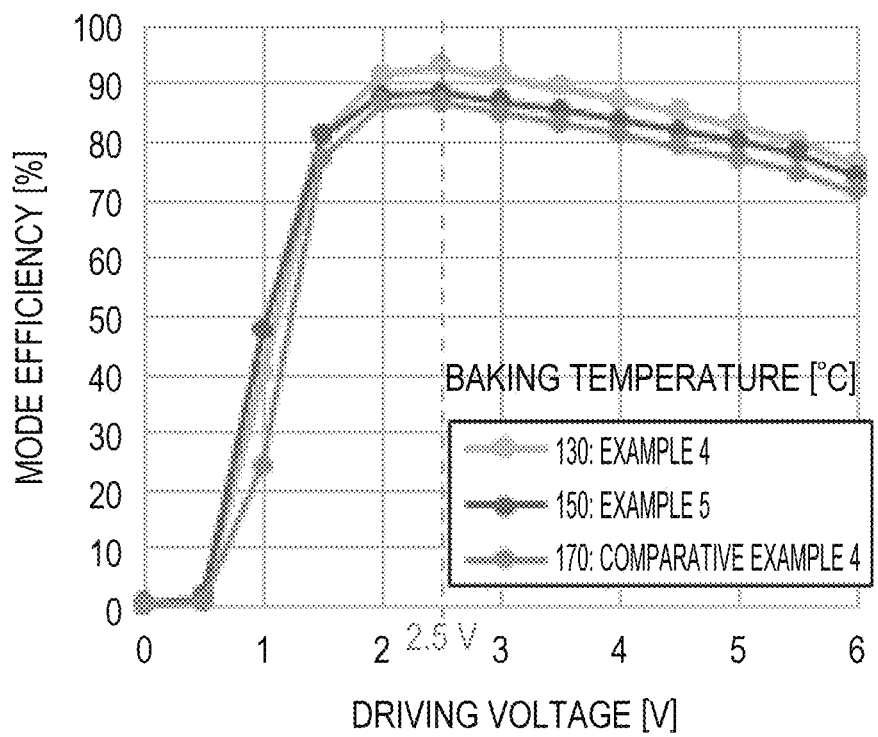
FIG. 19 is a graph of the evaluation results of the V-mode efficiency characteristics of a liquid crystal device.
Figure 21:
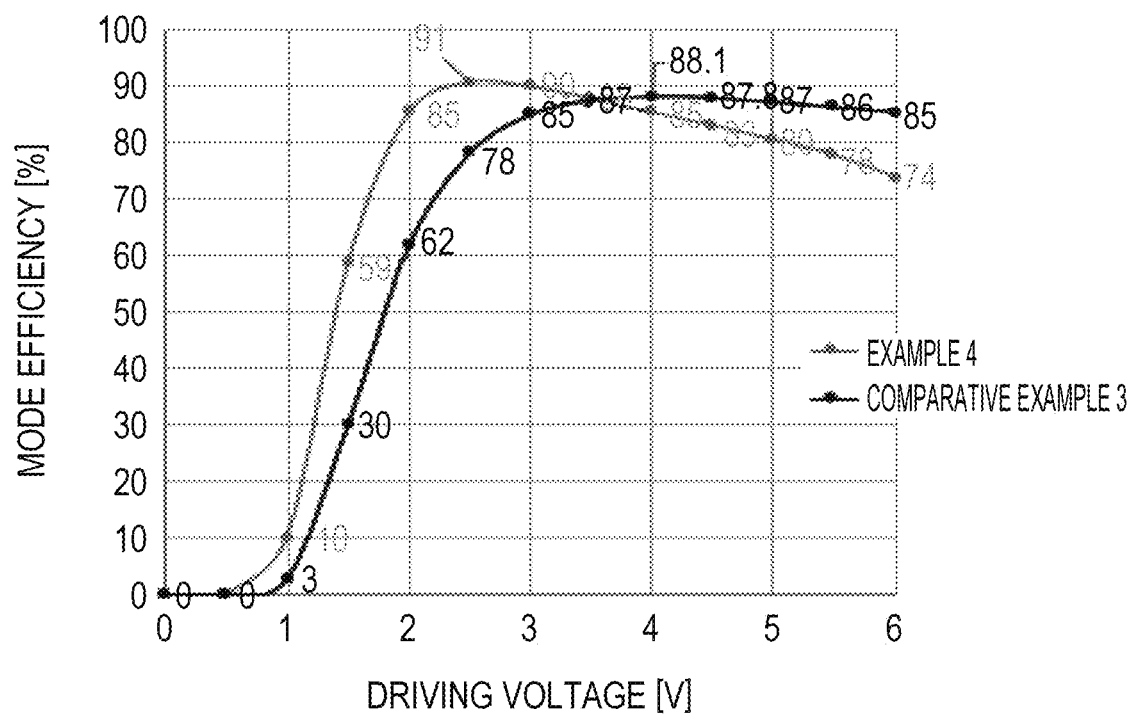
FIG. 21 is a graph of the evaluation results of the V-mode efficiency characteristics of a liquid crystal device.

FIGS. 19 and 21 show the evaluation results of the V-mode efficiency characteristics of the liquid crystal device according to Example 4.

Figure 22:
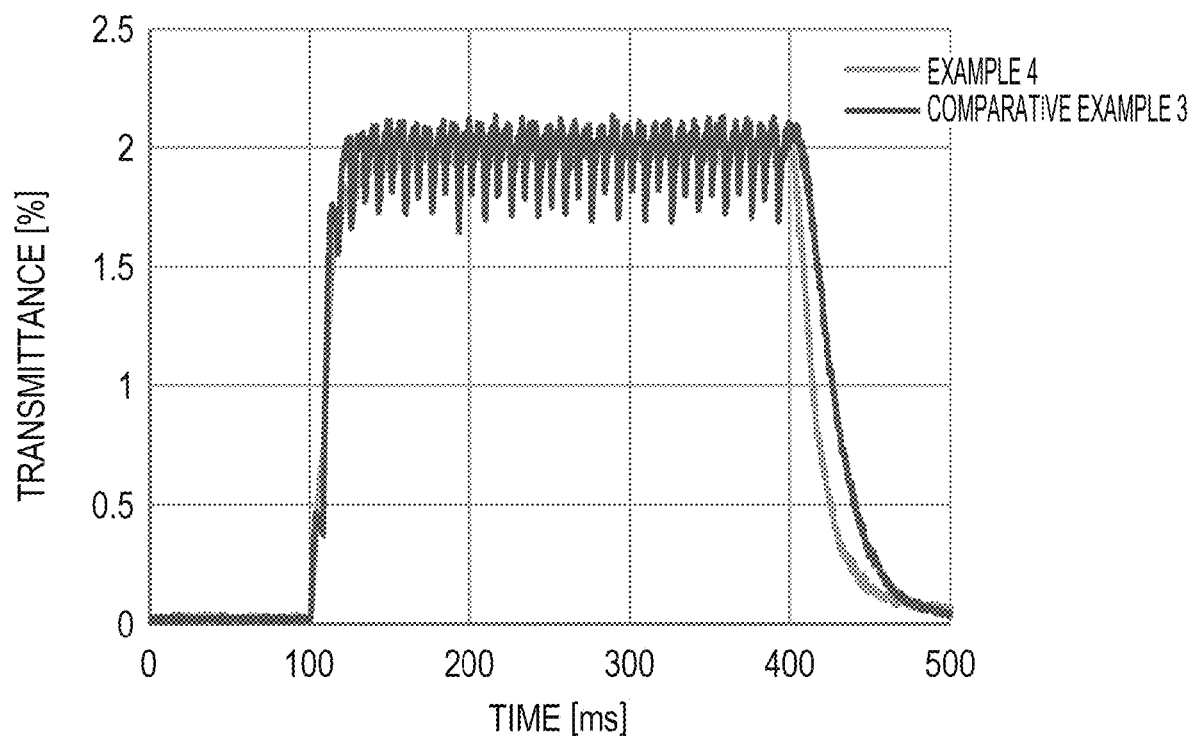
FIG. 22 is a graph of measured drive waveforms of a liquid crystal device.

The drive waveform was measured in the liquid crystal device according to Example 4 (FIG. 22), and the response time at a voltage of 2.5 V was calculated. The result was ON response time 14 ms+OFF response time 55 ms=69 ms in total, showing good low-voltage drivability and high-speed response characteristics.

Example 5

A liquid crystal device according to Example 5 was produced in the same manner as in Example 2 (baking at 150° C. for 90 minutes) except that the slippery material (1) was changed to the slippery material (2).

FIG. 19 shows the evaluation results of the V-mode efficiency characteristics of the liquid crystal device according to Example 5.

The drive waveform was measured in the liquid crystal device according to Example 5, and the response time at a voltage of 2.5 V was calculated. The result was ON response time 14 ms+OFF response time 74 ms=88 ms, showing good low-voltage drivability and high-speed response characteristics.

Example 6

A liquid crystal device according to Example 6 was produced in the same manner as in Example 3 (baking at 130° C. for 110 minutes) except that the slippery material (1) was changed to the slippery material (2).

Figure 20:
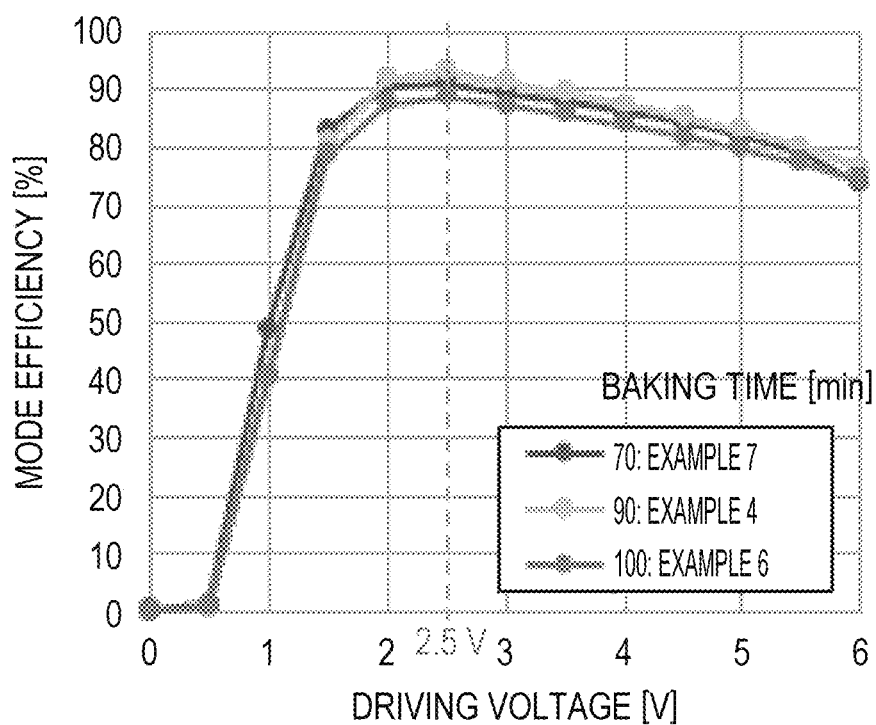
FIG. 20 is a graph of the evaluation results of the V-mode efficiency characteristics of a liquid crystal device.

FIG. 20 shows the evaluation results of the V-mode efficiency characteristics of the liquid crystal device according to Example 6.

The drive waveform was measured in the liquid crystal device according to Example 6, and the response time at a voltage of 2.5 V was calculated. The result was ON response time 14 ms+OFF response time 55 ms=69 ms, showing good low-voltage drivability and high-speed response characteristics.

Example 7

A liquid crystal device according to Example 7 was produced in the same manner as in Example 3 (baking at 130° C. for 70 minutes) except that the slippery material (1) was changed to the slippery material (2), and the baking conditions of 130° C. and 110 minutes was changed to the baking conditions of 130° C. and 70 minutes.

FIG. 20 shows the evaluation results of the V-mode efficiency characteristics of the liquid crystal device according to Example 7.

The drive waveform was measured in the liquid crystal device according to Example 7, and the response time at a voltage of 2.5 V was calculated. The result was ON response time 13 ms+OFF response time 61 ms=74 ms, showing good low-voltage drivability and high-speed response characteristics.

Comparative Example 3

A liquid crystal device according to Comparative Example 3 was produced in the same manner as in Example 4 except that the baking at 130° C. for 90 minutes was not performed.

FIG. 21 shows the evaluation results of the V-mode efficiency characteristics of the liquid crystal device according to Comparative Example 3.

The drive waveform was measured in the liquid crystal device according to Comparative Example 3 (FIG. 22), and the response time at a voltage of 4.0 V was calculated. The result was ON response time 17 ms+OFF response time 44 ms=61 ms, showing good high-speed response characteristics but poor low-voltage drivability.

Comparative Example 4

A liquid crystal device according to Comparative Example 4 was produced in the same manner as in Comparative Example 2 (baking at 170° C. for 90 minutes) except that the slippery material (1) was changed to the slippery material (2).

FIG. 19 shows the evaluation results of the V-mode efficiency characteristics of the liquid crystal device according to Comparative Example 4.

The drive waveform was measured in the liquid crystal device according to Comparative Example 4, and the response time at a voltage of 2.5 V was calculated. The result was ON response time 14 ms+OFF response time 87 ms=101 ms.

(Measurement of Surface Free Energy)

Wettability to a substrate can be evaluated in terms of the surface free energy γ of the substrate represented by the following formula (1). The surface free energy γ is the digitized surface state of a solid substance and is an indicator of the order of wettability of solid substances. The surface free energy is attraction between molecules on a solid surface. The attraction is referred to as intermolecular force (van der Waals force) and is not a chemical bond in which electrons move between atoms, such as an ionic bond or a covalent bond, but is attraction between molecules.

$$\gamma = \gamma d + \gamma p + \gamma h \tag{1}$$

(In the formula (1), γ denotes the surface free energy of the substance, γd denotes a dispersion component, γp denotes a polarity component, and γh denotes a hydrogen bonding component.)

The analysis of the surface free energy of a solid surface utilizes a method of calculation from measured contact angles of the solid surface. There are several theories for this calculation method. The calculation method may be a method of calculation from contact angles obtained using two solvents with known surface free energy using the Owens-Wendt theory or a method of calculation from contact angles obtained using three solvents with known surface free energy using the Kitazaki-Hata theory. The contact angle of a solid surface refers to the angle between the solid and a droplet, if present, on the solid surface in contact with a liquid.

The surface free energy γ was measured in the first alignment layers of the liquid crystal devices according to Examples 4 to 6 and Comparative Examples 3 and 4. The measurement method is described below.

Reference Example 3

A white glass substrate was prepared, (1) was subjected to ozone cleaning by 172-nm UV radiation for approximately 10 minutes using an excimer UV apparatus manufactured by Ushio Inc., and (2) was subjected to ultrasonic cleaning in pure water for 10 minutes, and (3) droplets of water were removed from the substrate by $N_2$ blowing, and (4) the white glass substrate was dried at 105° C. for 10 minutes. The slippery material (2) was then applied to the white glass substrate by spin coating at 3500 rpm for 30 seconds, was photopolymerized by unpolarized UV radiation under the same conditions as in Examples 1 and 4, and was baked at 130° C. for 90 minutes in the same manner as in Examples 1 and 4 to form a film on the white glass substrate, thus forming a coating film according to Reference Example 3, which is the same as the first alignment layer of the liquid crystal cell according to Example 4.

The surface free energy of the alignment layer according to Reference Example 3 was calculated by contact angle measurement. In the contact angle measurement, the contact angles of ultrapure water ($H_2O$), diiodomethane ($CH_2I_2$), and n-hexadecane ($C_{16}H_{34}$) on the coating film were measured with DropMaster 500 (manufactured by Kyowa Interface Science Co., Ltd.) using a Teflon (registered trademark) coated needle 18 G (or 22 G). The liquid volume was 3 µL. The contact angles at five points each were averaged. The surface free energy of each solvent used for the measurement was 72.8 mJ/m$^2$ for ultrapure water, 50.8 mJ/m$^2$ for diiodomethane, and 27.6 mJ/m$^2$ for n-hexadecane. The surface free energy of the coating film according to Reference Example 3, which is the same as the first alignment layer of the liquid crystal cell according to Example 4, was calculated to be 81.3 mJ/m$^2$ from the contact angles using the Kitazaki-Hata theory.

Reference Example 4

A coating film according to Reference Example 4, which is the same as the first alignment layer of the liquid crystal cell according to Example 5, was produced in the same manner as in Reference Example 3 except that the baking conditions of 130° C. and 90 minutes were changed to the baking conditions of 150° C. and 90 minutes. The surface free energy of the coating film according to Reference Example 4 was calculated to be 81.4 mJ/m$^2$ in the same manner as in Reference Example 3.

Reference Example 5

A coating film according to Reference Example 5, which is the same as the first alignment layer of the liquid crystal cell according to Example 6, was produced in the same manner as in Reference Example 3 except that the baking conditions of 130° C. and 90 minutes were changed to the baking conditions of 130° C. and 110 minutes. The surface free energy of the coating film according to Reference Example 5 was calculated to be 81.1 mJ/m$^2$ in the same manner as in Reference Example 3.

Reference Example 6

A coating film according to Reference Example 6, which is the same as the first alignment layer of the liquid crystal cell according to Comparative Example 3, was produced in the same manner as in Reference Example 3 except that the baking at 130° C. for 90 minutes was not performed.

The surface free energy of the coating film according to Reference Example 6 was calculated to be 100.8 mJ/m$^2$ in the same manner as in Reference Example 3.

Reference Example 7

A coating film according to Reference Example 7, which is the same as the first alignment layer of the liquid crystal cell according to Comparative Example 4, was produced in the same manner as in Reference Example 3 except that the baking conditions of 130° C. and 90 minutes were changed to the baking conditions of 170° C. and 90 minutes. The surface free energy of the coating film according to Reference Example 7 was calculated to be 82.5 mJ/m$^2$ in the same manner as in Reference Example 3.

Thus, the evaluation results of the surface free energy of the coating films according to Reference Example 3 to 7 show that the surface free energy of each first alignment layer of the liquid crystal cells according to Comparative Examples 3 and 4 is close to approximately 82.5 to 100.8 mJ/m$^2$. It is also shown that the surface free energy of each first alignment layer of the liquid crystal cells according to Example 4 to 6 is close to approximately 81.1 to 81.4 mJ/m$^2$, and the surface free energy of each first alignment layer of the liquid crystal cells according to the present invention is preferably less than 82.5 mJ/m$^2$, preferably 82.3 mJ/m$^2$ or less, preferably 82.0 mJ/m$^2$ or less, preferably 81.5 mJ/m$^2$ or less.

Example 8

(Simulation Experiment)

The behavior of nematic liquid crystals encapsulated in a cell with a strong anchoring surface partly covered with an isotropic liquid was examined using coarse-grained molecular dynamics simulation.

Without the isotropic liquid, it should behave like nematic liquid crystals encapsulated in normal alignment cells. On the other hand, when completely covered with the isotropic liquid, it behaves as a slippery interface due to the weakened anchoring interaction between the inner wall of the cell and liquid crystals. Liquid crystals at the slippery interface in the cell are expected to respond to a weak external field. Due to a decrease in restoring force resulting from the anchoring effects, however, the relaxation time after removal of the external field will be increased or will not be restored to the original state.

When partly covered with the isotropic liquid, it will exhibit quantitatively intermediate behavior, which was examined in detail.

Figure 44:
FIG. 44 illustrates the Gay-Berne potential mathematical equation [Math. 3].

See the mathematic equation [Math. 3] of FIG. 44.

Figure 23:
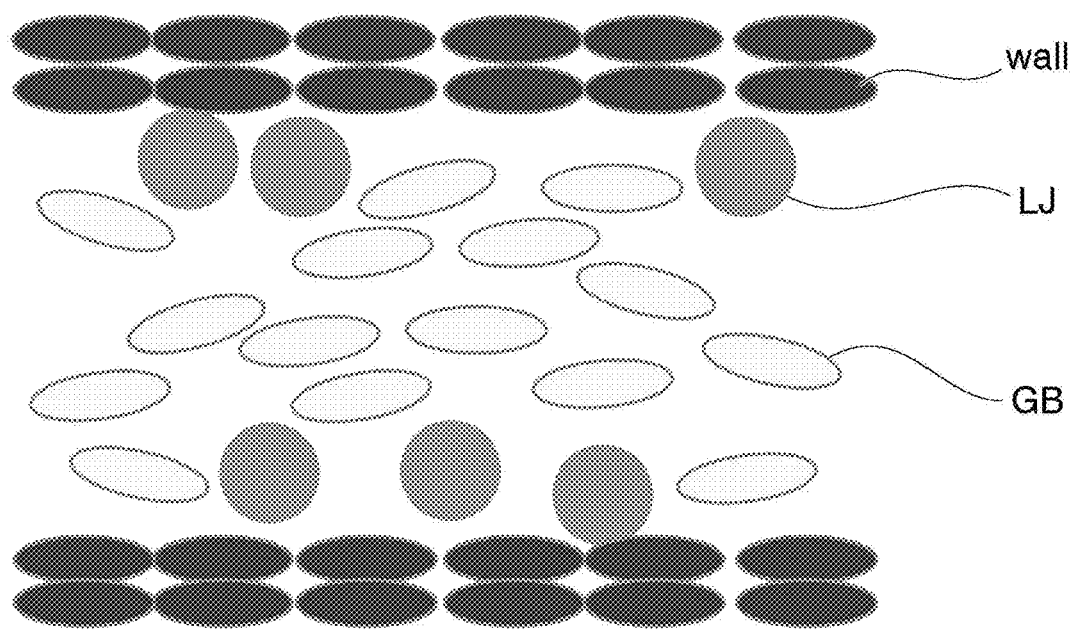
FIG. 23 is a schematic view of the behavioral model of a nematic liquid crystal with a strong anchoring surface encapsulated in a cell partially covered with an isotropic liquid.

As illustrated in FIG. 23, liquid crystalline molecules are modeled using elongated spheroidal particles (Gay-Berne particles (GB)), and isotropic liquid molecules are modeled using spherical particles (Lennard-Jones particles (LJ)). The inner wall of the cell is represented by a planar array of particles (walls) with the same shape as liquid crystal molecules. Without an isotropic liquid, liquid crystals in the cell have planar alignment. To adsorb isotropic liquid molecules on the wall, the interaction between the wall particles and isotropic liquid molecules was made stronger than the interaction between the wall particles and liquid crystal molecules.

Liquid crystalline molecules are modeled using elongated spheroidal particles. These particles interact via the Gay-Berne potential given by the formulae in the [Math. 3]. r_i denotes the coordinate of an i-th particle, and u_i denotes the direction of the molecule in the longitudinal direction. Parameters commonly used in previous studies were used, and the ratio of the major axis to the minor axis was 3. In this system, a change in temperature (average kinetic energy) or particle density causes an isotropic nematic phase transition, as illustrated in the phase diagram.

Spherical particles that represent isotropic liquid molecules interact via the Lennard-Jones potential. The Gay-Berne particles were originally modeled to exhibit the same behavior as linearly arranged Lennard-Jones particles. Spherical particles do not undergo a phase transition to a liquid crystal phase even when the temperature is changed.

In the formulae of the Gay-Berne potential, σ_s (σ_0) denotes the size of molecules in the minor axis direction, and σ_e denotes the size of molecules in the major axis direction. ε_e and ε_s denote the interaction strength of a horizontal arrangement and a vertical arrangement, respectively, in the major axis direction. μ and ν are parameters representing detailed molecular interactions. r_ij denotes the relative position between particles i and j.

Elongated Gay-Berne particles and spherical Lennard-Jones particles are mixed together and are encapsulated in a planar aligned cell (FIG. 23).

The Lennar-Jones particles had a diameter σ_LJ 1.5 times the minor axis of the liquid crystal molecules.

[Math. 4]

LAMMPS simulation with

NVT (Langevin thermostat)

$$U_{tot}\{r_i, u_i\} = \sum_{i \neq j} U_{GB}(u_i, u_j, r_{ij}) - \sum_i (E \cdot u_i)^2$$

$$m \frac{d^2 r_i}{dt^2} = -\frac{\partial U_{tot}}{\partial r_i} - \zeta \frac{dr_i}{dt} + \xi_i$$

$$I \frac{d^2 u_i}{dt^2} = -\frac{\partial U_{tot}}{\partial u_i} - \zeta' \frac{du_i}{dt} + \xi_i' + \lambda_i$$

$$\sigma_{LJ} = 1.5\sigma_0$$

$$\epsilon_{GB-GB} = \epsilon_0$$

$$\epsilon_{GB-Wall} = 0.25\epsilon_0$$

$$\epsilon_{GB-LJ} = 0.5\epsilon_0$$

$$\epsilon_{LJ-LJ} = \epsilon_0$$

$$\epsilon_{LJ-Wall} = \epsilon_0$$

B. Berardi, C. Fava, and C. Zannoni, Chem. Phys. Lett., 297, 8-14 (1998).

R. Everaers and M. R. Ejtehadi, Phys. Rev. E, 67, 041710 (2003).

R. Berardi, L. Muccioli, and C. Zannoni, J. Chem. Phys, 128, 024905 (2008).

To describe the dynamics of this system, the equation of motion taking into account the effect of an external field E parallel to the cell on the orientation of liquid crystals was numerically solved. The numerals in the mathematical formulae are parameters representing the strength ε of interaction used. The subscript GB denotes liquid crystal molecules, LJ denotes liquid molecules, and wall denotes wall particles. m denotes the mass of each particle, and ζ and ξ denote the contribution of a heat bath to keep the temperature constant.

Figure 24:
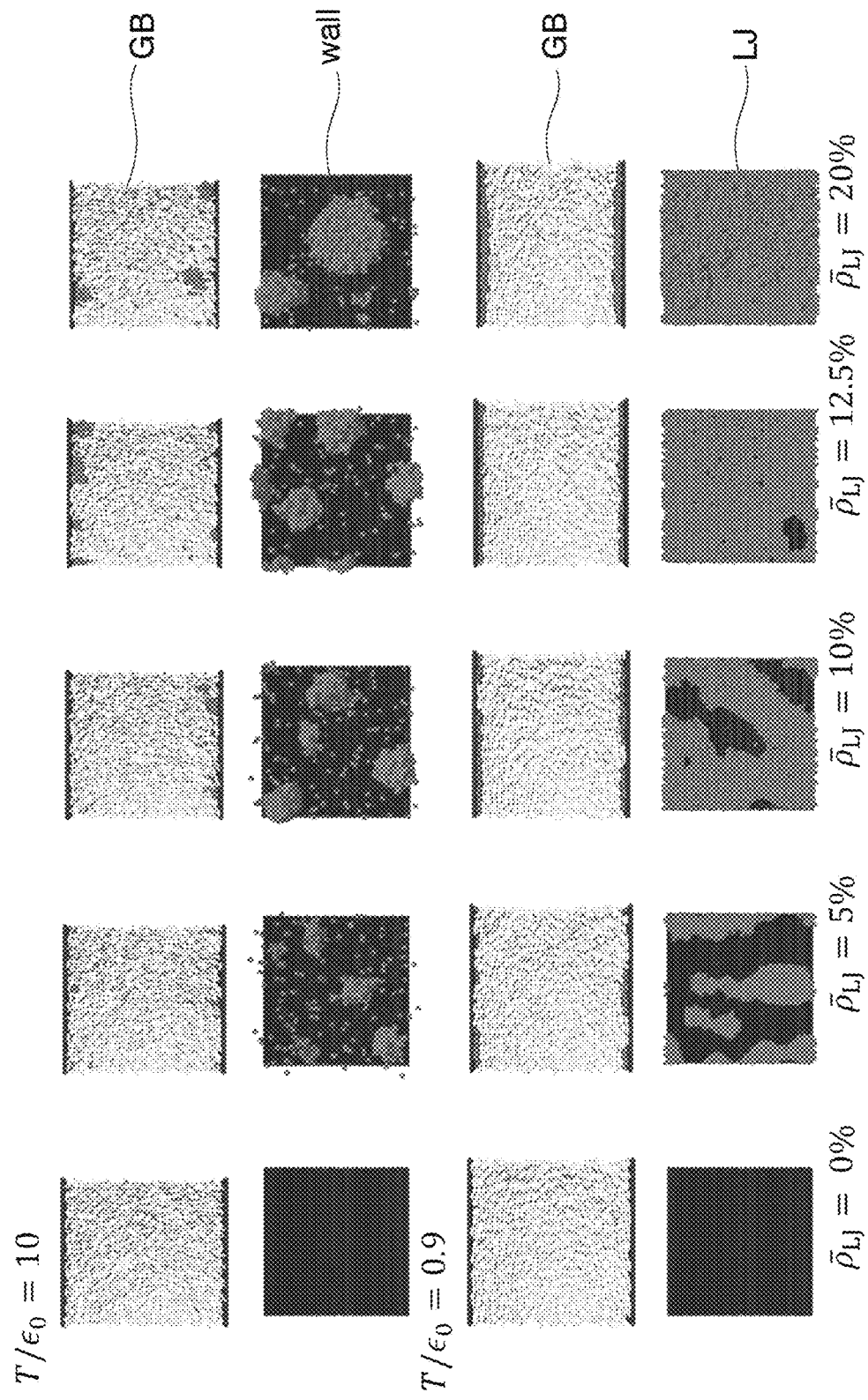
FIG. 24 is a schematic view of the particle distribution at different temperatures T and different number densities $\rho_{LJ}$ of isotropic liquid molecules.

FIG. 24 shows the particle distribution at different temperatures T and different number densities of isotropic liquid molecules $\rho_{LJ}$. Liquid crystal molecules GB are represented by elongated particles, and liquid molecules LJ represent isotropic liquid molecules. Wall particles WALL of deep colors represent a substrate and have planar alignment in the left-right direction on the drawing.

The upper two rows in FIG. 24 (T/ε₀=10) show the isotropic state of randomly oriented liquid crystal particles at high temperature. Among them, the upper row shows the cell viewed from the side, and the lower row shows the vicinity of the lower surface excluding liquid crystal molecules. It is observed that liquid crystal molecules and liquid molecules undergo phase separation even at high temperature. An increased number of isotropic liquid molecules result in the formation of larger droplets.

The lower two rows (T/ε₀=0.9) are for low temperature. Liquid crystal molecules have a nematic phase aligned in the left-right direction on the drawing, and the isotropic liquid is adsorbed on the wall.

It is observed that an increased number density of liquid molecules results in a change in coverage.

At a sufficiently high number density, the isotropic liquid completely covers the cell wall. At a number density of 5%, the coverage is approximately 50.3%. This means that the proportion of bare walls with strong anchoring is 49.7% and walls with weak anchoring is 50.3%. At a number density of 10%, the coverage is approximately 90%.

Due to the dependence on the cell thickness or temperature, the number density of liquid molecules and the coverage are not necessarily in a one-to-one relationship. The temperature is normalized with respect to the typical intermolecular interaction strength, and a phase transition occurs at T/ε₀=approximately 1.1.

Figure 25:
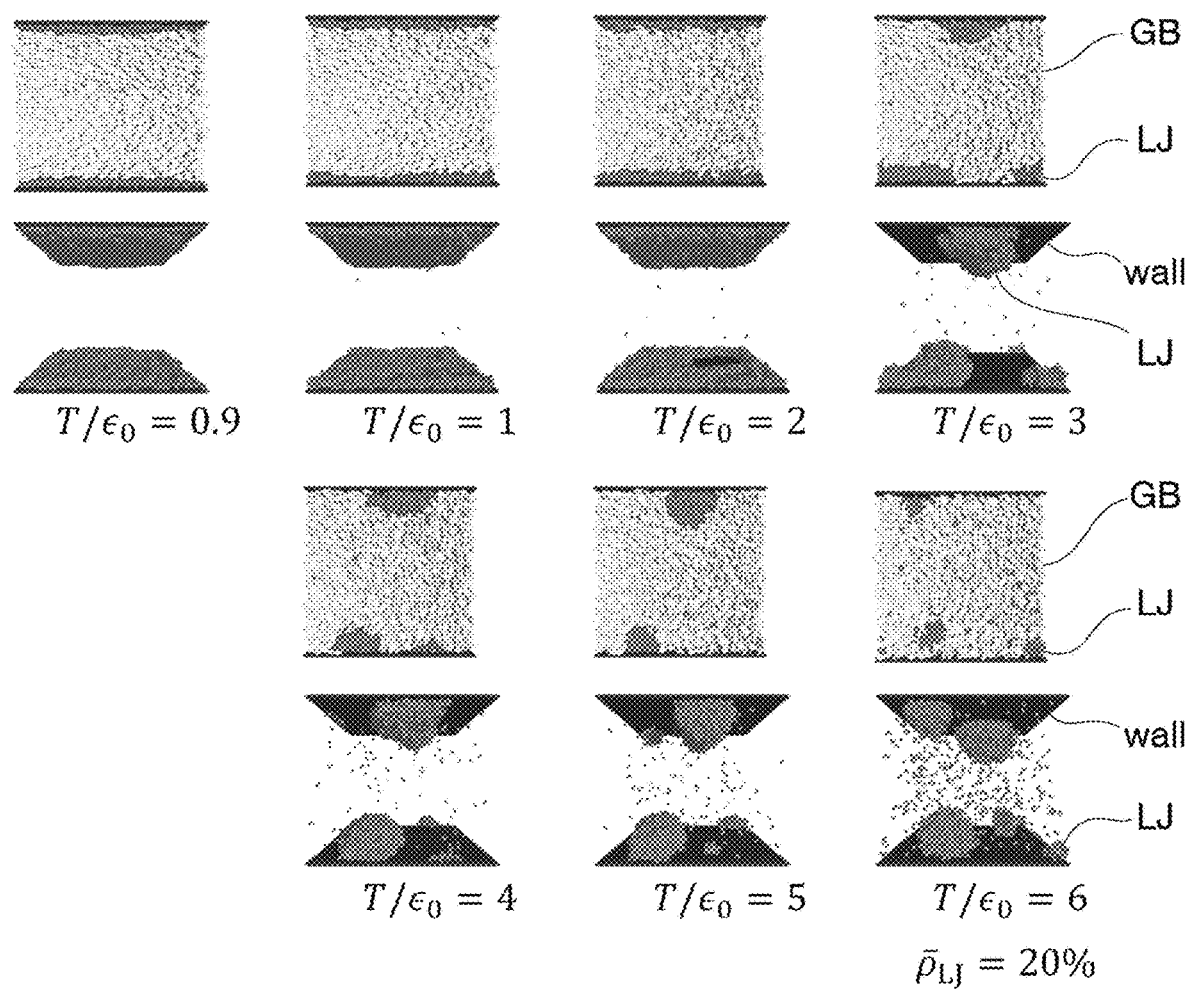
FIG. 25 is a schematic view of numerical calculation patterns at different temperatures when the number density of liquid molecules is 20%.

FIG. 25 shows numerical calculation patterns at different temperatures when the number density of liquid molecules is 20%. While the temperature is changed, a liquid phase composed of liquid molecules LJ appears as droplets at high temperature and are adsorbed on the wall when the temperature is decreased.

Figure 26:
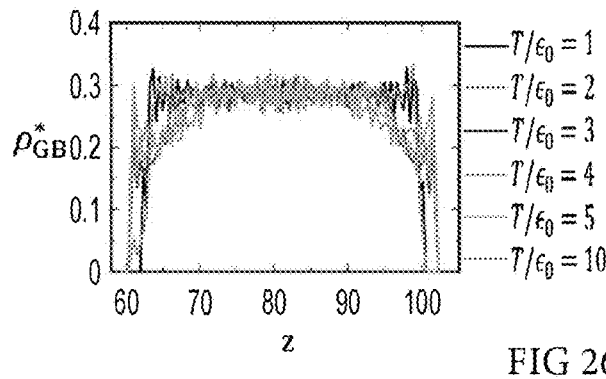
FIG. 26(A) is a graph of the spatial distribution of the number density of liquid crystal molecules in the cell thickness direction.
FIG. 26(B) is a graph of the spatial distribution of isotropic liquid molecules in the cell thickness direction.
FIG. 26(C) is a graph of the spatial distribution of the average orientation of nematic liquid crystal molecules in the cell thickness direction.
Figure 26:
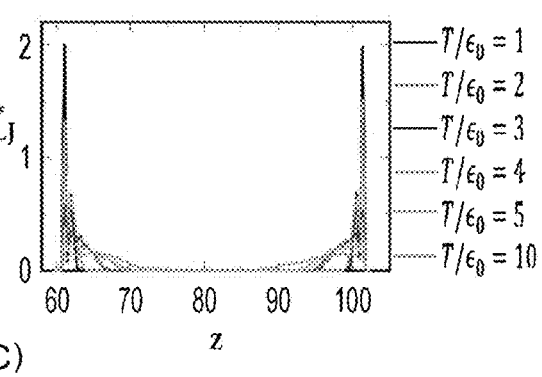
Figure 26:
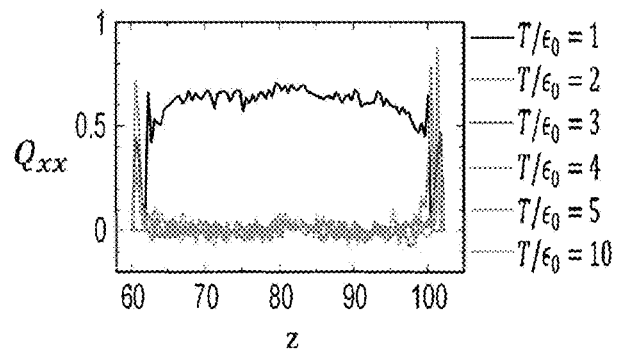

FIG. 26(A) shows the spatial distribution of the number density of liquid crystal molecules in the cell thickness direction. The number density of liquid molecules was fixed at 20%, and the temperature was changed. Each end of the graph corresponds approximately to the position of a surface of the cell. Although liquid crystal molecules are almost uniformly distributed near the center of the cell, the density decreases near the wall, and the effects are significant at low temperatures.

FIG. 26(B) shows the spatial distribution of isotropic liquid molecules in the cell thickness direction. Liquid molecules are adsorbed on the wall, which becomes more noticeable as the temperature decreases. Thus, the number density of liquid crystal molecules in FIG. 26(A) decreased with decreasing temperature.

FIG. 26(C) shows the spatial distribution of the average orientation of nematic liquid crystal molecules in the cell thickness direction. A more positive value indicates molecules more oriented in the x-axis direction. A value closer to 0 indicates more randomly oriented molecules. T/ε_0=2 or more results in an isotropic phase, 0 near the center, and slightly aligned molecules in the x-axis direction near the wall. T/ε_0=1 results in a nematic phase and molecules oriented in the x-axis direction due to the anchoring effects.

Figure 27:
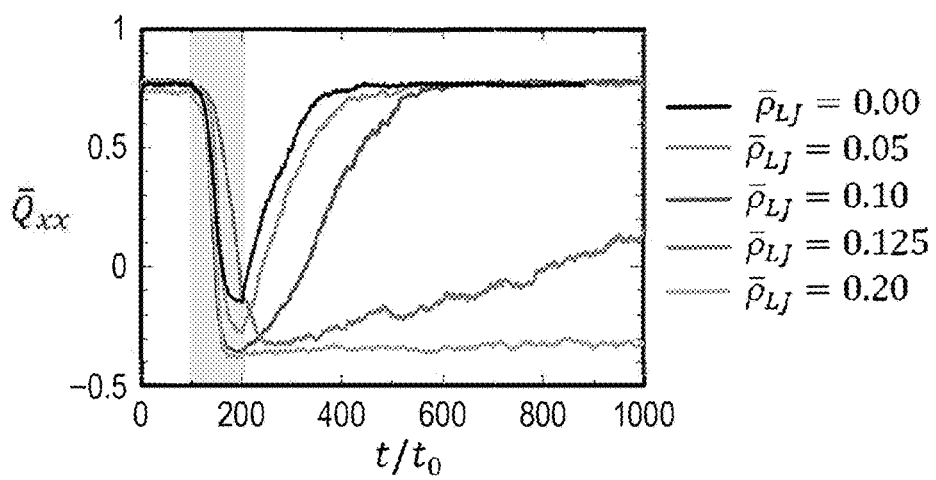
FIG. 27 is a graph of the temporal change of molecules oriented in the x-axis direction (anchoring direction) on average when an external field is applied in the y-axis direction to nematic liquid crystals aligned in the x-axis direction.

FIG. 27 shows the temporal change of molecules oriented in the x-axis direction (anchoring direction) on average when an external field is applied in the y-axis direction to nematic liquid crystals aligned in the x-axis direction. An external field E=(0, 1, 0) was applied in the y-axis direction (the cell surface was perpendicular to the z-axis) during 100<t<200.

The coverage was changed with the number density of liquid molecules.

An impurity concentration "$\rho_{LJ}$=0%" corresponds to "coverage 0%", an impurity concentration "$\rho_{LJ}$=5%" corresponds to "coverage 50.3%", an impurity concentration "$\rho_{LJ}$=10%" corresponds to "coverage 84.7%", an impurity concentration "$\rho_{LJ}$=12.5%" corresponds to "coverage 99.0%", and an impurity concentration "$\rho_{LJ}$=20%" corresponds to "coverage 100%".

At a low coverage, molecules start to be aligned in the y-axis direction on average during the application of an external field, and the value decreases. When the external field is removed, the original state is restored due to the anchoring effects and the elasticity of liquid crystals.

At a coverage of 100%, the orientation of molecules aligned in the external field direction does not return even after removal of the external field.

A change in coverage results in behavior between above two cases.

In particular, the relaxation time after removal of the external field increases with the coverage.

An increase in coverage results in slower relaxation during OFF. At a sufficient coverage, molecules do not return to their original orientation.

A non-glide weak anchoring interface is formed at an impurity concentration or coverage of "more than $\rho_{LJ}$=0% (coverage 0%) and less than $\rho_{LJ}$=10% (coverage 84.7%)". $\rho_{LJ}$=5% (coverage 50.3%) means that an interface with strong anchoring is 49.7%, and an interface with non-anchoring is 50.3%.

A specific example of a method for confirming non-glide can be exemplified as follows based on simulation results. As shown in the results in FIG. 27, at a coverage of 100%, the orientation of molecules aligned in the external field direction does not return even after removal of the external field. This is the same as or similar to the glide phenomenon in which the interface is covered with a liquid, so that the anchoring force that controls the initial alignment disappears and an external force changes the alignment direction. At a coverage of 0%, upon the removal of an external force, the alignment direction of liquid crystal molecules returns to the initial alignment, which is the same as or similar to the non-glide phenomenon. An increase in coverage from 0% results in a gradual increase in relaxation time after removal of the external field. In other words, the relaxation time after removal of the external field is longer in the glide phenomenon than in the non-glide phenomenon. Thus, an actual non-glide interface may be a non-glide interface having a relaxation time equal to, or equal to or less than three times, or preferably equal to or less than two times the relaxation time of an interface subjected to rubbing of strong anchoring.

Figure 28:
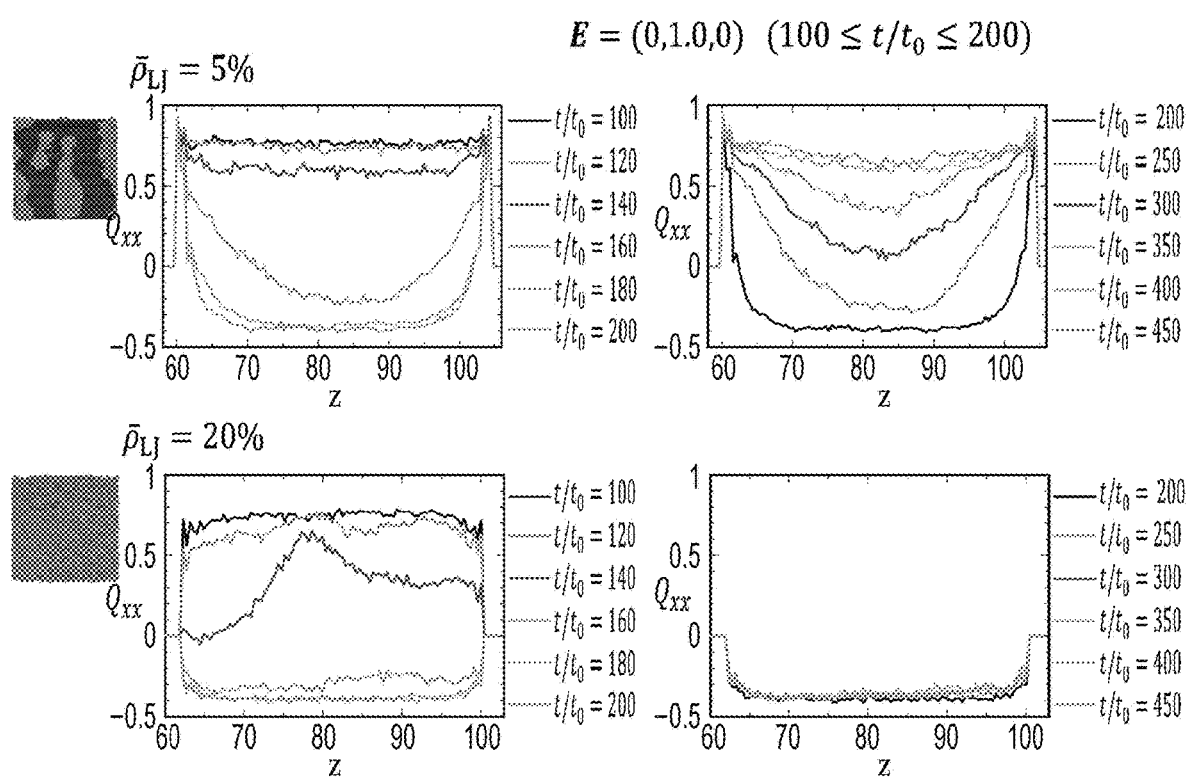
FIG. 28 is a graph of the time evolution of the spatial distribution of an xx component (Qxx) of a tensor liquid crystal order parameter in the cell thickness direction when an external field is applied.

FIG. 28 shows the time evolution of the spatial distribution of an xx component (Qxx) of a tensor liquid crystal order parameter in the cell thickness direction when an external field is applied. Positive values indicate an orientation in the anchoring axis direction (the x direction), and negative values indicate an orientation in the external field direction (The y direction).

The graph at the upper left in FIG. 28 ($\rho_{LJ}$=5%) shows the change after the external field is applied at a coverage of 50.3%. The graph at the upper right shows the change after the external field is removed.

The graphs at the lower left ($\rho_{LJ}$=20%) and at the lower right in FIG. 28 show the change after the external field is applied and removed a: a coverage of 100%.

At a coverage of 50.3%, like a coverage of 0%, the orientation field at each end on the upper and lower walls remains fixed in the anchoring direction (the x direction). The central portion is directed more toward the external field.

It can be seen that the behavior after removal of the external field is restored to the original state from the upper and lower walls.

At a coverage of 100%, molecules near the walls were also observed to be directed toward the external field. There is a tendency that molecules are aligned in the external field direction uniformly in the cell thickness direction. After removal of the external field, molecules do not return to the original state and remain oriented in the external field direction. This is consistent with the behavior of the slippery interface observed in experiments.

Figure 29:
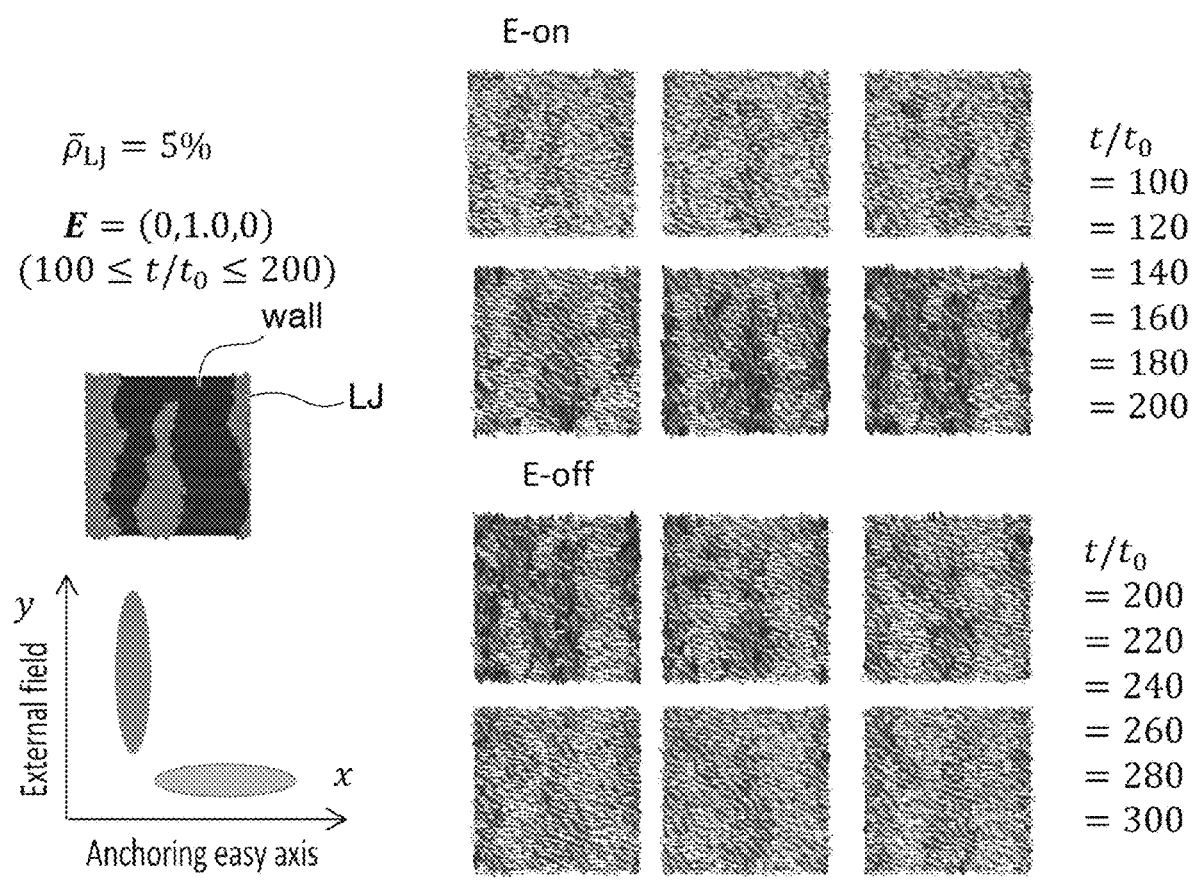
FIG. 29 is a graph of the temporal change in the spatial distribution of the orientation of liquid crystal molecules near the lower surface at a coverage of 50.3% ($\rho_{LJ}$=5%).

FIG. 29 shows the temporal change in the spatial distribution of the orientation of molecules near the lower surface at a coverage of 50.3% ($\rho_{LJ}$=5%). The upper six figures in FIG. 29 show the state after the external field E is applied (E-on). The lower six figures in FIG. 29 show the state after the external field E is removed (E-off). Elongated particles represent the orientation of molecules and mean orientation in the anchoring direction (the x direction) or the external field direction (the y direction).

After the application of the field, the orientation of molecules is almost fixed in a region not covered with the isotropic liquid (the portion of wall particles WALL of deep colors in the figure on the left in FIG. 29). On the other hand, molecules are aligned in the external field direction in a region covered with the isotropic liquid (the portion of liquid molecules LJ in the figure on the left in FIG. 29). This means that the response of molecules near the wall to the external field varies greatly depending on whether there is the isotropic liquid between the wall and the liquid crystal molecules.

In the lower figures in FIG. 29, after removal of the external field, it can be seen that liquid crystal molecules in the portion covered with the isotropic liquid also return to the original orientation. In the covered region, although the effects of the wall should not be directly transmitted, it is thought that the effects of the uncovered region are transmitted and the original orientation is restored.

Figure 30:
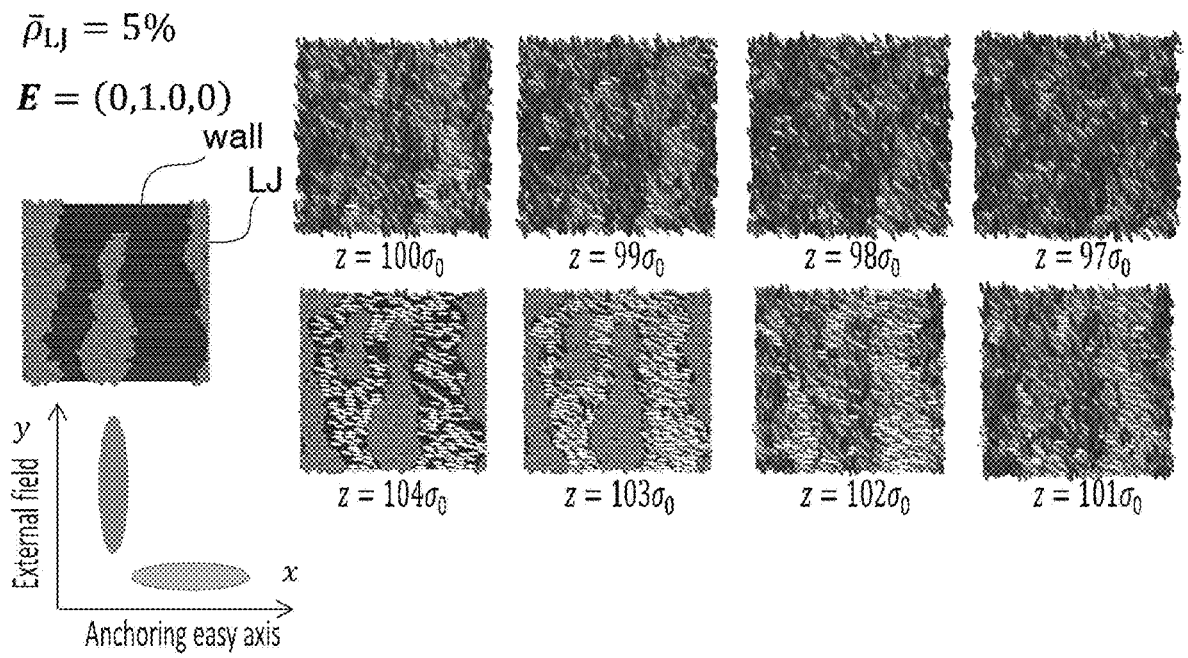
FIG. 30 is a schematic view of liquid crystal molecules near a wall when an external field E is applied, explaining the dependence of the orientation of the liquid crystal molecules on the distance from the wall.

FIG. 30 is a schematic view of liquid crystal molecules near a wall when an external field E is applied, explaining the dependence of the orientation of the liquid crystal molecules on the distance from the wall. The figure at the lower left (z=104$\sigma_0$) in FIG. 30 is nearest to the wall, and the figure at the upper right (z=97$\sigma_0$) is far from the wall. Liquid crystal molecules adsorbed on an uncovered portion remain oriented in the x direction (anchoring direction), and liquid crystal molecules are gradually oriented in the external field direction (the z direction) with the distance from the wall.

On the other hand, in the covered region, it can be seen that liquid crystal molecules are oriented in the external field direction (the z direction) immediately from the wall. The results of FIGS. 24 to 29 show that the spatial distribution of the order parameter is nonuniform in the plane.

Figure 31:
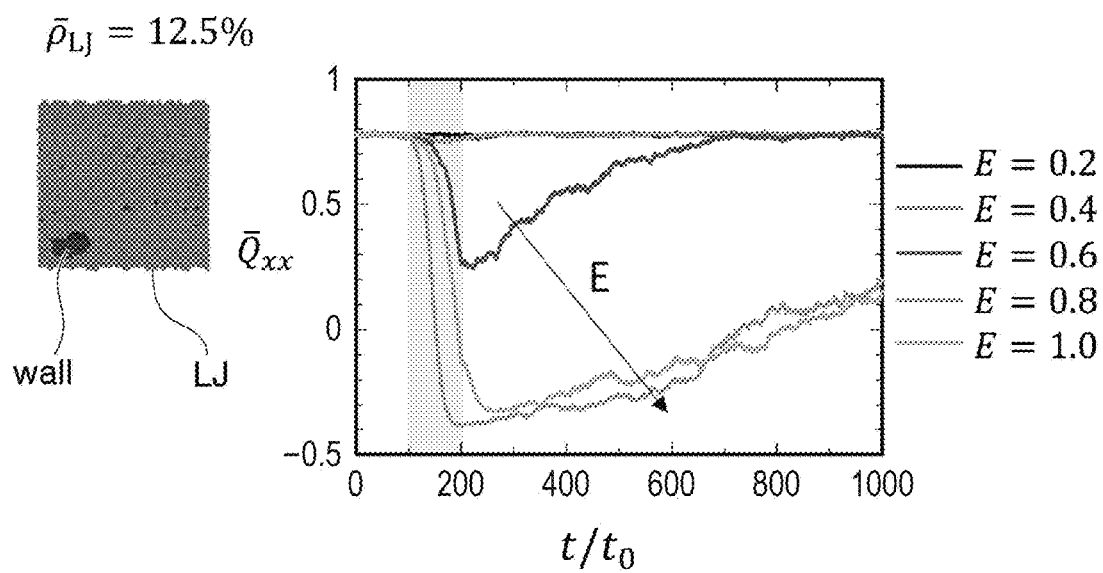
FIG. 31 is a graph of the temporal change in average order parameter at a coverage of 99% ($\rho_{LJ}$=12.5%) while the external field strength is changed.

FIG. 31 is a graph of the temporal change in average order parameter at a coverage of 99% ($\rho_{LJ}$=12.5%) while the external field strength is changed. An external field was applied during 100<t/$t_0$<200. Positive values of an xx component (Qxx) of a tensor liquid crystal order parameter indicate molecules oriented in the anchoring direction on average, and negative values indicate molecules oriented in the external field direction. Although orientation in the external field direction is expected in the presence of the external field, it can be seen that the original state is restored after removal of the external field even at such a high coverage. Thus, even a small bare surface gradually restores the director after removal of the external field.

Figure 32:
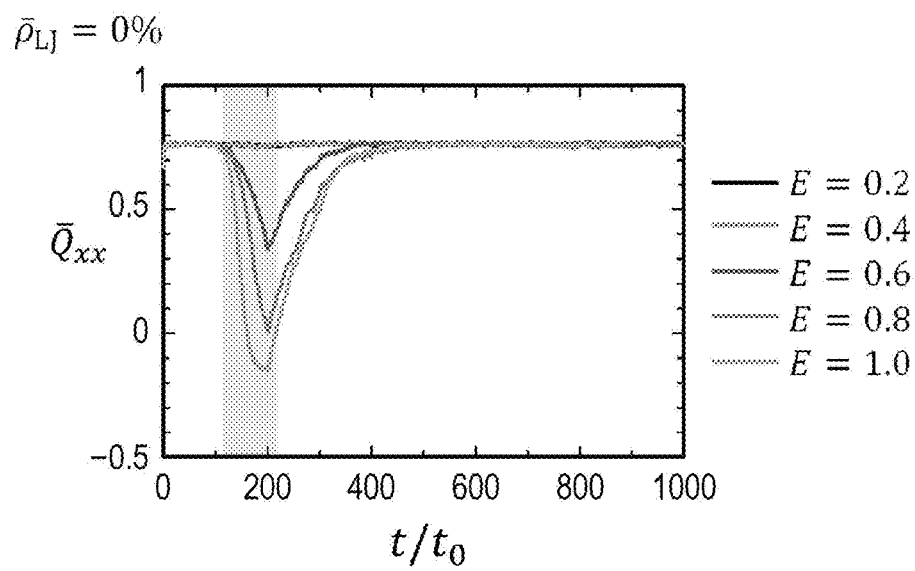
FIG. 32 is a graph of the temporal change in average order parameter at a coverage of 0% ($\rho_{LJ}$=0%) while the external field strength is changed.

FIG. 32 is a graph of the temporal change in average order parameter at a coverage of 0% ($\rho_{LJ}$=0%) while the external field strength is changed. As expected, upon the application of an external field, molecules are oriented in the external field direction, and upon the removal of the external field, the molecules return to their original state due to the anchoring effects and the elasticity of the liquid crystals. Although the change increases with the external field, there is no significant difference in dynamics itself.

The simulation shows that a strong anchoring interface and a non-anchoring interface undergo microphase separation, or it can be realized by nanoprinting. The bulk properties of liquid crystals vary averagely from an uncovered system to a completely covered system depending on the coverage.

The size of the numerical simulation is only approximately 50 times of that in the molecular minor axis direction (several angstroms) and is far from the cell size used in experiments. Although the relaxation time and the magnitude of the external field required to cause a change depend greatly on the cell size, the numerical simulation can estimate qualitative behaviors.

(Refresh Driving Method)

When the liquid crystal device according to Example 1 after realignment treatment was allowed to stand for approximately 10 minutes without voltage application, black was reproduced poorly, as shown in the photograph on the right in FIG. 7(a). The black luminance was 0.70 cd/m$^2$, the white luminance was 387 cd/m$^2$, and the CR value (black luminance/white luminance ratio) was 553, which is insufficient.

Example 9

A refresh driving pulse "2.5 V/100 ms=>0 V/200 ms" was sent at regular intervals of 1 minute to display improved black. This resulted in improved dense black with a black luminance of 0.35 cd/m$^2$, a white luminance of 387 cd/m$^2$, and a CR value (black luminance/white luminance ratio) as high as 1106.

Example 10

A refresh driving pulse "2.5 V/15 ms=>0 V/15 ms" was sent at regular intervals of 1 minute to display improved black. This resulted in improved dense black with a black luminance of 0.37 cd/m$^2$, a white luminance of 387 cd/m$^2$, and a CR value (black luminance/white luminance ratio) as high as 1045.

Example 11

As described above, the non-slip alignment regulating force between the liquid crystal component and the alignment layer is referred to as non-glide. Whether the interface is non-glide can be determined by changing the alignment direction of liquid crystals from the initial alignment direction by an external force and then determining whether the alignment of the liquid crystal molecules returns to the initial alignment direction when the external force is removed. At the glide interface, it is shown that liquid crystals after removal of the external force are orientated in a direction different from the initial alignment direction, and the alignment regulating force between the liquid crystal component and the alignment layer is glided by the application of the external force. On the other hand, at a non-glide interface, the alignment regulating force does not glide by the application of the external force, and liquid crystals return to the initial alignment direction after the external force is removed. Returning to the alignment direction here means that the angle between the initial alignment direction and the alignment direction returned upon the removal of an external force after the alignment direction is changed by applying the external force is 2 degrees or less, preferably 1 degree or less, more preferably 0.5 degrees or less, particularly preferably 0.1 degrees or less.

Figure 33:
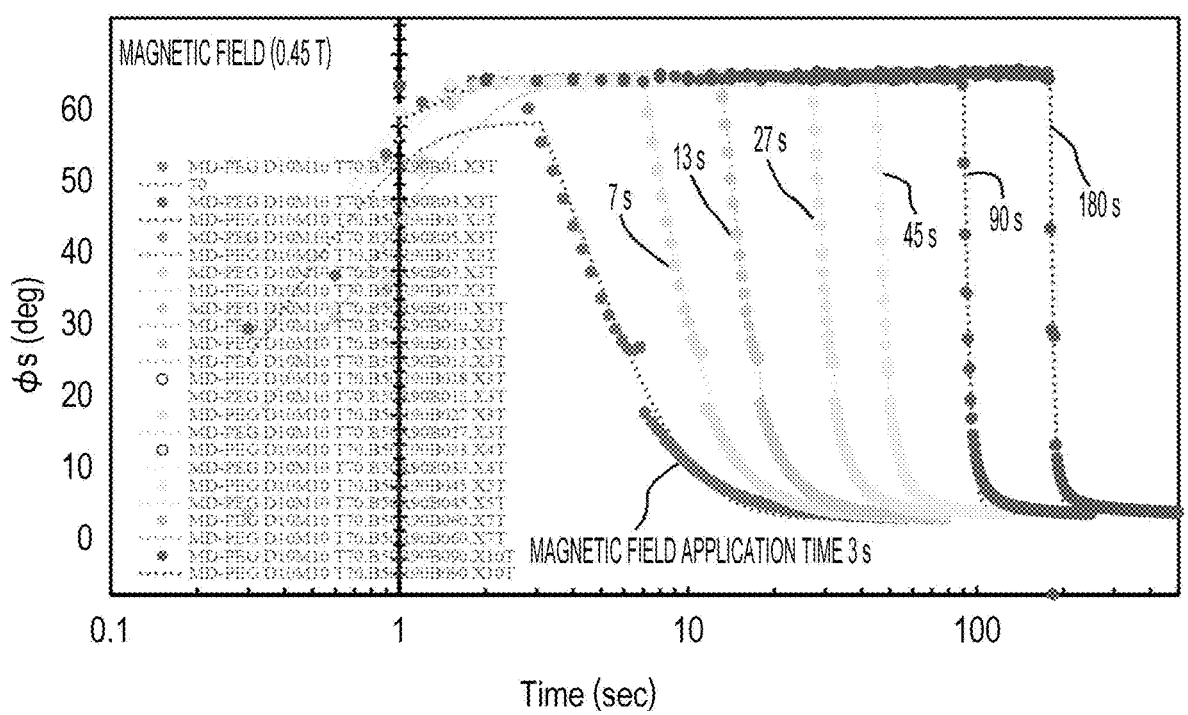
FIG. 33 is a graph of changes in the alignment direction of liquid crystal molecules at a non-glide interface.

A specific example of a method for confirming non-glide is described below. FIG. 33 is a graph of changes in the alignment direction of liquid crystal molecules at a non-glide interface.

A cell with a cell thickness of 25 μm was formed of two first substrates with the first alignment layer prepared by baking at 130° C. for 90 minutes on the hot plate used in Example 1. The alignment layer was located within the cell. A nematic composition (E44 manufactured by Merck & Co., Ltd.) was injected into the cell. Liquid crystal molecules were cooled from a liquid state to a liquid crystal state in a magnetic field (0.45 T) to be unidirectionally aligned. A magnetic field was then applied at 70° C. for a predetermined time (3, 7, 13, 27, 45, 90, and 180 seconds from the left in FIG. 33) in a direction different from the alignment direction to change the alignment direction of liquid crystal molecules. After the alignment direction was held, the magnetic field was removed to confirm whether the liquid crystal molecules returned to the initial alignment direction (FIG. 33). As a result, even when the magnetic field was applied for 180 seconds in a direction different from the alignment direction, the liquid crystal molecules returned to the initial alignment direction, showing that the interface was non-glide.

Comparative Example 5

Figure 34:
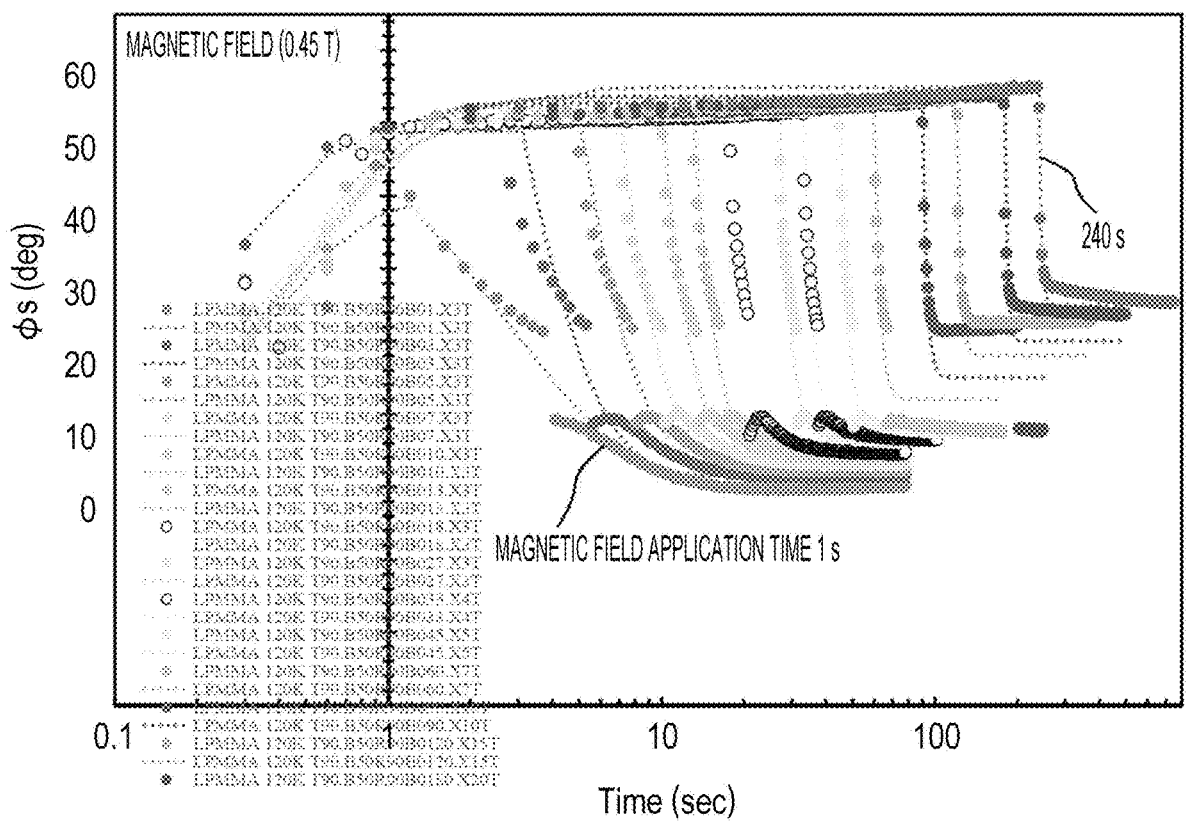
FIG. 34 is a graph of changes in the alignment direction of liquid crystal molecules at a glide interface.

FIG. 34 is a graph of changes in the alignment direction of liquid crystal molecules at a glide interface.

A commercial PMMA (Mw=100,000) was dissolved in cyclopentanone (10%) and was applied to two washed glass substrates by spin coating (3500 rpm) with a spin coater. A cell with an interface on each side was then formed (cell thickness: 25 μm). The interface was baked at 100° C. for 30 minutes. A nematic composition (E44 manufactured by Merck & Co., Inc.) was injected. Liquid crystal molecules were cooled from a liquid state to a liquid crystal state in a magnetic field (0.45 T) to be unidirectionally aligned. A magnetic field was then applied at 90° C. for a predetermined time (1, 3, 5, 7, 10, 13, 18, 27, 33, 45, 60, 90, 120, 180, and 240 seconds from the left in FIG. 34) in a direction different from the alignment direction to change the alignment direction of liquid crystal molecules. After the alignment direction was held, the magnetic field was removed to confirm whether the liquid crystal molecules returned to the initial alignment direction (FIG. 34). As a result, the liquid crystal molecules did not return to the initial alignment direction at any application time, showing that the interface was a glide interface.

Examples 12 and 13

Optical devices according to Examples 12 and 13 were produced using a slippery material precursor described below.

(Slippery Material Precursor)

3016 μl of ultrapure water for hydrolysis was added to 50 ml of super-dehydrated ethanol, and an appropriate amount of acetic acid (99.9%) was added to the solution such that the solution had a pH of 3.8. Thus, a mixed solvent was prepared. 20% by volume of a silane coupling agent ethyltrimethoxysilane represented by the following formula (C2) (hereinafter referred to as a compound C2) was dissolved in the solvent, which was then stirred at room temperature for 12 hours to prepare a solution (1).

[Chem. 28]

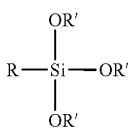

(C2)

(R denotes an ethyl group, and R' denotes a methyl group.)

The solution (1) was heated at 120° C. for 4 hours to evaporate the solvent, and dehydration condensation of a hydrolysate of the compound C2 was allowed to proceed to produce a honey-like viscous polymer (hereinafter referred to as a polymer C2). The polymer C2 was allowed to stand at room temperature for approximately 1 hour and was then dissolved in cyclopentanone to prepare a transparent and uniform cyclopentanone solution (2) in which 20% by weight of the polymer C2 was dissolved. The solution (2) was diluted to 1% by weight with cyclopentanone to prepare a slippery material precursor solution (3).

(First Substrate)

The slippery material precursor solution (3) was applied to a glass substrate by spin coating at 3000 rpm for 30 seconds and was heated at 130° C. for 1 hour in a vacuum to allow dehydration condensation to further proceed. Thus, the glass substrate covered with a thin film of the polymer C2 was formed.

(Second Substrate)

A polyimide film was formed on a glass substrate and was unidirectionally rubbed to prepare a strong anchoring substrate.

Example 12: Preparation of Liquid Crystal Cell Having Weak Anchoring Interface on Both Faces A cell with a cell gap of 10 μm formed of two first substrates was produced. A mixed liquid crystal of JC1041XX:5OCB=1:1 (weight ratio) was injected into the cell to produce a liquid crystal cell having a weak anchoring interface on both faces (that is, an optical device according to Example 12).

Figure 35:
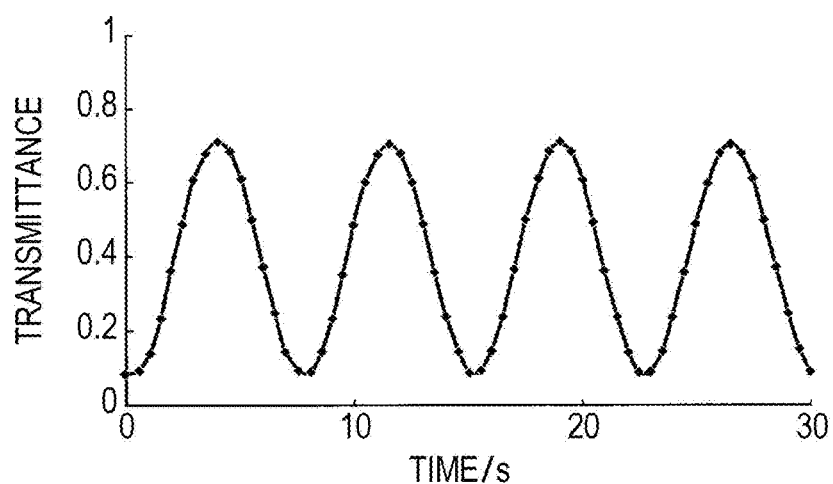
FIG. 35 is a graph of a change in the average luminance of a liquid crystal cell having a weak anchoring interface on both faces observed at 75° C. with a polarizing microscope in a 250-mT and 2-rpm rotating magnetic field. The liquid crystal cell includes two glass sheets spin-coated with a polymer C2.

A 300-mT and 2-rpm rotating magnetic field parallel to the cell surface was applied at 75° C. to the liquid crystal cell having a weak anchoring interface on both faces. Transmittance was measured with a polarizing microscope. As shown in FIG. 35, the transmittance fluctuated greatly and had four equally spaced transmittance peaks per rotation of the magnetic field. A high maximum transmittance of approximately 0.7 indicates planar alignment (horizontal alignment) of liquid crystals in this cell, and the four equally spaced transmittance peaks indicate that the orientation vector continues to rotate following the magnetic field at a constant angular velocity while having a phase delay. In the optical device according to Example 12, each interface between the liquid crystal component and the alignment layer formed of the polymer C2 forms a non-glide weak anchoring interface.

Figure 36:
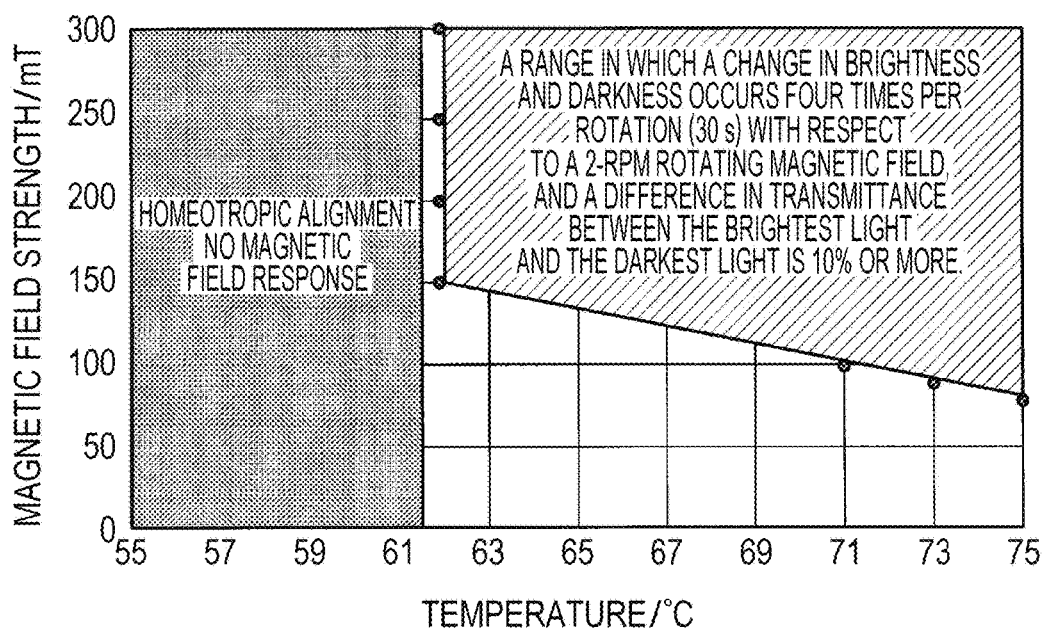
FIG. 36 is a temperature-magnetic field strength phase diagram of a region of a liquid crystal cell in which the orientation vector responds to a 2-rpm rotating magnetic field when the magnetic field is applied to the liquid crystal cell. The liquid crystal cell includes two first substrates and has a weak anchoring interface on both faces.

The amplitude of the transmittance decreased with decreasing temperature. FIG. 36 is a temperature-magnetic field strength phase diagram of a magnetic field response region with a transmittance amplitude of 0.1 or more. Although the threshold magnetic field strength showing response increased gradually from 75° C. to 62° C., the weak anchoring interface continued appear. By contrast, in the low-temperature region of 62° C. or less, the visual field of the polarizing microscope was darkened, a clear isogyre indicating uniaxial orientation perpendicular to the cell surface was observed in the conoscopic observation of the polarizing microscope, and the response to the magnetic field was lost, as shown in FIG. 36. These results show that anchoring transition from the planar alignment to the homeotropic alignment occurred at approximately 62° C. Thus, it is shown that an interface with weak homeotropic alignment that causes the anchoring transition of homeotropic alignment and planar alignment (homogeneous alignment) or exhibits either of homeotropic alignment and planar alignment (homogeneous alignment) depending on the situation is also suitable for a slippery interface.

(Production of Optical Device according to Example 13)

A cell with a cell gap of 10 μm formed of the first substrate and the second substrate was produced. A mixed liquid crystal of JC1041XX:5OCB=1:1 (weight ratio) (transition point: approximately 78° C.) was injected into the cell to produce an optical device (liquid crystal cell) according to Example 13.

Figure 37:
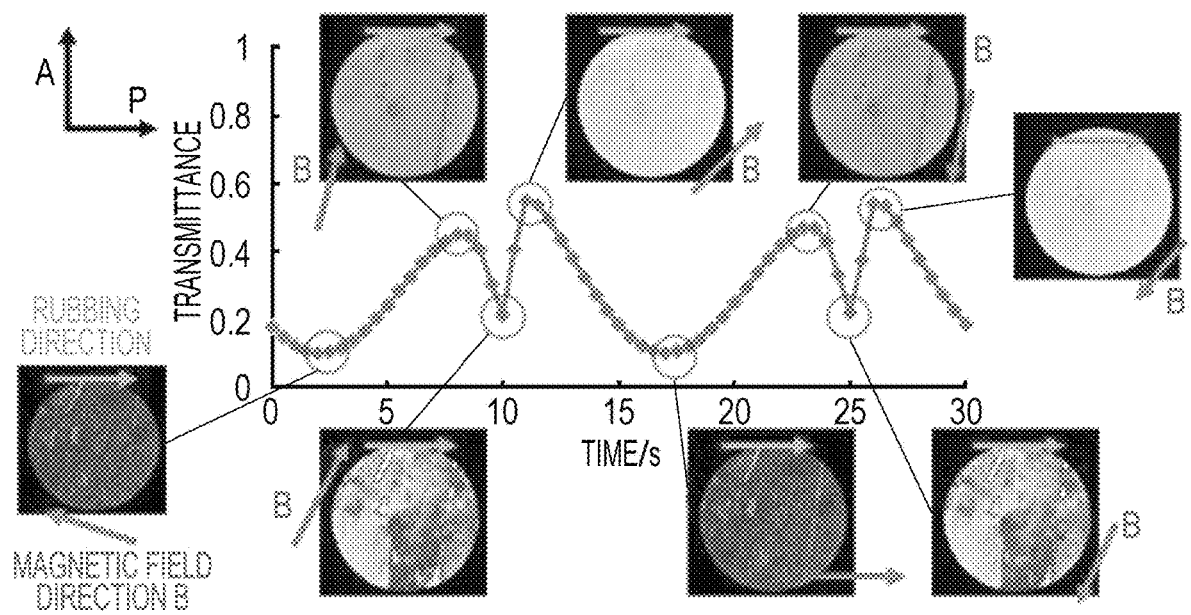
FIG. 37 is a graph of polarizing microscope images and a change in average luminance in a field of the polarizing microscope when a 250-mT and 2-rpm rotating magnetic field is applied at 75° C. to a liquid crystal cell that includes a combination of a first substrate and a second substrate.

As shown in FIG. 37, application of a 250-mT and 2-rpm rotating magnetic field parallel to the cell surface of the liquid crystal cell changed polarizing microscope images and the transmittance of white light. A high maximum transmittance of approximately 0.5 indicates that liquid crystals in the cell are in planar alignment (horizontal alignment). Although four peaks per rotation were observed at high temperature where the response is good, unlike the liquid crystal cell having a weak anchoring interface on both faces, the peak intervals are not equal. This is probably because the orientation vector is less likely to continue rotating in the same direction as the rotation of the magnetic field due to the strong anchoring substrate located on one side. The orientation vector on the strong anchoring substrate side is fixed, whereas the orientation vector on the weak anchoring interface side is twisted following the rotation of the magnetic field but returns to the original state without turning around due to the balance with the elasticity. The transmittance change probably reflects this. On the other hand, in a low-temperature region of 30° C. or less, the change in luminance with the rotation of the magnetic field is twice per rotation and is considered to be a simple mechanism of the rotation of the plane of polarization due to the rotation of the magnetic field and restoration of twist due to the elasticity of liquid crystals. In the optical device according to Example 13, the interface between the liquid crystal component and the alignment layer formed of the polymer C2 forms a non-glide weak anchoring interface.

Figure 38:
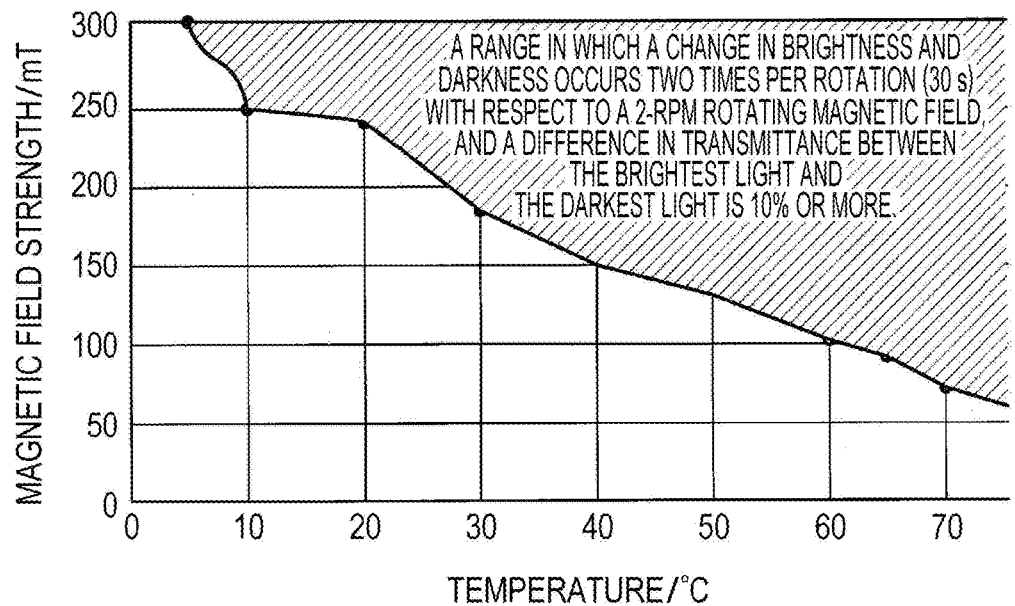
FIG. 38 is a temperature-magnetic field strength phase diagram of a region of a liquid crystal cell according to Example 13 in which the orientation vector responds to a 2-rpm rotating magnetic field when the magnetic field is applied to the liquid crystal cell. The liquid crystal cell includes a combination of a first substrate and a second substrate.

The measurement of FIG. 37 was performed over a wide temperature range. FIG. 38 is a phase diagram of a magnetic field response region with a transmittance amplitude of 10% or more. In the liquid crystal cell according to Example 13, although the magnetic field response decreases with decreasing temperature, the liquid crystal cell had slippery characteristics in a wide temperature range of 75° C. to 5° C. in a 300-mT rotating magnetic field. The liquid crystal cell having a weak anchoring interface on both faces had homeotropic alignment at 62° C. or less and lost in-plane weak anchoring characteristics. In the liquid crystal cell according to Example 13, however, the strong anchoring interface on one surface restricted the liquid crystal director to planar alignment and suppressed anchoring transition to homeotropic alignment, and consequently the liquid crystal cell had slippery characteristics in the wide temperature range of 75° C. to 5° C.

Examples 14 to 23

(First Substrate)

An electrode substrate with an interdigitated electrode illustrated in FIG. 8 was used in a 1 cm×2 cm drive region. The electrode width was 3.5 μm, and the interelectrode distance was 4.5 μm. An electric field approximately parallel to the substrate could be applied between electrodes. FIG. 9 illustrates a cross-sectional structure of the electrode. A glass substrate 31 had a thickness of 700 μm. A first electrode 38 (common electrode) made of ITO had a thickness of 100 nm. An insulating film 35 made of $SiN_x$ had a thickness of 300 nm. A second electrode 39 (interdigitated electrode) made of ITO had a thickness of 100 nm.

(Second Substrate)

A color filter substrate with a pixel size of 30 μm×90 μm was coated in the usual manner under the following conditions to form a photo-aligned polyimide alignment film. The polyimide film had a thickness of 100 nm.

Liquid: solid content 4% by weight,
Coating conditions: spin 2000 rpm, 12 seconds,
Pre-baking: 80° C., 90 seconds,
Post-baking: 230° C., 30 minutes,
Exposure to polarized light: 254-nm light 200 mJ For pretreatment of the first substrate, (1) the first substrate was subjected to ozone cleaning by 172-nm UV radiation for approximately 10 minutes using an excimer UV apparatus manufactured by Ushio Inc., (2) the first substrate was subjected to ultrasonic cleaning in pure water for 10 minutes, (3) droplets of water were removed from the substrate by $N_2$ blowing, and (4) the first substrate was dried at 105° C. for 10 minutes.

The pretreated first substrate was spin-coated with the slippery material precursor solution (3) at 1500, 3000, or 4500 rpm for 30 seconds. The resulting resin film was baked on a hot plate at 100° C., 130° C., 160° C., or 190° C. for 30 minutes in a nitrogen atmosphere to form a first alignment layer on the first substrate.

Table 2 shows combinations of the above preparation conditions.

TABLE 2

| | | Example 14 | Example 15 | Example 16 | Example 17 | Example 18 |
|---|---|---|---|---|---|---|
| Opposite side Electrode side | Material | Strong anchoring treatment Slippery material precursor solution (3): 1 wt % | | | | |
| | Rotation rate rpm | 3000 | 1500 | 1500 | 4500 | 4500 |
| | Baking temperature °C. | 130 | 130 | 130 | 130 | 130 |

| | | Example 19 | Example 20 | Example 21 | Example 22 | Example 23 |
|---|---|---|---|---|---|---|
| Opposite side Electrode side | Material | Strong anchoring treatment Slippery material precursor solution (3): 1 wt % | | | | |
| | Rotation rate rpm | 3000 | 3000 | 3000 | 3000 | 3000 |
| | Baking temperature ° C. | 100 | 100 | 160 | 160 | 190 |

A photo spacer 42 3.3 μm in height was formed on one of the first substrate with the first alignment layer and the second substrate on which a second alignment layer 22 (polyimide film) subjected to photo-alignment treatment was formed. The first substrate was then bonded to the second substrate. A liquid crystal component (positive liquid crystal Δn=0.102, Δε=7) was injected by capillarity into the 3.3-μm space thus formed. FIG. 10 is a cross-sectional view of the cell after bonding.

In the liquid crystal devices according to Examples 14 to 23, the photo-aligned polyimide alignment film is formed on the second substrate (color filter substrate) on the first substrate side, and the first alignment layer is formed on the first substrate (electrode substrate) on the second substrate side. After the liquid crystal component is injected, the temperature is increased to the transition point of the liquid crystal component or higher and is then decreased. Thus, as illustrated in FIG. 11, liquid crystal molecules are also aligned on The first substrate (electrode substrate) side during no voltage application in the same direction as the photo-alignment treatment direction on the second substrate (color filter substrate) side. Thus, a non-glide LC director occurs on the first substrate (electrode substrate) side not subjected to photo-alignment treatment.

FIG. 12 illustrates the relationship between the direction of an LC director due to photo-alignment treatment on the color filter (CF) substrate side, the polarizer direction, and the analyzer direction. This enables black display during no voltage application and white display during voltage application.

Figure 39:
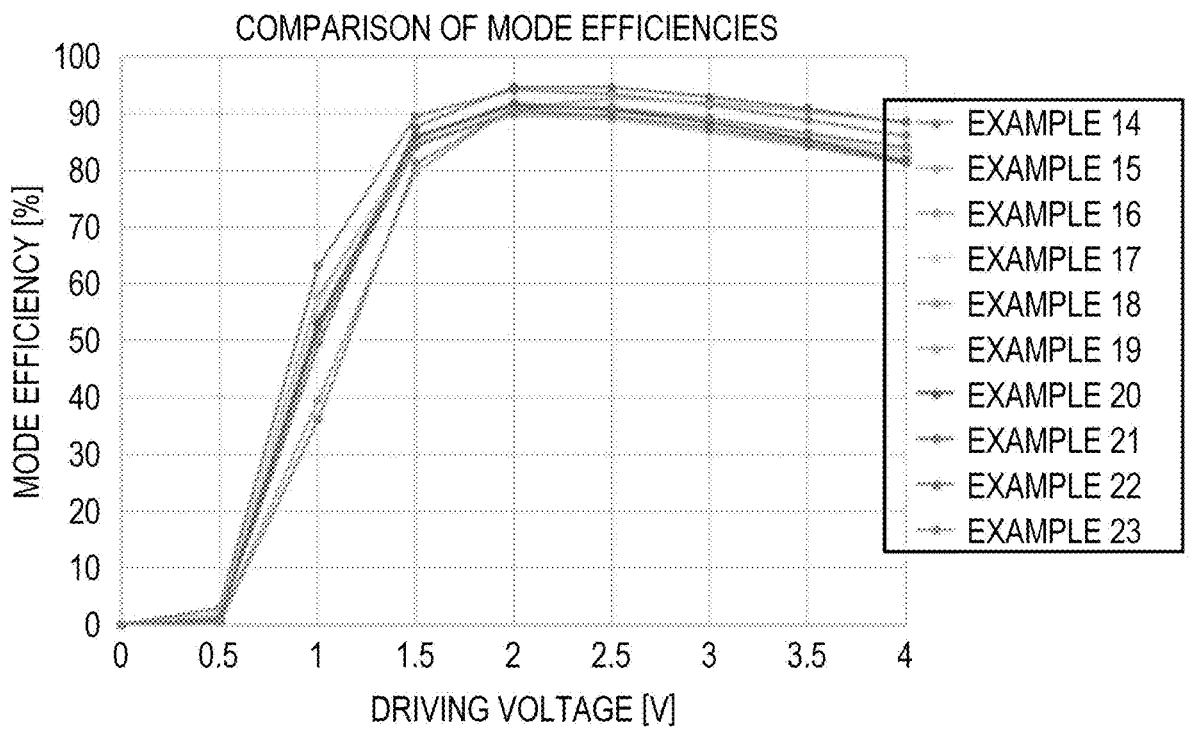
FIG. 39 is a graph of the evaluation results of the V-mode efficiency characteristics of a liquid crystal device.

FIG. 39 shows the evaluation results of the V-mode efficiency characteristics of the liquid crystal devices according to Examples 14 to 23.

Figure 40:
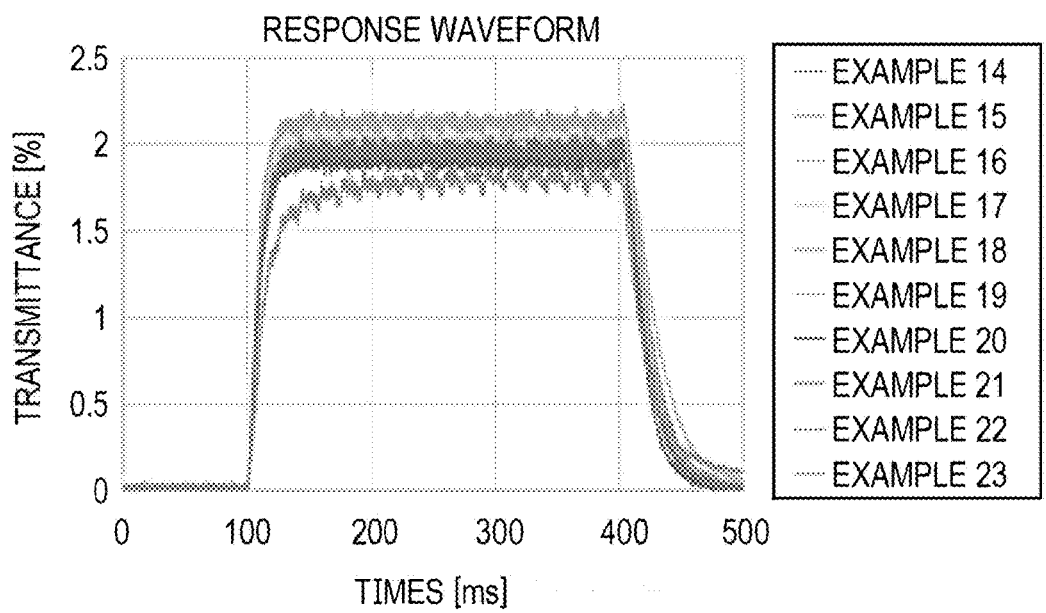
FIG. 40 is a graph of measured drive waveforms of a liquid crystal device.

FIG. 40 shows measured drive waveforms of the liquid crystal devices according to Examples 14 to 23. Table 3 shows the evaluation results of the voltage dependence of the response time of the liquid crystal devices according to Examples 14 to 23. In the optical devices according to Examples 14 to 23, the interface between the liquid crystal component and the first alignment layer forms a non-glide weak anchoring interface.

TABLE 3

| | | Example 14 | Example 15 | Example 16 | Example 17 | Example 18 |
|---|---|---|---|---|---|---|
| ON voltage 60 Hz V | | 2.0 | 2.0 | 2.0 | 2.0 | 2.5 |
| OFF voltage 60 Hz V | | 0.5 | 0.5 | 0.5 | 0.5 | 0.5 |
| Response | ON ms | 17.3 | 15.7 | 19.1 | 16.0 | 15.1 |
| | OFF ms | 41.5 | 38.3 | 52.1 | 34.4 | 36.3 |
| | ON + OFF ms | 58.8 | 54.0 | 71.2 | 50.4 | 51.4 |
| Mode efficiency % | | 94.1 | 89.7 | 92.0 | 90.6 | 92.8 |

| | | Example 19 | Example 20 | Example 21 | Example 22 | Example 23 |
|---|---|---|---|---|---|---|
| ON voltage 60 Hz V | | 2.0 | 2.0 | 2.0 | 2.0 | 2.5 |
| OFF voltage 60 Hz V | | 0.5 | 0.5 | 0.5 | 0.5 | 0.5 |
| Response | ON ms | 16.6 | 15.3 | 17.8 | 20.2 | 31.0 |
| | OFF ms | 34.8 | 31.3 | 35.3 | 37.3 | 52.8 |
| | ON + OFF ms | 51.4 | 46.6 | 53.1 | 57.5 | 83.8 |
| Mode efficiency % | | 91.4 | 91.5 | 90.2 | 94.7 | 91.1 |

The liquid crystal device according to Example 14 had ON response time 17.3 ms+OFF response time 41.5 ms=58.8 ms in total at a voltage of 2 V, thus showing good low-voltage drivability and high-speed response characteristics. The liquid crystal devices according to Examples 15 to 23 had ON response time+OFF response time=45.6 to 83.8 ms in total at a voltage of 2 V, thus showing good low-voltage drivability and high-speed response characteristics.

The ON response time is the time corresponding to transmittance T from 10% to 90%. The OFF response time is the time corresponding to transmittance T from 90% to 10%.

The liquid crystal device according to Example 14 had a mode efficiency of 94.1% at 2 V and was proved to be a positive liquid crystal with good optical characteristics. The liquid crystal devices according to Examples 15 to 23 had a mode efficiency in the range of 89.7% to 94.7% at 2 V and was proved to be a positive liquid crystal with good optical characteristics.

The mode efficiency refers to the ratio of the amount of transmitted light in a polarizer crossed nicols arrangement during voltage application to the amount of transmitted light in a polarizer parallel arrangement during no voltage application, which is set to 100%.

<Synthesis of PFG Polymer with Hydroxyl Group>
(Synthesis of PEG Polymer (1))

110 parts by mass of methoxypropyl acetate was supplied to a four-neck flask equipped with a thermometer, a stirrer, a reflux condenser, and a nitrogen gas inlet tube and was heated to 95° C.

Next, after reaching the temperature, a mixture of 45 parts by mass of methoxy poly(ethylene glycol) methacrylate (molecular weight: 468), 45 parts by mass of poly(ethylene glycol) dimethacrylate (molecular weight: 536), 10 parts by mass of 2-hydroxyethyl methacrylate (molecular weight: 130), and 15 parts by mass of dimethyl-2,2-azobis(2-methylpropionate) dissolved in 190 parts by mass of methoxypropyl acetate was added dropwise to the methoxypropyl acetate in the four-neck flask for 3 hours. After the dropwise addition, the mixture was allowed to react while being kept at the same temperature for 6 hours to prepare a solution containing a polymer. The resulting solution was passed through a 1-μm filter, and the polymerization solvent methoxypropyl acetate was completely removed with an evaporator to produce a polymer (1). The polymer (1) had a weight-average molecular weight (Mw) of 5,600 measured by GPC, and the hydroxyl value was 94.7 mg/KOHg.

(PEG Polymer Composition (P-1))

10 parts of the polymer (1) was dissolved in 231 parts of cyclopentanone, to which 7 parts of Duranate (registered trademark) SBB-70P (solid content: 70.4% by weight, NCO percent: 10.2% by weight, manufactured by Asahi Kasei Corporation) was added at room temperature. The mixture was uniformly mixed to prepare a PEG polymer composition (P-1).

Example 24

For pretreatment of the first substrate, (1) the first substrate was subjected to ozone cleaning by 172-nm UV radiation for approximately 10 minutes using an excimer UV apparatus manufactured by Ushio Inc., (2) the first substrate was subjected to ultrasonic cleaning in pure water for 10 minutes, (3) droplets of water were removed from the substrate by $N_2$ blowing, and (4) the first substrate was dried at 105° C. for 10 minutes.

The PEG polymer composition (P-1) was spin-coated to the pretreated first substrate at 6500 rpm for 30 seconds, was heated at 60° C. for 5 minutes to remove the solvent, and was baked on a hot plate at 130° C. for 90 minutes to form a first alignment layer (p-1) on the first substrate.

A photo spacer 42 3.3 μm in height was formed on one of the first substrate with the first alignment layer (p-1) and the second substrate on which a second alignment layer 22 (polyimide film) subjected to rubbing was formed. The first substrate was then bonded to the second substrate. A liquid crystal component (positive liquid crystal Δn=0.130, Δε=4.4) was injected by capillarity into the 3.3-μm space thus formed, thereby producing a liquid crystal device according to Example 24.

Figure 41:
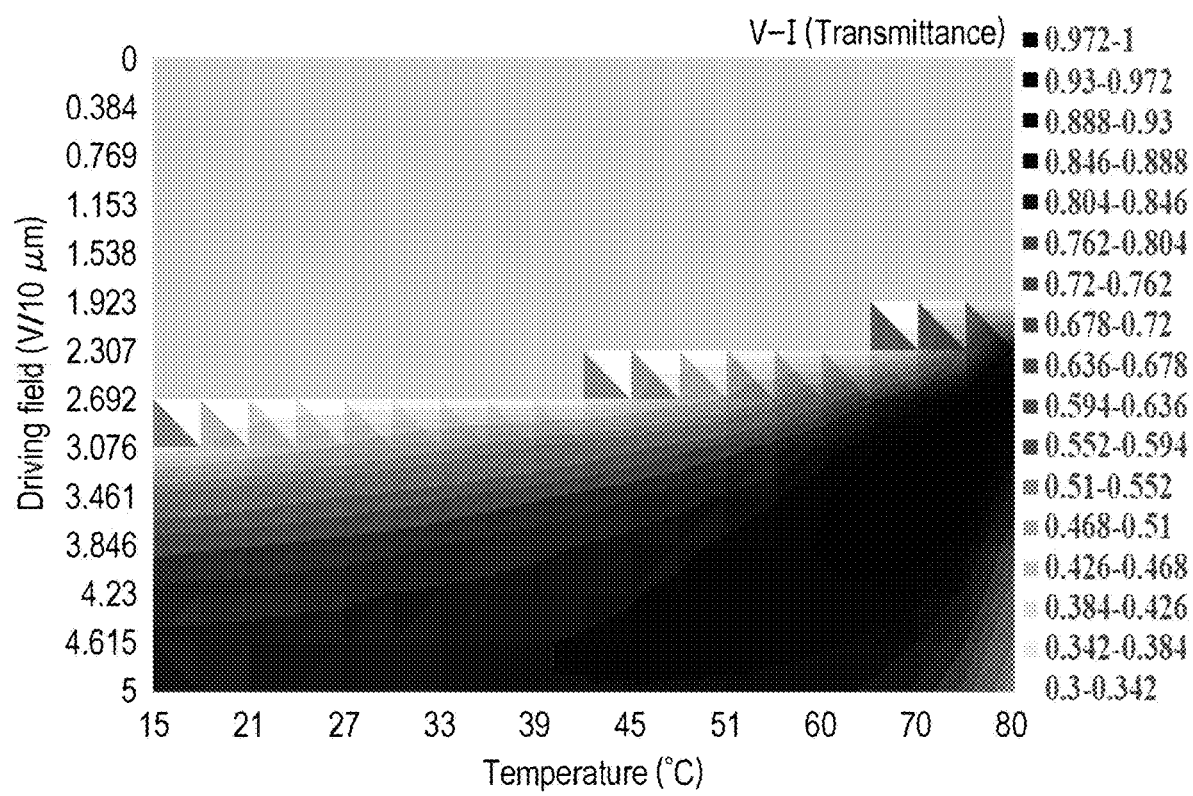
FIG. 41 is a graph of the driving voltage and temperature dependence of transmitted light intensity I when a voltage is applied to a liquid crystal display device.
Figure 42:
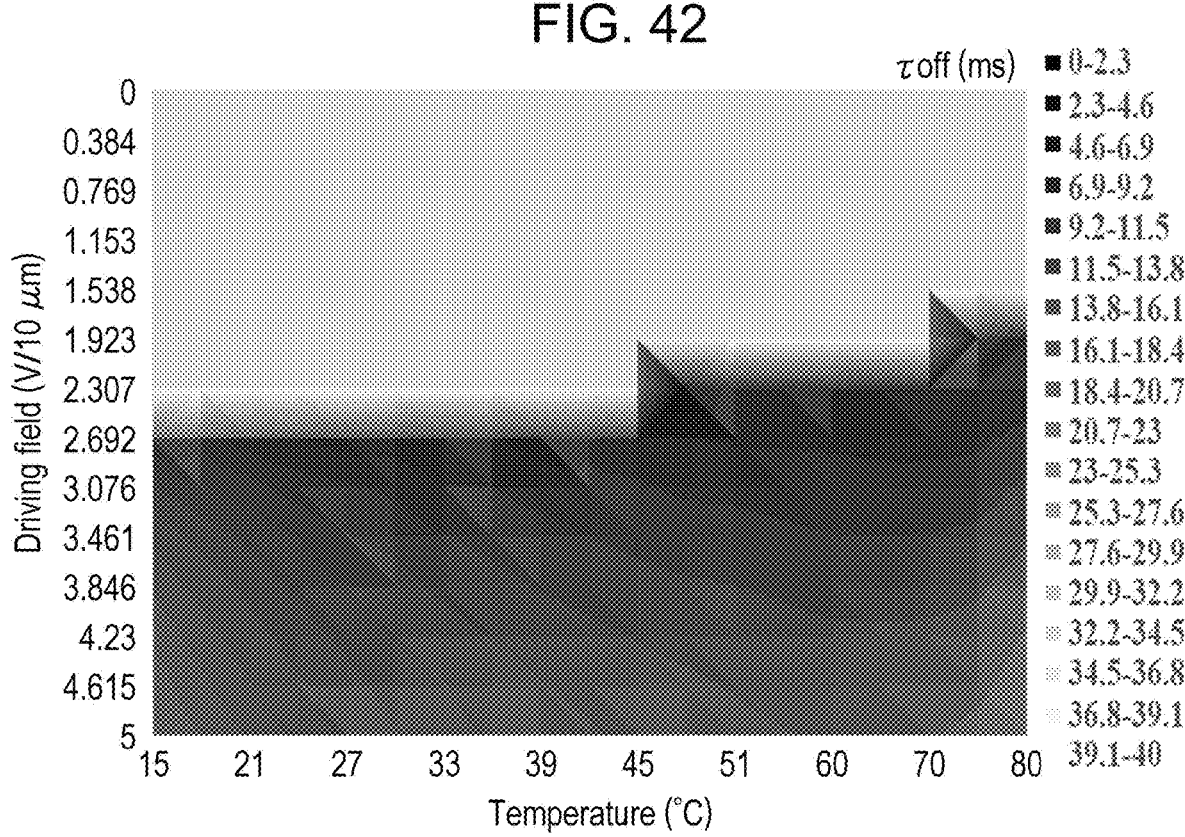
FIG. 42 is a graph of the driving voltage and temperature dependence of the OFF response time τoff in the voltage OFF state when a voltage is applied to a liquid crystal display device.
Figure 43:
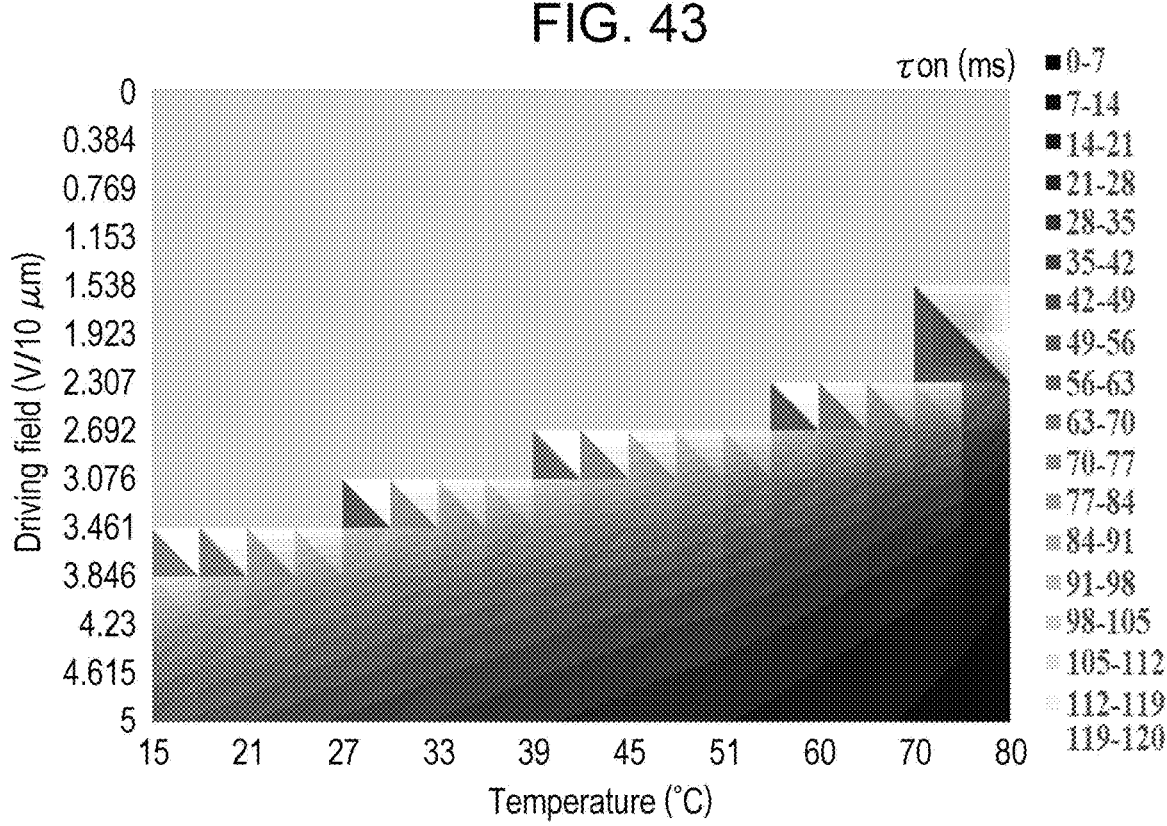
FIG. 43 is a graph of the driving voltage and temperature dependence of the ON response time τon in the voltage ON state when a voltage is applied to a liquid crystal display device.

FIG. 41 is a graph of the driving voltage and temperature dependence of transmitted light intensity I when a voltage is applied to the liquid crystal display device according to Example 24. The threshold voltage ranges from 2 to 2.6 V, and low-voltage driving is possible. The maximum transmittance ranges from 0.80 to 1.0 at a driving voltage of 5 V or less at any temperature, and high optical transparency and good slippery characteristics were achieved. FIG. 42 is a graph of the driving voltage and temperature dependence of the OFF response time τoff in the voltage OFF state. The OFF response time was 20 ms or less at any temperature and applied voltage, and high responsivity was achieved. FIG. 43 is a graph of the driving voltage and temperature dependence of the ON response time τon in the voltage ON state. The response time was 50 ms or less at a driving voltage of 5 V. Thus, high responsivity was also achieved in the voltage ON state.

<Synthesis of PEG Polymer Containing Cinnamic Acid>
(Synthesis of PEG Polymer Containing Cinnamic Acid (2))

110 parts by mass of methoxypropyl acetate was supplied to a four-neck flask equipped with a thermometer, a stirrer, a reflux condenser, and a nitrogen gas inlet tube and was heated to 80° C.

Next, after reaching the temperature, a mixture of 45 parts by mass of methoxy poly(ethylene glycol) methacrylate (molecular weight: 468), 45 parts by mass of poly(ethylene glycol) dimethacrylate (molecular weight: 536), 10 parts by mass of a compound represented by the formula (CIN-1), and 6 parts by mass of dimethyl-2,2-azobis(2-methylpropionate) dissolved in 190 parts by mass of methoxypropyl acetate was added dropwise to the methoxypropyl acetate in the four-neck flask for 3 hours. After the dropwise addition, the mixture was allowed to react while being kept at the same temperature for 10 hours to prepare a solution containing a polymer. The resulting solution was passed through a 1-μm filter, and the polymerization solvent was completely removed with an evaporator to produce a polymer (2). The polymer (2) had a weight-average molecular weight (Mw) of 52,000 measured by GPC.

[Chem. 29]

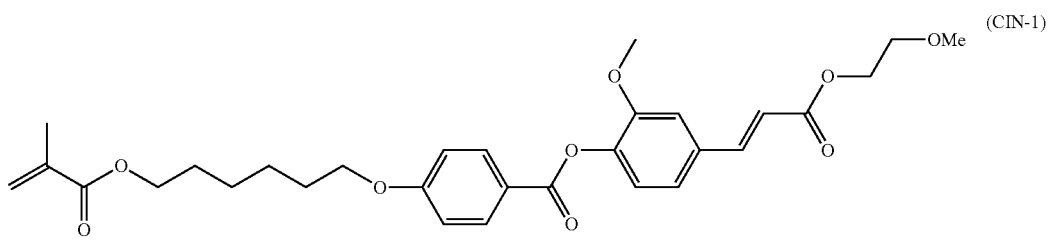

(CIN-1)

(PEG Polymer Composition Containing Cinnamic Acid (P-2))

10 parts of the polymer (2) was uniformly dissolved with stirring in 231 parts of cyclopentanone at 60° C. to prepare a PEG polymer composition containing cinnamic acid (P-2).

Example 25

A first alignment layer (p-2) was formed on the first substrate in the same manner as in Example 1 except that the slippery material was changed to the PEG polymer composition (P-2). A photo spacer 42 3.3 µm in height was formed on one of the first substrate with the first alignment layer (p-2) and the second substrate on which a second alignment layer 22 (polyimide film) subjected to rubbing was formed. The first substrate was then bonded to the second substrate. A liquid crystal component (positive liquid crystal $\Delta n=0.103$, $\Delta\varepsilon=7.3$) was injected by capillarity into the 3.3-µm space thus formed, thereby producing a liquid crystal device according to Example 25.

When examined in the same manner as in Example 24, the liquid crystal element according to Example 25 had very good slippery characteristics in an applied voltage range of 3 to 4.5 V as in Example 24.

The constituents and combinations thereof in these embodiments are examples, and additions, omissions, substitutions, and other modifications of the constituents are possible without departing from the gist of the present invention. The present invention is not limited by these embodiments and is limited only by the scope of the claims.

REFERENCE SIGNS LIST

10, 50 optical device, 11, 12, 31, 32 substrate, 13, liquid crystal component, 14, 34 first alignment layer, second alignment layer, 45 liquid crystal molecule, 17 non-glide weak anchoring interface, 18, 19, 38, 39, 126, 127 electrode, 35 insulating film, 42 photo spacer, 431 color filter (R), 432 color filter (G), 433 color filter (B), 434 black layer

The invention claimed is:

1. An optical device comprising: a first substrate and a second substrate facing each other; a liquid crystal component between the first substrate and the second substrate; a first electrode and a second electrode located on the first substrate on the second substrate side; a first alignment layer that is located on the first substrate on the second substrate side and controls the alignment state of liquid crystal molecules in the liquid crystal component; and a second alignment layer that is located on the second substrate on the first substrate side and controls the alignment state of liquid crystal molecules in the liquid crystal component, wherein an interface between the liquid crystal component and at least one of the first alignment layer or the second alignment layer forms a non-glide weak anchoring interface, and at least one of the first alignment layer or the second alignment layer is a hybrid film of a strong anchoring film and a weak anchoring film, wherein the hybrid film is a weak anchoring interface microscopically formed on a surface of a substrate that forms a strong anchoring interface.

2. The optical device according to claim 1, wherein an interface between the liquid crystal component and the second alignment layer forms a strong anchoring interface.

3. The optical device according to claim 1, wherein the interface between the liquid crystal component and the first alignment layer has an azimuthal anchoring energy in the range of $6\times10^{-8}$ to $1\times10^{-6}$ $Jm^{-2}$.

4. The optical device according to claim 1, wherein the first alignment layer is the hybrid film of the strong anchoring film and the weak anchoring film.

5. The optical device according to claim 1, wherein the first electrode and the second electrode generate an in-plane electric field between the first substrate and the second substrate.

6. The optical device according to claim 1, wherein the first electrode and the second electrode generate a fringing field between the first substrate and the second substrate.

7. The optical device according to claim 1, wherein the liquid crystal component comprises a nematic liquid crystal.

8. The optical device according to claim 1, wherein the second substrate has a color filter, and a driving voltage is applied to the first electrode and the second electrode via a thin-film transistor.

9. A refresh driving method for the optical device according to claim 8, comprising: applying the driving voltage until a maximum transmittance is obtained; and subsequently stopping voltage application.

* * * * *